(12) United States Patent
Barcia et al.

(10) Patent No.: US 12,005,905 B2
(45) Date of Patent: Jun. 11, 2024

(54) METHOD OF ASSISTING A DRIVER IF A PASSENGER ENCOUNTERS A HEALTH ISSUE

(71) Applicant: Volvo Car Corporation, Gothenburg (SE)

(72) Inventors: Peter Barcia, Gothenburg (SE);
Anthony Raimondi, Gothenburg (SE);
Ronald J Roselli, Gothenburg (SE);
Kyle Caroncino, Gothenburg (SE);
Derek Boesch, Gothenburg (SE);
Giovanni Spiritoso, Gothenburg (SE)

(73) Assignee: VOLVO CAR CORPORATION, Gothenburg (SE)

(*) Notice: Subject to any disclaimer, the term of this patent is extended or adjusted under 35 U.S.C. 154(b) by 32 days.

(21) Appl. No.: 17/982,177

(22) Filed: Nov. 7, 2022

(65) Prior Publication Data

US 2024/0149885 A1   May 9, 2024

(51) Int. Cl.

| | |
|---|---|
| *A61B 5/18* | (2006.01) |
| *B60W 40/08* | (2012.01) |
| *B60W 50/14* | (2020.01) |
| *B60W 60/00* | (2020.01) |
| *H04W 4/40* | (2018.01) |
| *H04W 4/90* | (2018.01) |
| *H04W 76/50* | (2018.01) |

(52) U.S. Cl.
CPC ............ *B60W 40/08* (2013.01); *B60W 50/14* (2013.01); *B60W 60/0016* (2020.02); *H04W 4/40* (2018.02); *H04W 4/90* (2018.02); *H04W 76/50* (2018.02); *B60W 2050/143* (2013.01); *B60W 2050/146* (2013.01); *B60W 2540/01* (2020.02); *B60W 2540/221* (2020.02); *B60W 2556/45* (2020.02)

(58) Field of Classification Search
CPC .. B60W 40/08; B60W 50/14; B60W 60/0016; B60W 2050/143; B60W 2050/146; B60W 2540/01; B60W 2540/221; B60W 2556/45; H04W 4/40; H04W 4/90; H04W 76/50
See application file for complete search history.

(56) References Cited

U.S. PATENT DOCUMENTS

| | | | |
|---|---|---|---|
| 5,960,061 | A | 9/1999 | Fahie et al. |
| 9,449,495 | B1 * | 9/2016 | Call ..................... H04W 4/029 |
| 9,595,195 | B2 | 3/2017 | Varoglu et al. |
| 10,241,511 | B2 | 3/2019 | Regmi et al. |

(Continued)

*Primary Examiner* — An T Nguyen
(74) *Attorney, Agent, or Firm* — Raj S. Dave; Dave Law Group LLC

(57) ABSTRACT

An embodiment relates to a system, comprising: a processor and a communication module; wherein the processor performs, under power, following functions, wherein the functions comprise: receiving, an indication that a passenger of a vehicle is experiencing a medical emergency; identifying, via the communication module, an emergency contact in a device of the passenger; establishing, via the communication module, a secondary communication channel with the emergency contact; sending, via a communication module, a message to the emergency contact comprising a detail of occurrence of an emergency event in the vehicle and a location of the vehicle; and wherein the system is configured to be a component of the vehicle.

20 Claims, 27 Drawing Sheets

(56) References Cited

U.S. PATENT DOCUMENTS

| | | |
|---|---|---|
| 2017/0108862 A1* | 4/2017 | Mikkelsen ............. B60K 28/06 |
| 2018/0120837 A1* | 5/2018 | Regmi .................... A61B 5/01 |
| 2019/0225228 A1* | 7/2019 | Gurusubramanian ...................... G06V 20/597 |
| 2021/0212158 A1 | 7/2021 | Robertson, II et al. |
| 2022/0169175 A1* | 6/2022 | Choi ........................ H04L 1/20 |
| 2023/0329612 A1* | 10/2023 | Copenspire-Ross ........................ B60W 50/14 |

* cited by examiner

928

RECEIVING, BY A PROCESSOR, AN INDICATION THAT A PASSENGER OF A VEHICLE IS EXPERIENCING A MEDICAL EMERGENCY 908

GENERATING, AN ALERT SIGNAL INDICATING A NEED FOR A PULL OVER OF THE VEHICLE 910

GENERATING, A PATH FOR THE PULL OVER FOR THE VEHICLE 912

MANEUVERING, THE VEHICLE ALONG THE PATH TO A PULL OVER LOCATION 914

CONTACTING AUTOMATICALLY, BY THE PROCESSOR VIA A COMMUNICATION MODULE, A FIRST RESPONDER AND PROVIDING LOCATION OF THE VEHICLEAND A HEALTH CONDITION OF THE PASSENGER OF THE VEHICLE 916

TRANSMITTING, VIA THE COMMUNICATION MODULE, A SIGNAL OF MEDICAL EMERGENCY, AN IMAGE, AND A VIDEO TO THE FIRST RESPONDER FOR A DIAGNOSTIC PURPOSE 918

RECEIVING, VIA THE COMMUNICATION MODULE, AN INSTRUCTION PROVIDED BY THE FIRST RESPONDER 920

IDENTIFYING, VIA THE COMMUNICATION MODULE, AN EMERGENCY CONTACT IN PASSENGER DEVICE 922

ESTABLISHING, VIA THE COMMUNICATION MODULE, A SECONDARY COMMUNICATION CHANNEL 924

SENDING, VIA THE COMMUNICATION MODULE, A MESSAGE TO THE EMERGENCY CONTACT COMPRISING A DETAIL OF OCCURANCE OF AN EMERGENCY EVENT IN THE VEHICLE AND THE LOCATION OF THE VEHICLE 926

RECEIVING, BY A PROCESSOR, AN INDICATION THAT A PASSENGER OF THE VEHICLE IS EXPERIENCING A MEDICAL EMERGENCY 1008

GENERATING, AN ALERT SIGNAL INDICATING A NEED FOR A PULL OVER OF THE VEHICLE 1010

GENERATING, A PATH FOR THE PULL OVER FOR THE VEHICLE 1012

MANEUVERING, THE VEHICLE ALONG THE PATH TO A PULL OVER LOCATION 1014

CONTACTING AUTOMATICALLY, BY THE PROCESSOR VIA A COMMUNICATION MODULE, A FIRST RESPONDER AND PROVIDING THE PULL OVER LOCATION OF THE VEHICLE AND A HEALTH CONDITION OF THE PASSENGER OF THE VEHCILE 1016

TRANSMITTING A SIGNAL OF MEDICAL EMERGENCY, AN IMAGE, AND A VIDEO TO THE FIRST RESPONDER 1018

RECEIVING, VIA THE COMMUNICATION MODULE, AN INSTRUCTION PROVIDED BY THE FIRST RESPONDER 1020

IDENTIFYING, VIA THE COMMUNICATION MODULE, AN EMERGENCY CONTACT IN THE PASSENGER DEVICE 1022

ESTABLISHING, VIA THE COMMUNICATION MODULE, A SECONDARY COMMUNICATION CHANNEL 1024

SENDING, VIA THE COMMUNICATION MODULE, A MESSAGE TO THE EMERGENCY CONTACT COMPRISING A DETAIL OF OCCURANCE OF AN EMERGENCY EVENT IN THE VEHICLE AND THE PULL OVER LOCATION OF THE VEHICLE 1026

CONNECTING WITH AN EMERGENCY RESPONDER BY DIALING THE EMERGENCY SERVICES NOTIFICATION (ESN) TELEPHONE NUMBER AND REQUESTING AN EMERGENCY VEHICLE TO REACH THE SECOND LOCATION 1028

FIG. 10B

METHOD OF ASSISTING A DRIVER IF A PASSENGER ENCOUNTERS A HEALTH ISSUE

FIELD OF THE INVENTION

The present disclosure relates to monitoring and detection of an emergency of passengers in vehicles and providing suggestions to assist the vehicle or a passenger when such an emergency is detected. More specifically, the present disclosure relates to the system that can go through the emergency contacts identified in the electronic device of the passenger and send text messages notifying of an emergency event.

BACKGROUND

When a passenger, such as a child in the rear seat, encounters a health issue, it is very difficult for the driver to understand what to do until they have a chance to pull over and get out of the vehicle and examine the passenger themselves. The problem is, many times, it may take several minutes before the driver can safely pull over and examine the passenger and get in contact with the first responders.

Therefore, there is a need for a system and method that can monitor the vital signs of a passenger and identify that the passenger has encountered a health issue and immediately start assisting the driver.

SUMMARY

The following presents a summary to provide a basic understanding of one or more embodiments described herein. This summary is not intended to identify key or critical elements or delineate any scope of the different embodiments and/or any scope of the claims. The sole purpose of the summary is to present some concepts in a simplified form as a prelude to the more detailed description presented herein.

An embodiment relates to a system, comprising a processor and a communication module wherein the processor is configured for receiving, an indication that a passenger of a vehicle is experiencing a medical emergency identifying, via the communication module, an emergency contact in a device of the passenger establishing, via the communication module, a secondary communication channel with the emergency contact and sending, via a communication module, a message to the emergency contact comprising a detail of occurrence of an emergency event in the vehicle and a location of the vehicle.

In an embodiment, a method, comprising receiving, by a processor, an indication that a passenger of a vehicle is experiencing a medical emergency identifying, via a communication module, an emergency contact in a passenger device establishing, via the communication module, a secondary communication channel and sending, via the communication module, a message to the emergency contact comprising a detail of occurrence of an emergency event in the vehicle and a location of the vehicle.

In an embodiment, a non-transitory computer-readable medium having stored thereon instructions executable by a computer system to perform operations comprising receiving, by a processor, an indication that a passenger of a vehicle is experiencing a medical emergency identifying, via a communication module, an emergency contact in a passenger device establishing, via the communication module, a secondary communication channel and sending, via the communication module, a message to the emergency contact comprising a detail of occurrence of an emergency event in the vehicle and a location of the vehicle.

In an embodiment, a system, comprising a sensor, a communication module and a processor wherein the processor is configured for detecting, by the processor using a sensor signal that a passenger of a vehicle is experiencing a medical emergency generating, an alert signal indicating a need for a pull over of the vehicle generating, a path for the pull over for the vehicle maneuvering, the vehicle along the path to a pull over location contacting automatically, by the processor via a communication module, a first responder and providing the location of the vehicle and a health condition of the passenger of the vehicle and transmitting, via the communication module, a signal of medical emergency, an image, and a video to the first responder receiving, via the communication module, an instruction provided by the first responder identifying, via the communication module, an emergency contact in a passenger device establishing, via the communication module, a secondary communication channel sending, via a communication module, a message to the emergency contact comprising a detail of occurrence of an emergency event in the vehicle and the pull over location of the vehicle.

In an embodiment, a method, comprising detecting, by a processor using a sensor signal that a passenger of a vehicle is experiencing a medical emergency generating, an alert signal indicating a need for a pull over of the vehicle generating, a path for the pull over for the vehicle maneuvering, the vehicle along the path to a pull over location contacting automatically, by the processor via a communication module, a first responder and providing the location of the vehicle and a health condition of the passenger of the vehicle and transmitting, via the communication module, a signal of medical emergency, an image, and a video to the first responder receiving, via the communication module, an instruction provided by the first responder identifying, via the communication module, an emergency contact in the passenger device establishing, via the communication module, a secondary communication channel and sending, via a communication module, a message to the emergency contact comprising a detail of occurrence of an emergency event in the vehicle and the pull over location of the vehicle.

In an embodiment, a non-transitory computer-readable medium having stored thereon instructions executable by a computer system to perform operations comprising detecting, by a processor using a sensor signal that a passenger of a vehicle is experiencing a medical emergency generating, an alert signal indicating a need for a pull over of the vehicle generating, a path for the pull over for the vehicle maneuvering, the vehicle along the path to a pull over location contacting automatically, by the processor via a communication module, a first responder and providing the location of the vehicle and a health condition of the passenger of the vehicle and transmitting, via the communication module, a signal of medical emergency, an image, and a video to the first responder receiving, via the communication module, an instruction provided by the first responder identifying, via the communication module, an emergency contact in a passenger device establishing, via the communication module, a secondary communication channel and sending, via a communication module, a message to the emergency contact comprising a detail of occurrence of an emergency event in the vehicle and the pull over location of the vehicle.

In an embodiment, a system, comprising a communication module and a processor wherein the processor is configured for receiving, by the processor, an indication that a passenger of a vehicle is experiencing a medical emergency generating, an alert signal indicating a need for a pull over of a vehicle generating, a path for the pull over for the vehicle maneuvering, the vehicle along the path to a pull over location contacting automatically, by the processor via a communication module, a first responder and providing the location of the vehicle and a health condition of the passenger of the vehicle and transmitting, via the communication module, a signal of medical emergency, an image, and a video to the first responder receiving, via the communication module, an instruction provided by the first responder identifying, via the communication module, an emergency contact in a passenger device establishing, via the communication module, a secondary communication channel and sending, via a communication module, a message to the emergency contact comprising a detail of occurrence of an emergency event in the vehicle and the pull over location of the vehicle.

In an embodiment, a method, comprising receiving, by a processor, an indication that a passenger of a vehicle is experiencing a medical emergency generating, an alert signal indicating a need for a pull over of the vehicle generating, a path for the pull over for the vehicle maneuvering, the vehicle along the path to a pull over location contacting automatically, by the processor via a communication module, a first responder and providing the location of the vehicle and a health condition of the passenger of the vehicle and transmitting, via the communication module, a signal of medical emergency, an image, and a video to the first responder receiving, via the communication module, an instruction provided by the first responder identifying, via the communication module, an emergency contact in a passenger device establishing, via the communication module, a secondary communication channel and sending, via a communication module, a message to the emergency contact comprising a detail of occurrence of an emergency event in the vehicle and the pull over location of the vehicle.

In an embodiment, a non-transitory computer-readable medium having stored thereon instructions executable by a computer system to perform operations comprising receiving, by a processor, an indication that a passenger of a vehicle is experiencing a medical emergency generating, an alert signal indicating a need for a pull over of the vehicle generating, a path for the pull over for the vehicle maneuvering, the vehicle along the path to a pull over location contacting automatically, by the processor via a communication module, a first responder and providing the location of the vehicle and a health condition of the passenger of the vehicle and transmitting, via the communication module, a signal of medical emergency, an image, and a video to the first responder receiving, via the communication module, an instruction provided by the first responder identifying, via the communication module, an emergency contact in a passenger device establishing, via the communication module, a secondary communication channel and sending, via a communication module, a message to the emergency contact comprising a detail of occurrence of an emergency event in the vehicle and the pull over location of the vehicle.

In an embodiment, a system, comprising a communication module and a processor wherein the processor is configured for receiving, by the processor, an indication that a passenger of a vehicle is experiencing a medical emergency generating, an alert signal indicating a need for a pull over of the vehicle generating, a path for the pull over for the vehicle maneuvering, the vehicle along the path to a pull over location contacting automatically, by the processor via a communication module, a first responder and providing the pull over location of the vehicle and a health condition of the passenger of the vehicle transmitting, via the communication module, a signal of medical emergency, an image, and a video to the first responder before reaching a second location receiving, via the communication module, an instruction provided by the first responder identifying, via the communication module, an emergency contact in a passenger device establishing, via the communication module, a secondary communication channel sending, via a communication module, a message to the emergency contact comprising a detail of occurrence of an emergency event in the vehicle and the pull over location of the vehicle and connecting with an emergency responder by dialing the emergency services notification (ESN) telephone number and requesting an emergency vehicle to reach the second location.

In an embodiment, a method comprising receiving, by a processor, an indication that a passenger of a vehicle is experiencing a medical emergency generating, an alert signal indicating a need for a pull over of the vehicle generating, a path for the pull over for the vehicle maneuvering, the vehicle along the path to a pull over location contacting automatically, by the processor via a communication module, a first responder and providing the pull over location of the vehicle and a health condition of the passenger of the vehicle transmitting, via the communication module, a signal of medical emergency, an image, and a video to the first responder before reaching a second location receiving, via the communication module, an instruction provided by the first responder identifying, via the communication module, an emergency contact in a passenger device establishing, via the communication module, a secondary communication channel sending, via a communication module, a message to the emergency contact comprising a detail of occurrence of an emergency event in the vehicle and the pull over location of the vehicle and connecting with an emergency responder by dialing the emergency services notification (ESN) telephone number and requesting an emergency vehicle to reach the second location.

In an embodiment, a non-transitory computer-readable medium having stored thereon instructions executable by a computer system to perform operations comprising receiving, by a processor, an indication that a passenger of a vehicle is experiencing a medical emergency generating, an alert signal indicating a need for a pull over of the vehicle generating, a path for the pull over for the vehicle maneuvering, the vehicle along the path to a pull over location contacting automatically, by the processor via a communication module, a first responder and providing the pull over location of the vehicle and a health condition of the passenger of the vehicle transmitting, via the communication module, a signal of medical emergency, an image, and a video to the first responder before reaching a second location receiving, via the communication module, an instruction provided by the first responder identifying, via the communication module, an emergency contact in a passenger device establishing, via the communication module, a secondary communication channel sending, via a communication module, a message to the emergency contact comprising a detail of occurrence of an emergency event in the vehicle and the pull over location of the vehicle and connecting with an emergency responder by dialing the emergency services notification (ESN) telephone number and requesting an emergency vehicle to reach the second location.

In an embodiment, a system, comprising a sensor configured to measure a physiological state of a passenger a database storing a passenger profile that identify a prestored health levels of the passenger a processor a communication module and a memory wherein the memory storing instructions that, when executed by the processor, cause a vehicle to perform operations comprising receiving a physiological state of the passenger from the sensor while the vehicle is in operation identifying the passenger profile of the passenger from the database that matches a physical information of the passenger identifying at least one of a prestored health levels of the passenger from the identified passenger profile connecting with a first responder determining whether the passenger is experiencing an emergency health condition based on evaluation of a passenger health condition with regard to the prestored health levels sending images and videos of the passenger health condition through the sensor to a first responder before reaching a location identification of emergency contact from the communication module of a driver to send messages to a third party corresponding to occurrence of an emergency event in the vehicle and performing a remedial action to assist the passenger in response to determining that the passenger is experiencing the emergency health condition and wherein the system is configured for identifying and assisting the passenger undergoing the emergency health condition in the vehicle before arriving at the location.

In an embodiment, a method comprising receiving a physiological state of a passenger from a sensor while a vehicle is in operation identifying a passenger profile of the passenger from a database that matches a physical information of the passenger identifying at least one of a prestored health levels of the passenger from the identified passenger profile connecting with a first responder determining whether the passenger is experiencing an emergency health condition based on evaluation of a passenger health condition with regard to the prestored health levels sending images and videos of the passenger's health condition through the sensor to the first responder before reaching a location identifying an emergency contact from the communication module of a driver to send messages to a third party corresponding to the occurrence of an emergency event in the vehicle and performing a remedial action to assist the passenger in response to determining that the passenger is experiencing the emergency health condition.

In an embodiment, a non-transitory computer-readable medium having stored thereon instructions executable by a computer system to perform operations comprising receiving a physiological state of a passenger from a sensor while a vehicle is in operation identifying a passenger profile of the passenger from a database that matches a physical information of the passenger identifying at least one of a prestored health levels of the passenger from the identified passenger profile connecting with a first responder determining whether the passenger is experiencing an emergency health condition based on evaluation of a passenger health condition with regard to the prestored health levels sending images and videos of the passenger's health condition through the sensor to the first responder before reaching a location identifying an emergency contact from the communication module of a driver to send messages to a third party corresponding to the occurrence of an emergency event in the vehicle and performing a remedial action to assist the passenger in response to determining that the passenger is experiencing the emergency health condition.

In an embodiment, a system comprising a processor and a communication module wherein the processor performs under power, following functions wherein the functions comprise receiving, an indication that a passenger of a vehicle encountered a health issue assisting, a driver for pull over of the vehicle to a side of a road calling automatically by the processor, via the communication module a first responder identifying, via the communication module, an emergency contact in an electronic device of the driver sending, via a communication module, a message to the emergency contact notifying of an emergency event in the vehicle and wherein the system is configured to notify a spouse or a family doctor that the passenger of the vehicle encountered the health issue.

BRIEF DESCRIPTION OF THE FIGURES

These and other aspects of the present invention will now be described in more detail, with reference to the appended drawings showing exemplary embodiments of the present invention, in which:

The present disclosure is directed to various embodiments illustrated and described herein with reference to the various drawings, in which like reference numbers are used to denote like systems or assembly components, methods or algorithm steps. The illustrated components of the various systems are not necessarily drawn to scale.

FIG. 9B is an illustration of a method for identifying and assisting the passenger undergoing emergency health condition in the vehicle before arriving at the location.

FIG. 10B is a flowchart of a method for identifying and assisting the passenger undergoing emergency health condition in the vehicle before arriving at the location.

DETAILED DESCRIPTION

Figure 1A:
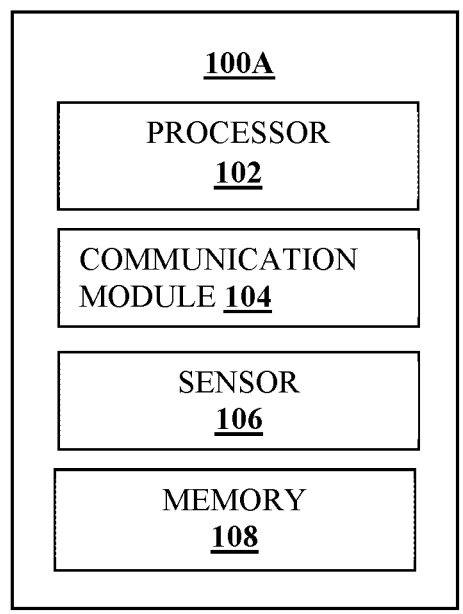
FIG. 1A shows a block diagram of various components of a system for monitoring a health emergency of a passenger of a vehicle and assisting in pull over of the vehicle and contacting with the emergency contact of the passenger according to an embodiment of the disclosure.

For simplicity and clarity of illustration, the figures illustrate the general manner of construction. The description and figures may omit the descriptions and details of well-known features and techniques to avoid unnecessarily obscuring the present disclosure. The figures exaggerate the dimensions of some of the elements relative to other elements to help improve understanding of embodiments of the present disclosure. The same reference numeral in different figures denotes the same element.

Although the herein detailed description contains many specifics for the purpose of illustration, a person of ordinary skill in the art will appreciate that many variations and alterations to the details are considered to be included herein.

Accordingly, the embodiments herein are without any loss of generality to, and without imposing limitations upon, any claims set forth. The terminology used herein is for the purpose of describing particular embodiments only and is not limiting. Unless defined otherwise, all technical and scientific terms used herein have the same meaning as commonly understood by one with ordinary skill in the art to which this disclosure belongs.

As used herein, the articles "a" and "an" used herein refer to one or to more than one (i.e., to at least one) of the grammatical object of the article. By way of example, "an element" means one element or more than one element. Moreover, usage of articles "a" and "an" in the subject specification and annexed drawings construe to mean "one or more" unless specified otherwise or clear from context to mean a singular form.

As used herein, the terms "example" and/or "exemplary" mean serving as an example, instance, or illustration. For the avoidance of doubt, such examples do not limit the herein described subject matter. In addition, any aspect or design described herein as an "example" and/or "exemplary" is not necessarily preferred or advantageous over other aspects or designs, nor does it preclude equivalent exemplary structures and techniques known to those of ordinary skill in the art.

As used herein, the terms "first," "second," "third," and the like in the description and in the claims, if any, distinguish between similar elements and do not necessarily describe a particular sequence or chronological order. The terms are interchangeable under appropriate circumstances such that the embodiments herein are, for example, capable of operation in sequences other than those illustrated or otherwise described herein. Furthermore, the terms "include," "have," and any variations thereof, cover a non-exclusive inclusion such that a process, method, system, article, device, or apparatus that comprises a list of elements is not necessarily limiting to those elements, but may include other elements not expressly listed or inherent to such process, method, system, article, device, or apparatus.

As used herein, the terms "left," "right," "front," "back," "top," "bottom," "over," "under" and the like in the description and in the claims, if any, are for descriptive purposes and not necessarily for describing permanent relative positions. The terms so used are interchangeable under appropriate circumstances such that the embodiments of the apparatus, methods, and/or articles of manufacture described herein are, for example, capable of operation in other orientations than those illustrated or otherwise described herein.

No element act, or instruction used herein is critical or essential unless explicitly described as such. Furthermore, the term "set" includes items (e.g., related items, unrelated items, a combination of related items and unrelated items, etc.) and may interchangeable with "one or more". Where only one item is intended, the term "one" or similar language is used. Also, the terms "has," "have," "having," or the like are open-ended terms. Further, the phrase "based on" means "based, at least in part, on" unless explicitly stated otherwise.

As used herein, the terms "system," "device," "unit," and/or "module" refer to a different component, component portion, or component of the various levels of the order. However, other expressions that achieve the same purpose may replace the terms.

As used herein, the terms "couple," "coupled," "couples," "coupling," and the like refer to connecting two or more elements mechanically, electrically, and/or otherwise. Two or more electrical elements may be electrically coupled together, but not mechanically or otherwise coupled together. Coupling may be for any length of time, e.g., permanent, or semi-permanent or only for an instant. "Electrical coupling" includes electrical coupling of all types. The absence of the word "removably," "removable," and the like, near the word "coupled" and the like does not mean that the coupling, etc. in question is or is not removable.

As used herein, the term "or" means an inclusive "or" rather than an exclusive "or." That is, unless specified otherwise, or clear from context, "X employs A or B" means any of the natural inclusive permutations. That is, if X employs A; X employs B; or X employs both A and B, then "X employs A or B" is satisfied under any of the foregoing instances.

As used herein, two or more elements are "integral" if they comprise the same piece of material. Two or more elements are "non-integral" if each comprises a different piece of material.

As used herein, the term "real-time" refers to operations conducted as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All variations which come within the meaning and range of equivalency of the claims are to be embraced within their scope.

As used herein, the term "approximately" can mean within a specified or unspecified range of the specified or unspecified stated value. In some embodiments, "approximately" can mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Other specific forms may embody the present invention without departing from its spirit or characteristics. The described embodiments are in all respects illustrative and not restrictive. Therefore, the appended claims rather than the description herein indicate the scope of the invention. All variations which come within the meaning and range of equivalency of the claims are within their scope.

As used herein, the term "component" broadly construes hardware, firmware, and/or a combination of hardware, firmware, and software.

Digital electronic circuitry, or in computer software, firmware, or hardware, including the structures disclosed in this specification and their structural equivalents, or in combinations of one or more of them may realize the implementations and all of the functional operations described in this specification. Implementations may be as one or more computer program products i.e., one or more modules of computer program instructions encoded on a computer-readable medium for execution by, or to control the operation of, data processing apparatus. The computer-readable medium may be a machine-readable storage device, a machine-readable storage substrate, a memory device, a composition of matter affecting a machine-readable propagated signal, or a combination of one or more of them. The term "computing system" encompasses all apparatus, devices, and machines for processing data, including by way of example, a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal) that encodes information for transmission to a suitable receiver apparatus.

The actual specialized control hardware or software code used to implement these systems and/or methods is not limiting to the implementations. Thus, any software and any hardware can implement the systems and/or methods based on the description herein without reference to specific software code.

A computer program (also known as a program, software, software application, script, or code) is written in any appropriate form of programming language, including compiled or interpreted languages. Any appropriate form, including a standalone program or a module, component, subroutine, or other unit suitable for use in a computing environment may deploy it. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may execute on one computer or on multiple computers that are located at one site or distributed across multiple sites and interconnected by a communication network.

One or more programmable processors, executing one or more computer programs to perform functions by operating on input data and generating output, perform the processes and logic flows described in this specification. The processes and logic flows may also be performed by, and apparatus may also be implemented as, special purpose logic circuitry, for example, without limitation, a Field Programmable Gate Array (FPGA), an Application Specific Integrated Circuit (ASIC), Application Specific Standard Products (ASSPs), System-On-a-Chip (SOC) systems, Complex Programmable Logic Devices (CPLDs), etc.

Processors suitable for the execution of a computer program include, by way of example, both general and special purpose microprocessors, and any one or more processors of any appropriate kind of a digital computer. A processor will receive instructions and data from a read-only memory or a random-access memory or both. Elements of a computer can include a processor for performing instructions and one or more memory devices for storing instructions and data. A computer will also include, or is operatively coupled to receive data, transfer data or both, to/from one or more mass storage devices for storing data e.g., magnetic disks, magneto optical disks, optical disks, or solid-state disks. However, a computer need not have such devices. Moreover, another device, e.g., a mobile telephone, a personal digital assistant (PDA), a mobile audio player, a Global Positioning System (GPS) receiver, etc. may embed a computer. Computer-readable media suitable for storing computer program instructions and data include all forms of non-volatile memory, media and memory devices, including, by way of example, semiconductor memory devices (e.g., Erasable Programmable Read-Only Memory (EPROM), Electronically Erasable Programmable Read-Only Memory (EE- PROM), and flash memory devices), magnetic disks (e.g., internal hard disks or removable disks), magneto optical disks (e.g. Compact Disc Read-Only Memory (CD ROM) disks, Digital Versatile Disk-Read-Only Memory (DVD-ROM) disks) and solid-state disks. Special purpose logic circuitry may supplement or incorporate the processor and the memory.

To provide for interaction with a user, a computer may have a display device, e.g., a Cathode Ray Tube (CRT) or Liquid Crystal Display (LCD) monitor, for displaying information to the user, and a keyboard and a pointing device, e.g., a mouse or a trackball, by which the user may provide input to the computer. Other kinds of devices provide for interaction with a user as well. For example, feedback to the user may be any appropriate form of sensory feedback, e.g., visual feedback, auditory feedback, or tactile feedback; and a computer may receive input from the user in any appropriate form, including acoustic, speech, or tactile input.

A computing system that includes a back-end component, e.g., a data server, or that includes a middleware component, e.g., an application server, or that includes a front-end component, e.g., a client computer having a graphical user interface or a Web browser through which a user may interact with an implementation, or any appropriate combination of one or more such back-end, middleware, or front-end components, may realize implementations described herein. Any appropriate form or medium of digital data communication, e.g., a communication network may interconnect the components of the system. Examples of communication networks include a Local Area Network (LAN) and a Wide Area Network (WAN), e.g., Intranet and Internet.

The computing system may include clients and servers. A client and server are remote from each other and typically interact through a communication network. The relationship of the client and server arises by virtue of computer programs running on the respective computers and having a client-server relationship to each other.

Embodiments of the present invention may comprise or utilize a special purpose or general purpose computer including computer hardware. Embodiments within the scope of the present invention may also include physical and other computer-readable media for carrying or storing computer-executable instructions and/or data structures. Such computer-readable media can be any media accessible by a general purpose or special purpose computer system. Computer-readable media that store computer-executable instructions are physical storage media. Computer-readable media that carry computer-executable instructions are transmission media. Thus, by way of example and not limitation, embodiments of the invention can comprise at least two distinct kinds of computer-readable media: physical computer-readable storage media and transmission computer-readable media.

Although the present embodiments described herein are with reference to specific example embodiments it will be evident that various modifications and changes may be made to these embodiments without departing from the broader spirit and scope of the various embodiments. For example, hardware circuitry (e.g., Complementary Metal Oxide Semiconductor (CMOS) based logic circuitry), firmware, software (e.g., embodied in a non-transitory machine-readable medium), or any combination of hardware, firmware, and software may enable and operate the various devices, units, and modules described herein. For example, transistors, logic gates, and electrical circuits (e.g., Application Specific Integrated Circuit (ASIC) and/or Digital Signal Processor (DSP) circuit) may embody the various electrical structures and methods.

In addition, a non-transitory machine-readable medium and/or a system may embody the various operations, processes, and methods disclosed herein. Accordingly, the specification and drawings are illustrative rather than restrictive.

Physical computer-readable storage media includes RAM, ROM, EEPROM, CD-ROM or other optical disk storage (such as CDs, DVDs, etc.), magnetic disk storage or other magnetic storage devices, solid-state disks or any other medium. They store desired program code in the form of computer-executable instructions or data structures which can be accessed by a general purpose or special purpose computer.

As used herein, the term "network" refers to one or more data links that enable the transport of electronic data between computer systems and/or modules and/or other electronic devices. When a network or another communications connection (either hardwired, wireless, or a combination of hardwired or wireless) transfers or provides information to a computer, the computer properly views the connection as a transmission medium. A general purpose or special purpose computer access transmission media that can include a network and/or data links which carry desired program code in the form of computer-executable instructions or data structures. The scope of computer-readable media includes combinations of the above, that enable the transport of electronic data between computer systems and/or modules and/or other electronic devices.

Further, upon reaching various computer system components, program code in the form of computer-executable instructions or data structures can be transferred automatically from transmission computer-readable media to physical computer-readable storage media (or vice versa). For example, computer-executable instructions or data structures received over a network or data link can be buffered in RAM within a Network Interface Module (NIC), and then eventually transferred to computer system RAM and/or to less volatile computer-readable physical storage media at a computer system. Thus, computer system components that also (or even primarily) utilize transmission media may include computer-readable physical storage media.

Computer-executable instructions comprise, for example, instructions and data which cause a general purpose computer, special purpose computer, or special purpose processing device to perform a certain function or group of functions. The computer-executable instructions may be, for example, binary, intermediate format instructions such as assembly language, or even source code. Although the subject matter herein described is in a language specific to structural features and/or methodological acts, the described features or acts described do not limit the subject matter defined in the claims. Rather, the herein described features and acts are example forms of implementing the claims.

While this specification contains many specifics, these do not construe as limitations on the scope of the disclosure or of the claims, but as descriptions of features specific to particular implementations. A single implementation may implement certain features described in this specification in the context of separate implementations. Conversely, multiple implementations separately or in any suitable sub-combination may implement various features described herein in the context of a single implementation. Moreover, although features described herein as acting in certain combinations and even initially claimed as such, one or more features from a claimed combination may in some cases be excised from the combination, and the claimed combination may be directed to a sub-combination or variation of a sub-combination.

Similarly, while operations depicted herein in the drawings in a particular order to achieve desired results, this should not be understood as requiring that such operations be performed in the particular order shown or in sequential order or that all illustrated operations be performed, to achieve desirable results. In certain circumstances, multitasking and parallel processing may be advantageous. Moreover, the separation of various system components in the implementations should not be understood as requiring such separation in all implementations, and it should be understood that the described program components and systems may be integrated together in a single software product or packaged into multiple software products.

Even though particular combinations of features are recited in the claims and/or disclosed in the specification, these combinations are not intended to limit the disclosure of possible implementations. Other implementations are within the scope of the claims. For example, the actions recited in the claims may be performed in a different order and still achieve desirable results. In fact, many of these features may be combined in ways not specifically recited in the claims and/or disclosed in the specification. Although each dependent claim may directly depend on only one claim, the disclosure of possible implementations includes each dependent claim in combination with every other claim in the claim set.

Further, a computer system including one or more processors and computer-readable media such as computer memory may practice the methods. In particular, one or more processors execute computer-executable instructions, stored in the computer memory, to perform various functions such as the acts recited in the embodiments.

Those skilled in the art will appreciate that the invention may be practiced in network computing environments with many types of computer system configurations including personal computers, desktop computers, laptop computers, message processors, hand-held devices, multiprocessor systems, microprocessor-based or programmable consumer electronics, network PCs, minicomputers, mainframe computers, mobile telephones, PDAs, pagers, routers, switches, etc. Distributed system environments where local and remote computer systems, which are linked (either by hardwired data links, wireless data links, or by a combination of hardwired and wireless data links) through a network, both perform tasks may also practice the invention. In a distributed system environment, program modules may be located in both local and remote memory storage devices.

As used herein, the term "IoT" stands for Internet of Things which describes the network of physical objects "things" or objects that are embedded with sensors, software, and other technologies for the purpose of connecting and exchanging data with other devices and systems over the internet.

As used herein "Machine learning" refers to algorithms that give a computer the ability to learn without being explicitly programmed, including algorithms that learn from and make predictions about data. Machine learning algorithms include, but are not limited to, decision tree learning, artificial neural networks (ANN) (also referred to herein as a "neural net"), deep learning neural network, support vector machines, rules-based machine learning, random forest, etc. For the purposes of clarity, algorithms such as linear regression or logistic regression can also be used as part of a machine learning process. However, it is understood that using linear regression or another algorithm as part of a machine learning process is distinct from performing a statistical analysis such as regression with a spreadsheet program. The machine learning process can continually learn and adjust the classifier as new data becomes available and does not rely on explicit or rules-based programming. The ANN may be featured with a feedback loop to adjust the system output dynamically as it learns from the new data as it becomes available. In machine learning, backpropagation and feedback loops are used to train the AI/ML model improving the model's accuracy and performance over time.

Statistical modeling relies on finding relationships between variables (e.g., mathematical equations) to predict an outcome.

As used herein, the term "Data mining" is a process used to turn raw data into useful information.

As used herein, the term "Data acquisition" is the process of sampling signals that measure real world physical conditions and converting the resulting samples into digital numeric values that can be manipulated by a computer. Data acquisition systems typically convert analog waveforms into digital values for processing. The components of data acquisition systems include sensors to convert physical parameters to electrical signals, signal conditioning circuitry to convert sensor signals into a form that can be converted to digital values, and analog-to-digital converters to convert conditioned sensor signals to digital values. Stand-alone data acquisition systems are often called data loggers.

As used herein, the term "Dashboard" is a type of interface that visualizes particular Key Performance Indicators (KPIs) for a specific goal or process. It is based on data visualization and infographics.

As used herein, a "Database" is a collection of information that is organized so that it can be easily accessed, managed, and updated. Computer databases typically contain aggregations of data records or files.

As used herein, the term "Data set" (or "Dataset") is a collection of data. In the case of tabular data, a data set corresponds to one or more database tables, where every column of a table represents a particular variable, and each row corresponds to a given record of the data set in question. The data set lists values for each of the variables, such as height and weight of an object, for each member of the data set. Each value is known as a datum. Data sets can also consist of a collection of documents or files.

As used herein, a "Sensor" is a device that measures physical input from its environment and converts it into data that can be interpreted by either a human or a machine. Most sensors are electronic (the data is converted into electronic data), but some are simpler, such as a glass thermometer, which presents visual data.

The embodiments described herein can be directed to one or more of a system, a method, an apparatus, and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. For example, the computer readable storage medium can be, but is not limited to, an electronic storage device, a magnetic storage device, an optical storage device, an electromagnetic storage device, a superconducting storage device, and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, does not construe transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein are downloadable to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA), and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. Each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter described herein is in the general context of computer-executable instructions of a computer program product that runs on a computer and/or computers, those skilled in the art will recognize that the one or more embodiments herein also can be implemented in combination with one or more other program modules. Program modules include routines, programs, components, data structures, and/or the like that perform particular tasks and/or implement particular abstract data types. Moreover, other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like can practice the herein described computer-implemented methods. Distributed computing environments, in which remote processing devices linked through a communications network perform tasks, can also practice the illustrated aspects. However, stand-alone computers can practice one or more, if not all aspects of the one or more embodiments described herein. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

As it is employed in the subject specification, the term "processor" can refer to any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular based transistors, switches and/or gates, in order to optimize space usage and/or to enhance performance of related equipment. A combination of computing processing units can implement a processor.

Herein, terms such as "store," "storage," "data store," data storage," "database," and any other information storage component relevant to operation and functionality of a component refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, and/or nonvolatile random access memory (RAM) (e.g., ferroelectric RAM (FeRAM). Volatile memory can include RAM, which can function as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synch link DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein include, without being limited to including, these and/or any other suitable types of memory.

The embodiments described herein include mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments are for purposes of illustration but are not exhaustive or limiting to the embodiments described herein. Many modifications and variations will be apparent to those of ordinary skill in the art without departing from the scope and spirit of the described embodiments. The terminology used herein best explains the principles of the embodiments, the practical application and/or technical improvement over technologies found in the marketplace, and/or to enable others of ordinary skill in the art to understand the embodiments described herein.

The following terms and phrases, unless otherwise indicated, shall have the following meanings The term "vehicle" as used herein refers to a thing used for transporting people or goods. Automobiles, cars, trucks, buses etc. are examples of vehicles.

The term "electronic control unit" (ECU), also known as an "electronic control module" (ECM), is a system that controls one or more subsystems. An ECU may be installed in a car or other motor vehicle. It may refer to many ECUs, and can include but not limited to, Engine Control Module (ECM), Powertrain Control Module (PCM), Transmission Control Module (TCM), Brake Control Module (BCM) or Electronic Brake Control Module (EBCM), Central Control Module (CCM), Central Timing Module (CTM), General Electronic Module (GEM), Body Control Module (BCM), and Suspension Control Module (SCM). ECUs together are sometimes referred to collectively as the vehicles' computer or vehicles' central computer and may include separate computers. In an example, the electronic control unit can be embedded system in automotive electronics. In another example, the electronic control unit is wirelessly coupled with the automotive electronics.

The term "infotainment system" or "in-vehicle infotainment system" (IVI) as used herein refers to a combination of systems which are used to deliver entertainment and information. In an example, the information may be delivered to the driver and the passengers of a vehicle through audio/video interfaces, control elements like touch screen displays, button panel, voice commands, and more. Some of the main components of an in-vehicle infotainment systems are integrated head-unit, heads-up display, high-end Digital Signal Processors (DSPs), and Graphics Processing Units (GPUs) to support multiple displays, operating systems, Controller Area Network (CAN), Low-Voltage Differential Signaling (LVDS), and other network protocol support (as per the requirement), connectivity modules, automotive sensors integration, digital instrument cluster, etc.

The term "environment" or "surrounding" as used herein refers to surroundings and the space in which a vehicle is navigating. It refers to dynamic surroundings in which a vehicle is navigating which includes other vehicles, obstacles, pedestrians, lane boundaries, traffic signs and signals, speed limits, potholes, snow, water logging etc.

The term "autonomous mode" as used herein refers to an operating mode which is independent and unsupervised.

The term "autonomous communication" as used herein comprises communication over a period with minimal supervision under different scenarios and is not solely or completely based on pre-coded scenarios or pre-coded rules or a predefined protocol. Autonomous communication, in general, happens in an independent and an unsupervised manner.

The term "autonomous vehicle" also referred to as self-driving vehicle, driverless vehicle, robotic vehicle as used herein refers to a vehicle incorporating vehicular automation, that is, a ground vehicle that can sense its environment and move safely with little or no human input. Self-driving vehicles combine a variety of sensors to perceive their surroundings, such as thermographic cameras, Radio Detection and Ranging (radar), Light Detection and Ranging (lidar), Sound Navigation and Ranging (sonar), Global Positioning System (GPS), odometry and inertial measurement unit. Control systems, designed for the purpose, interpret sensor information to identify appropriate navigation paths, as well as obstacles and relevant signage.

The term "communication system" or "communication module" as used herein refers to a system which enables the information exchange between two points. The process of transmission and reception of information is called communication. The major elements of communication include but are not limited to a transmitter of information, channel or medium of communication and a receiver of information.

The term "connection" as used herein refers to a communication link. It refers to a communication channel that connects two or more devices for the purpose of data transmission. It may refer to a physical transmission medium such as a wire, or to a logical connection over a multiplexed medium such as a radio channel in telecommunications and computer networking. A channel is used for information transfer of, for example a digital bit stream, from one or several senders to one or several receivers. A channel has a certain capacity for transmitting information, often measured by its bandwidth in Hertz (Hz) or its data rate in bits per second. For example, a Vehicle-to-Vehicle (V2V) communication may wirelessly exchange information about the speed, location and heading of surrounding vehicles.

The term "communication" as used herein refers to the transmission of information and/or data from one point to another. Communication may be by means of electromagnetic waves. It is also a flow of information from one point, known as the source, to another, the receiver. Communication comprises one of the following: transmitting data, instructions, and information or a combination of data, instructions, and information. Communication happens between any two communication systems or communicating units. The term "in communication with" may refer to any coupling, connection, or interaction using electrical signals to exchange information or data, using any system, hardware, software, protocol, or format, regardless of whether the exchange occurs wirelessly or over a wired connection. The term communication includes systems that combine other more specific types of communication, such as V2I (Vehicle-to-Infrastructure), V2I (Vehicle-to-Infrastructure), V2N (Vehicle-to-Network), V2V (Vehicle-to-Vehicle), V2P (Vehicle-to-Pedestrian), V2D (Vehicle-to-Device) and V2G (Vehicle-to-Grid) and Vehicle-to-Everything (V2X) communication. V2X communication is the transmission of information from a vehicle to any entity that may affect the vehicle, and vice versa. The main motivations for developing V2X are occupant safety, road safety, traffic efficiency and energy efficiency. Depending on the underlying technology employed, there are two types of V2X communication technologies; cellular networks and other technologies that support direct device-to-device communication (such as Dedicated Short-Range Communication (DSRC), Port Community System (PCS), Bluetooth(@), Wi-Fit, etc.). Further, the emergency communication apparatus is configured on a computer with the communication function and is connected for bidirectional communication with the on-vehicle emergency report apparatus by a communication line through a radio station and a communication network such as a public telephone network or by satellite communication through a communication satellite. The emergency communication apparatus is adapted to communicate, through the communication network, with communication terminals including a road management office, a police station, a fire department, and a hospital. The emergency communication apparatus can be also connected online with the communication terminals of the persons concerned, associated with the occupant (the driver receiving the service) of the emergency-reporting vehicle.

The term "vehicle to vehicle (V2V) communication" refers to the technology that allows vehicles to broadcast and receive messages. The messages may be omni-directional messages, creating a 360-degree "awareness" of other vehicles in proximity. Vehicles may be equipped with appropriate software (or safety applications) that can use the messages from surrounding vehicles to determine potential crash threats as they develop.

The term "protocol" as used herein refers to a procedure required to initiate and maintain communication; a formal set of conventions governing the format and relative timing of message exchange between two communications terminals; a set of conventions that govern the interaction of processes, devices, and other components within a system; a set of signaling rules used to convey information or commands between boards connected to the bus; a set of signaling rules used to convey information between agents; a set of semantic and syntactic rules that determine the behavior of entities that interact; a set of rules and formats (semantic and syntactic) that determines the communication behavior of simulation applications; a set of conventions or rules that govern the interactions of processes or applications within a computer system or network; a formal set of conventions governing the format and relative timing of message exchange in a computer system; a set of semantic and syntactic rules that determine the behavior of functional units in achieving meaningful communication; a set of semantic and syntactic rules for exchanging information.

The term "communication protocol" as used herein refers to standardized communication between any two systems. An example communication protocol is of Health Level Seven (HL7). HL7 is a set of international standards used to provide guidance with transferring and sharing data between various healthcare providers. HL7 is a comprehensive framework and related standards for the exchange, integration, sharing, and retrieval of electronic health information.

The term "pull over" as used herein refers to steering a vehicle over to the side of the road. This enables the vehicle to be stopped or parked at the side of the road.

The term "path" as used herein refers to a way or track for movement. For example, a pull over path may be a path that the vehicle traverses for a pull over. It may refer to a path selected from a plurality of feasible paths that were computed or possible for a pull over.

The term "alert" or "alert signal" refers to a communication to attract attention. An alert may include visual, tactile, audible alert, and a combination of these alerts to warn drivers or occupants. These alerts allow, drivers or occupants, the ability to act and respond quickly to avoid or navigate through the emergency situation The term, "biophysical measurement" as used herein refers to measurement of physical changes that take place over a period of time related to a specific indicator that can be measured using an accepted measurement procedure. This provides statistically reliable data that can form the basis for measuring impact and change. Biophysical sensors monitor metabolites, pH, electrolytes, heart rate, arterial oxygenation, sweat rate, and skin temperature, etc., from biophysical signals. It may refer to any signal in living beings that can be continually measured and monitored. The term may also be referred to as bio-signal and is often used to refer to bioelectrical signals, but it may refer to both electrical and non-electrical signals. It may refer to time-varying signals, although spatial parameter variations are sometimes subsumed as well.

The term "rule-based system" as used herein comprises a set of facts of a scenario and a set of rules for how to deal with the set of facts comprising if and then statements, wherein the scenario is predefined in a system.

The term, "physiological characteristic" as used herein refers to a characteristic relating to physiology that is indicative of a healthy or normal functioning human. Example physiological characteristics include, but not limited to, heart rate, blood pressure, respiration, body temperature, etc.

The term, "bio signal" is any signal in human beings that can be continually measured or monitored. Example bio signals include electrocardiogram (ECG), electroencephalogram (EEG), electromyogram (EMG), electrooculogram (EOG), galvanic skin response, magneto encephalography (MEG), etc.

As used herein, a "bio-sensor" or "biosensor" is an analytical device, used for the detection of a chemical substance, that combines a biological component with a physicochemical detector. The sensitive biological element, e.g., tissue, microorganisms, organelles, cell receptors, enzymes, antibodies, nucleic acids, etc., is a biologically derived material or biomimetic component that interacts with, binds with, or recognizes the analyte under study. The biosensor may include pulse oximeter, heart rate sensor, ECG sensor, skin sensors, temperature sensor, blood pressure sensor, impedance sensor etc. In an embodiment, the biosensor includes a biometric device. The biometric device uses automated methods of verifying or recognizing the identity of a living person based on a physiological or behavioral characteristic. These characteristics include fingerprints, facial images, iris, and voice recognition. Information generated or received by the sensors and biosensor may be communicated to the on-board computer or the mobile device for use in autonomous vehicle operation.

The term "occupant" as used herein, refers to a passenger in the vehicle and it includes the driver. Passenger and occupant are used interchangeably and refer to a person in the vehicle during a ride.

The term "nearby vehicle" as used herein refers to surrounding vehicles of the user's vehicle and is within reach of at least a communication range of the user's vehicle wherein the communication range is defined as the maximum distance where communication can exist between two antennas, one of which is user's vehicle antenna in a wireless network.

The term "maneuver" as used herein refers to carefully move, steer, or drive a vehicle, in order to move from one point to another point.

The term "first responder" as used herein refers to a person with specialized training who is among the first to arrive and provide assistance at the scene of an emergency, such as an accident. First responders typically include law enforcement officers, paramedics, Emergency Medical Technicians (EMT's) and firefighters. In some areas, emergency department personnel, such as nurses and doctors, are also required to respond to disasters and critical situations, designating them first responders. It may sometimes refer to a person who may be a doctor or nurse, may or may not be certified by law as first responder, but responds first to a message of the user's vehicle and can offer medical help due to their qualification.

The term "electronic health record system" or "(EHR) system" refers to electronic record of health-related information on an individual that can be created, gathered, managed, and consulted by authorized clinicians and staff within one health care organization. Health records from the EHR system are usually procured using third-party software suites.

The term "feature" as used herein in relation to machine learning and pattern recognition, represents or refers to an individual measurable property or characteristic of a phenomenon. Features are usually numeric, but structural features such as strings and graphs are used in syntactic pattern recognition. The concept of "feature" is related to that of explanatory variables used in statistical techniques such as linear regression.

The term "syntactic pattern recognition" or "structural pattern recognition" refers to a form of pattern recognition, in which each object can be represented by a variable-cardinality set of symbolic, nominal features. *Ibis* allows for representing pattern structures, considering more complex interrelationships between attributes than is possible in the case of flat, numerical feature vectors of fixed dimensionality, that are used in statistical classification. Syntactic pattern recognition can be used instead of statistical pattern recognition if there is clear structure in the patterns. One way to present such a structure is by means of strings of symbols from a formal language. In this case the differences in the structures of the classes are encoded as different grammars. An example of this would be diagnosis of the heart with ECG measurements. ECG waveforms can be approximated with diagonal and vertical line segments. If normal and unhealthy waveforms can be described as formal grammars, measured ECG signal can be classified as healthy or unhealthy by first describing it in terms of the basic line segments and then trying to parse the descriptions according to the grammars.

The term "application server" refers to a server that hosts applications or software that delivers a business application through a communication protocol. An application server framework is a service layer model. It includes software components available to a software developer through an application programming interface. It is system software that resides between the operating system (OS) on one side, the external resources such as a database management system (DBMS), communications and Internet services on another side, and the users' applications on the third side.

The term "cyber security" as used herein refers to application of technologies, processes, and controls to protect systems, networks, programs, devices, and data from cyber-attacks.

The term "cyber security module" as used herein refers to a module comprising application of technologies, processes, and controls to protect systems, networks, programs, devices and data from cyber-attacks and threats. It aims to reduce the risk of cyber-attacks and protect against the unauthorized exploitation of systems, networks, and technologies. It includes, but is not limited to, critical infrastructure security, application security, network security, cloud security, Internet of Things (IoT) security.

The term "encrypt" used herein refers to securing digital data using one or more mathematical techniques, along with a password or "key" used to decrypt the information. It refers to converting information or data into a code, especially to prevent unauthorized access. It may also refer to concealing information or data by converting it into a code. It may also be referred to as cipher, code, encipher, encode. A simple example is representing alphabets with numbers—say, 'A' is '01', 'B' is '02', and so on. For example, a message like "HELLO" will be encrypted as "0805121215," and this value will be transmitted over the network to the recipient(s).

The term "decrypt" used herein refers to the process of converting an encrypted message back to its original format. It is generally a reverse process of encryption. It decodes the encrypted information so that only an authorized user can decrypt the data because decryption requires a secret key or password. This term could be used to describe a method of unencrypting the data manually or unencrypting the data using the proper codes or keys.

The term "cyber security threat" used herein refers to any possible malicious attack that seeks to unlawfully access data, disrupt digital operations, or damage information. A malicious act includes but is not limited to damage data, steal data, or disrupt digital life in general. Cyber threats include, but are not limited to, malware, spyware, phishing attacks, ransomware, zero-day exploits, trojans, advanced persistent threats, wiper attacks, data manipulation, data destruction, rogue software, malvertising, unpatched software, computer viruses, man-in-the-middle attacks, data breaches, Denial of Service (DoS) attacks, and other attack vectors.

The term "hash value" used herein can be thought of as fingerprints for files. The contents of a file are processed through a cryptographic algorithm, and a unique numerical value, the hash value, is produced that identifies the contents of the file. If the contents are modified in any way, the value of the hash will also change significantly. Example algorithms used to produce hash values: the Message Digest-5 (MD5) algorithm and Secure Hash Algorithm-1 (SHA1).

The term "integrity check" as used herein refers to the checking for accuracy and consistency of system related files, data, etc. It may be performed using checking tools that can detect whether any critical system files have been changed, thus enabling the system administrator to look for unauthorized alteration of the system. For example, data integrity corresponds to the quality of data in the databases and to the level by which users examine data quality, integrity, and reliability. Data integrity checks verify that the data in the database is accurate, and functions as expected within a given application.

The term "alarm" as used herein refers to a trigger when a component in a system or the system fails or does not perform as expected. The system may enter an alarm state when a certain event occurs. An alarm indication signal is a visual signal to indicate the alarm state. For example, when a cyber security threat is detected, a system administrator may be alerted via sound alarm, a message, a glowing LED, a pop-up window, etc. Alarm indication signal may be reported downstream from a detecting device, to prevent adverse situations or cascading effects.

The term "in communication with" as used herein, refers to any coupling, connection, or interaction using electrical signals to exchange information or data, using any system, hardware, software, protocol, or format, regardless of whether the exchange occurs wirelessly or over a wired connection.

As used herein, the term "cryptographic protocol" is also known as security protocol or encryption protocol. It is an abstract or concrete protocol that performs a security-related function and applies cryptographic methods often as sequences of cryptographic primitives. A protocol describes how the algorithms should be used. A sufficiently detailed protocol includes details about data structures and representations, at which point it can be used to implement multiple, interoperable versions of a program. Cryptographic protocols are widely used for secure application-level data transport. A cryptographic protocol usually incorporates at least some of these aspects: key agreement or establishment, entity authentication, symmetric encryption, and message authentication material construction, secured application-level data transport, non-repudiation methods, secret sharing methods, and secure multi-party computation. Hashing algorithms may be used to verify the integrity of data. Secure Socket Layer (SSL) and Transport Layer Security (TLS), the successor to SSL, are cryptographic protocols that may be used by networking switches to secure data communications over a network.

As used herein, the term "network" may include the Internet, a local area network, a wide area network, or combinations thereof. The network may include one or more networks or communication systems, such as the Internet, the telephone system, satellite networks, cable television networks, and various other private and public networks. In addition, the connections may include wired connections (such as wires, cables, fiber optic lines, etc.), wireless connections, or combinations thereof. Furthermore, although not shown, other computers, systems, devices, and networks may also be connected to the network. Network refers to any set of devices or subsystems connected by links joining (directly or indirectly) a set of terminal nodes sharing resources located on or provided by network nodes. The computers use common communication protocols over digital interconnections to communicate with each other. For example, subsystems may comprise the cloud. Cloud refers to servers that are accessed over the Internet, and the software and databases that run on those servers.

When a passenger, such as a child in the rear seat, encounters a health issue, it is very difficult for the driver to understand what to do until they have a chance to pull over and get out of the vehicle and examine the passenger themselves. The problem is many times it may take several minutes before the driver can safely pull over and examine the passenger and contact the first responders. It would be beneficial if a system can monitor the vital signs of a passenger and identify that a passenger has encountered a health issue and immediately start assisting the driver.

Presented herein are embodiments of systems, devices, processes, data structures, user interfaces, etc. The embodiments may relate to an automobile and/or an automobile environment. The automobile environment can include systems associated with the automobile and devices or other systems in communication with the automobile and/or automobile systems. Furthermore, the systems can relate to communications systems and/or devices and may be capable of communicating with other devices and/or to an individual or group of individuals. Further, the systems can receive user input in unique ways. The overall design and functionality of the systems provide for an enhanced user experience making the automobile more useful and more efficient. As described herein, the automobile systems may be electrical, mechanical, electro-mechanical, software-based, and/or combinations thereof.

In an aspect, when the passenger has encountered a health issue in addition to assisting the driver to pull over safely to the side of the road and call the first responder, the system can go through the emergency contacts identified in the electronic device of the driver and send text messages notifying of an emergency. These actions are useful to notify a spouse or a family doctor that the passenger has encountered such a health issue.

Figure 1B:
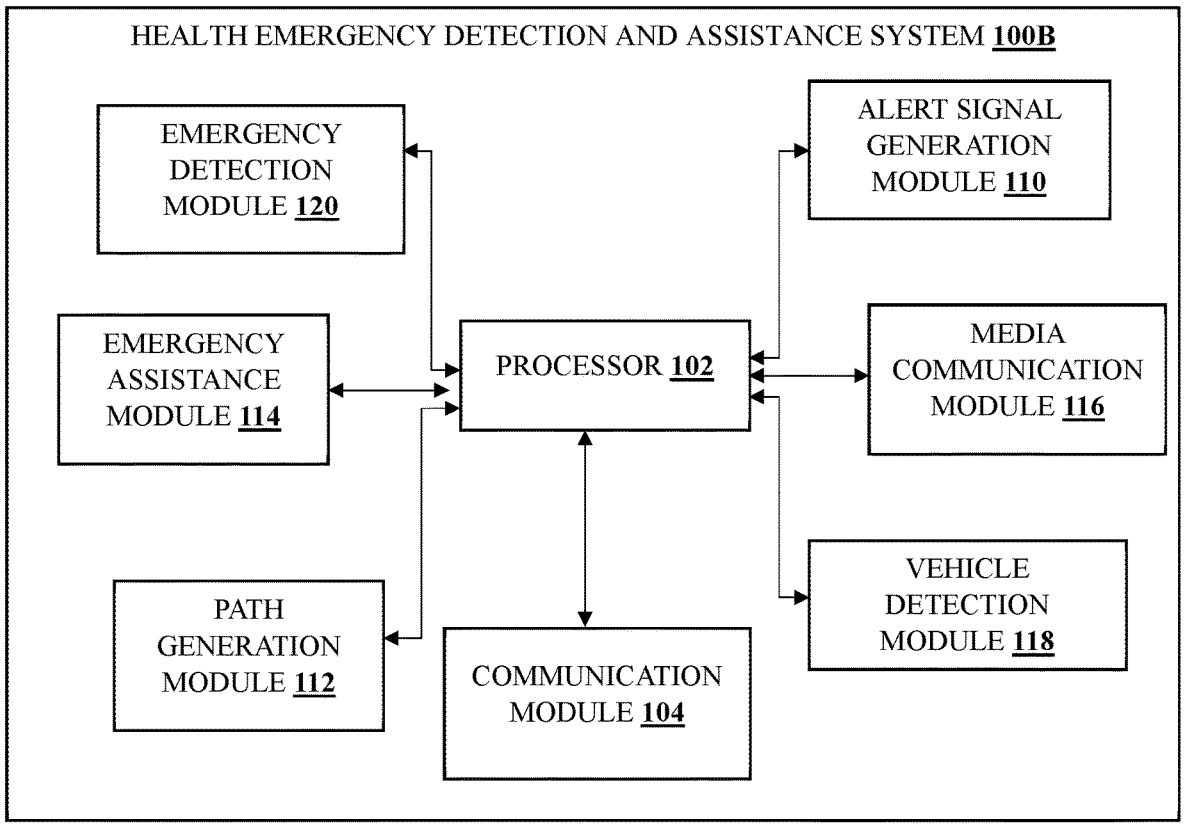
FIG. 1B shows a block diagram of various components of a system for monitoring a health emergency of a passenger of a vehicle and assisting in pull over of the vehicle and contacting with the emergency contact of the passenger according to an embodiment of the disclosure.

FIGS. 1A and 1B show a block diagram of various components of a system for monitoring a health emergency of a passenger of a vehicle and assisting in pull over of the vehicle and contact with the emergency contact of the passenger according to an embodiment. The system 100A may comprise a processor 102, communication module 104, sensor 106 and memory 108 as shown in FIG. 1A. In an embodiment, the processor can include a plurality of processors. The system 100B may comprise different modules or subsystems, as shown in FIG. 1B which are communicatively coupled, such as emergency detection module 120, alert signal generation module 110, vehicle detection module 118, communication module 104, path generation module 112, emergency assistance module 114, and media communication module 116. In an embodiment, all the modules may be configured into a single module or may comprise separate modules.

Figure 1C:
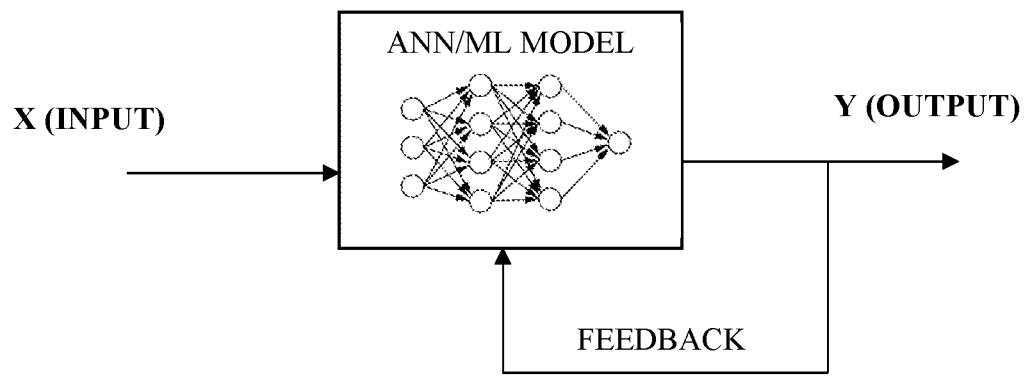
FIG. 1C shows a structure of the neural network/machine learning model with a feedback loop.

FIG. 1C shows a structure of the neural network/machine learning model with a feedback loop. Artificial neural networks (ANNs) model comprises an input layer, one or more hidden layers, and an output layer. Each node, or artificial neuron, connects to another and has an associated weight and threshold. If the output of any individual node is above the specified threshold value, that node is activated, sending data to the next layer of the network. Otherwise, no data is passed to the next layer of the network. A machine learning model or an ANN model may be trained on a set of data to take a request in the form of input data, make a prediction on that input data, and then provide a response. The model may learn from the data. Learning can be supervised learning and/or unsupervised learning and may be based on different scenarios and with different datasets. Supervised learning comprises logic using at least one of a decision tree, logistic regression, support vector machines. Unsupervised learning comprises logic using at least one of a k-means clustering, a hierarchical clustering, a hidden Markov model, and an apriori algorithm. The output layer may predict or detect a health issue and the severity of the health issue based on the input data.

In an embodiment, ANN's may be a Deep-Neural Network (DNN), which is a multilayer tandem neural network comprising Artificial Neural Networks (ANN), Convolution Neural Networks (CNN) and Recurrent Neural Networks (RNN) that can recognize features from inputs, do an expert review, and perform actions that require predictions, creative thinking, and analytics. In an embodiment, ANNs may be Recurrent Neural Network (RNN), which is a type of Artificial Neural Networks (ANN), which uses sequential data or time series data. Deep learning algorithms are commonly used for ordinal or temporal problems, such as language translation, Natural Language Processing (NLP), speech recognition, and image recognition, etc. Like feedforward and convolutional neural networks (CNNs), recurrent neural networks utilize training data to learn. They are distinguished by their "memory" as they take information from prior input via a feedback loop to influence the current input and output. An output from the output layer in a neural network model is fed back to the model through the feedback. The variations of weights in the hidden layer(s) are adjusted to fit the expected outputs better while training the model. This will allow the model to provide results with far fewer mistakes.

The neural network is featured with the feedback loop to adjust the system output dynamically as it learns from the new data. In machine learning, backpropagation and feedback loops are used to train an AI model and continuously improve it upon usage. As the incoming data that the model receives increases, there are more opportunities for the model to learn from the data. The feedback loops, or backpropagation algorithms, identify inconsistencies and feed the corrected information back into the model as an input.

Even though the AI/ML model is trained well, with large sets of labelled data and concepts, after a while, the models' performance may decline while adding new, unlabelled input due to many reasons which include, but not limited to, concept drift, recall precision degradation due to drifting away from true positives, and data drift over time. A feedback loop to the model keeps the AI results accurate and ensures that the model maintains its performance and improvement, even when new unlabelled data is assimilated. A feedback loop refers to the process by which an AI model's predicted output is reused to train new versions of the model.

Initially, when the AI/ML model is trained, a few labelled samples comprising both positive and negative examples of the concepts (for e.g., health issues) are used that are meant for the model to learn. Afterward, the model is tested using unlabelled data. By using, for example, deep learning and neural networks, the model can then make predictions on whether the desired concept/s (for e.g., detection of health issue) are in unlabelled images. Each image is given a probability score where higher scores represent a higher level of confidence in the models' predictions. Where a model gives an image a high probability score, it is auto-labelled with the predicted concept. However, in the cases where the model returns a low probability score, this input may be sent to a controller (may be a human moderator) which verifies and, as necessary, corrects the result. The human moderator may be used only in exception cases. The feedback loop feeds labelled data, auto-labelled or controller-verified, back to the model dynamically and is used as training data so that the system can improve its predictions in real-time and dynamically.

Figure 1D:
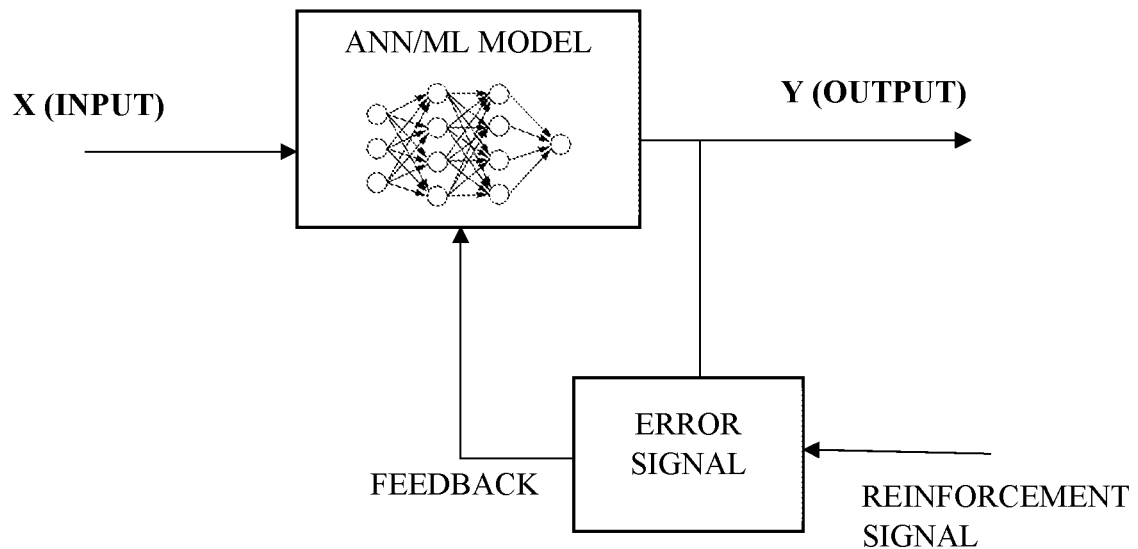
FIG. 1D shows a structure of the neural network/machine learning model with reinforcement learning.

FIG. 1D shows a structure of the neural network/machine learning model with reinforcement learning. The network receives feedback from authorized networked environments. Though the system is similar to supervised learning, the feedback obtained in this case is evaluative not instructive, which means there is no teacher as in supervised learning. After receiving the feedback, the network performs adjustments of the weights to get better predictions in the future. Machine learning techniques, like deep learning, allow models to take labeled training data and learn to recognize those concepts in subsequent data and images. The model may be fed with new data for testing, hence by feeding the model with data it has already predicted over, the training gets reinforced. If the machine learning model has a feedback loop, the learning is further reinforced with a reward for each true positive of the output of the system. Feedback loops ensure that AI results do not stagnate. By incorporating a feedback loop, the model output keeps improving dynamically and over usage/time.

Figure 2:
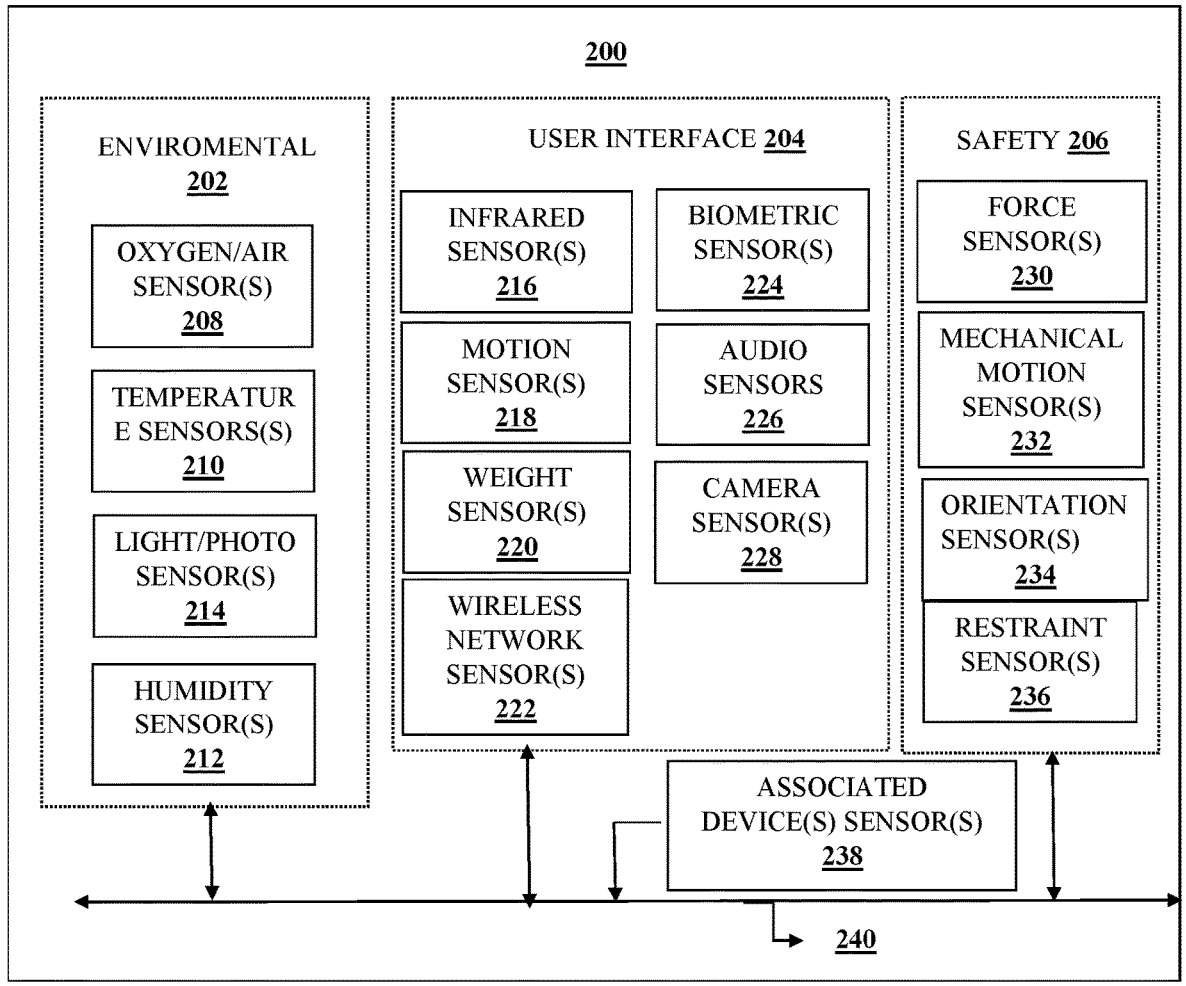
FIG. 2 is a block diagram of interior sensors for a vehicle according to an embodiment of the disclosure.
Figure 3:
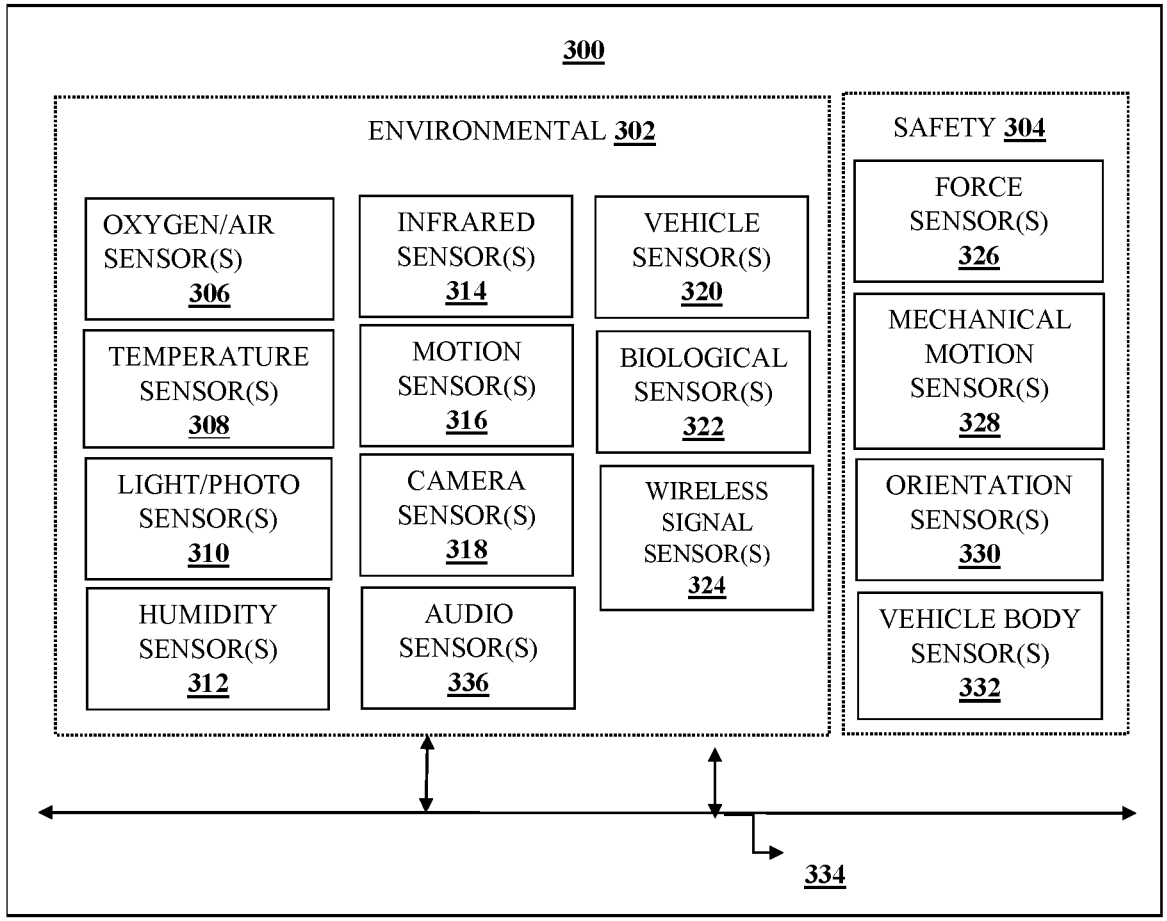
FIG. 3 is a block diagram of exterior sensors for a vehicle according to an embodiment of the disclosure.

FIGS. 2 and 3 show block diagrams of various sensors that may be associated with a vehicle. Although depicted as interior and exterior sensors, it should be appreciated that any of the one or more of the sensors shown may be used in both the interior space and the exterior space of the vehicle. Moreover, sensors having the same symbol or name may include the same, or substantially the same, functionality as those sensors described elsewhere in the present disclosure. Further, although the various sensors are depicted in conjunction with specific groups (e.g., environmental 202, user interface 204, safety 206, etc.) the sensors should not be limited to the groups in which they appear. In other words, the sensors may be associated with other groups or combinations of groups and/or disassociated from one or more of the groups shown. The sensors as disclosed herein may communicate with each other, the system, and/or the vehicle via one or more communications channel(s) 240.

FIG. 2 is a block diagram of an embodiment of interior sensors 200 for a vehicle. The interior sensors 200 may be arranged into one or more groups, based at least partially on the function of the interior sensors 200. The interior space of a vehicle may include an environmental group 202, a user interface group 204, and a safety group 206. Additionally, or alternatively, there may be sensors associated with various devices inside the vehicle (such as smart phones, tablets, mobile computers, etc.)

The environmental group 202 may comprise sensors configured to collect data relating to the internal environment of a vehicle. Examples of environmental sensors associated with the environmental group 202 may include, but are not limited to, oxygen/air sensors 208, temperature sensors 210, humidity sensors 212, light/photo sensors 214, and more. The oxygen/air sensors 208 may be configured to detect a quality of the air in the interior space of the vehicle (e.g., ratios and/or types of gasses comprising the air inside the vehicle, dangerous gas levels, safe gas levels, etc.). Temperature sensors 210 may be configured to detect temperature readings of one or more objects, passengers and/or areas of a vehicle. Humidity sensors 212 may detect an amount of water vapor present in the air inside the vehicle. The light/photo sensors 214 can detect an amount of light present in the vehicle. Further, the light/photo sensors 214 may be configured to detect various levels of light intensity associated with light in the vehicle.

The user interface group 204 may comprise sensors configured to collect data relating to one or more passengers in a vehicle. As can be appreciated, the user interface group 204 may include sensors that are configured to collect data from passengers in one or more areas and zones of the vehicle. For example, each area and/or zone of the vehicle may include one or more of the sensors in the user interface group 204. Examples of user interface sensors associated with the user interface group 204 may include, but are not limited to, infrared sensors 216, motion sensors 218, weight sensors 220, wireless network sensors 222, biometric sensors 224, camera (or image) sensors 228, audio sensors 226, and more.

Infrared sensors 216 may be used to measure IR light irradiating from at least one surface, passenger, or other object in the vehicle. Among other things, the Infrared sensors 216 may be used to measure temperatures, form images (especially in low light conditions), identify passenger, and even detect motion in the vehicle.

Weight sensors 220 may be employed to collect data relating to objects and/or passengers in various areas of the vehicle. In some cases, the weight sensors 220 may be included in the seats and/or floor of a vehicle.

Optionally, the vehicle may include a wireless network sensor 222. This sensor 222 may be configured to detect one or more wireless network(s) inside the vehicle. Examples of wireless networks may include, but are not limited to, wireless communications utilizing Bluetooth®, Wi-Fi™, ZigBee, IEEE 802.11, and other wireless technology standards. For example, a mobile hotspot may be detected inside the vehicle via the wireless network sensor 222. In this case, the vehicle may determine to utilize and/or share the mobile hotspot detected via/with one or more other devices and/or components associated with the vehicle.

Biometric sensors 756 may be employed to identify and/or record characteristics associated with a passenger. It is anticipated that biometric sensors 756 can include at least one of image sensors, IR sensors, fingerprint readers, weight sensors, load cells, force transducers, heart rate monitors, blood pressure monitors, and the like as provided herein.

The camera sensors 228 may record still images, video, and/or combinations thereof. The audio sensors 226 may be configured to receive audio input from a passenger of the vehicle. The audio input from a passenger may correspond to voice commands, conversations detected in the vehicle, phone calls made in the vehicle, and/or other audible expressions made in the vehicle.

The safety group 206 may comprise sensors configured to collect data relating to the safety of a passenger and/or one or more components of a vehicle. The vehicle may be subdivided into areas and/or zones in an interior space of a vehicle where each area and/or zone may include one or more of the safety sensors provided herein. Examples of safety sensors associated with the safety group 206 may include, but are not limited to, force sensors 230, mechanical motion sensors 232, orientation sensors 234, restraint sensors 236, and more.

The force sensors 230 may include one or more sensors inside the vehicle configured to detect a force observed in the vehicle. One example of a force sensor 230 may include a force transducer that converts measured forces (e.g., force, weight, pressure, etc.) into output signals.

Mechanical motion sensors 232 may correspond to encoders, accelerometers, damped masses, and the like. Optionally, the mechanical motion sensors 232 may be adapted to measure the force of gravity (i.e., G-force) as observed inside the vehicle. Measuring the G-force observed inside a vehicle can provide valuable information related to a vehicle's acceleration, deceleration, collisions, and/or forces that may have been suffered by one or more passengers in the vehicle. As can be appreciated, the mechanical motion sensors 232 can be located in an interior space or an exterior of the vehicle.

Orientation sensors 234 can include accelerometers, gyroscopes, magnetic sensors, and the like that are configured to detect an orientation associated with the vehicle. Similar to the mechanical motion sensors 232, the orientation sensors 234 can be located in an interior space or an exterior of the vehicle.

The restraint sensors 236 may correspond to sensors associated with one or more restraint devices and/or systems in a vehicle. Seatbelts and airbags are examples of restraint devices and/or systems. As can be appreciated, the restraint devices and/or systems may be associated with one or more sensors that are configured to detect a state of the device/system. The state may include extension, engagement, retraction, disengagement, deployment, and/or other electrical or mechanical conditions associated with the device/system.

The associated device sensors 238 can include any sensors that are associated with a device in the vehicle. As previously stated, typical devices may include smart phones, tablets, laptops, mobile computers, and the like. It is an aspect of the present disclosure that one or more of these associated device sensors 238 may be used by one or more subsystems of the system.

In FIG. 3, a block diagram of an embodiment of exterior sensors 300 for a vehicle is shown. The exterior sensors may include sensors that are identical, or substantially similar, to those previously disclosed in conjunction with the interior sensors of FIG. 2. Optionally, the exterior sensors 300 may be configured to collect data relating to one or more conditions, objects, passengers, and other events that are external to the interior space of the vehicle. For instance, the oxygen/air sensors 208 may measure a quality and/or composition of the air outside of a vehicle. As another example, the motion sensors 218 may detect motion outside of a vehicle.

The external environmental group 302 may comprise sensors configured to collect data relating to the external environment of a vehicle. In addition to including one or more of the sensors previously described, the external environmental group 302 may include additional sensors, such as vehicle sensors 320, biological sensors, and wireless signal sensors 324. Optionally, the vehicle sensors 320 may include one or more of RF sensors, IR sensors, image sensors, and the like to detect vehicles, people, hazards, etc. that are in an environment exterior to the vehicle. Additionally, or alternatively, the vehicle sensors 320 can provide distance/directional information relating to a distance (e.g., distance from the vehicle to the detected object) and/or a direction (e.g., direction of travel, etc.) associated with the detected object.

The biological sensors 322 may determine whether one or more biological entities (e.g., an animal, a person, a passenger, etc.) is in an external environment of the vehicle. Additionally, or alternatively, the biological sensors 322 may provide distance information relating to a distance of the biological entity from the vehicle. Biological sensors 322 may include at least one of RF sensors, IR sensors, image sensors and the like that are configured to detect biological entities. For example, an IR sensor may be used to determine that an object, or biological entity, has a specific temperature, temperature pattern, or heat signature. Continuing this example, a comparison of the determined heat signature may be compared to known heat signatures associated with recognized biological entities (e.g., based on shape, locations of temperature, and combinations thereof, etc.) to determine whether the heat signature is associated with a biological entity or an inanimate, or non-biological, object.

The wireless signal sensors 324 may include one or more sensors configured to receive wireless signals from signal sources such as Wi-Fi™ hotspots, cell towers, roadside beacons, other electronic roadside devices, and satellite positioning systems. Optionally, the wireless signal sensors 324 may detect wireless signals from one or more of a mobile phone, mobile computer, keyless entry device, RFID device, near field communications (NFC) device, and the like.

The external safety group 304 may comprise sensors configured to collect data relating to the safety of a passenger and/or one or more components of a vehicle. Examples of safety sensors associated with the external safety group 304 may include, but are not limited to, force sensors 326, mechanical motion sensors 328, orientation sensors 330, vehicle body sensors 332, and more. Optionally, the exterior safety sensors 304 may be configured to collect data relating to one or more conditions, objects, vehicle components, and other events that are external to the vehicle. For instance, the force sensors 326 in the external safety group 304 may detect and/or record force information associated with the outside of a vehicle. For instance, if an object strikes the exterior of the vehicle, the force sensors 326 from the exterior safety group 304 may determine a magnitude, location, and/or time associated with the strike.

The vehicle may include a number of vehicle body sensors 332. The vehicle body sensors 332 may be configured to measure characteristics associated with the body (e.g., body panels, components, chassis, windows, etc.) of a vehicle. For example, two vehicle body sensors 332, including a first body sensor and a second body sensor, may be located at some distance apart. Continuing this example, the first body sensor may be configured to send an electrical signal across the body of the vehicle to the second body sensor, or vice versa. Upon receiving the electrical signal from the first body sensor, the second body sensor may record a detected current, voltage, resistance, and/or combinations thereof associated with the received electrical signal. Values (e.g., current, voltage, resistance, etc.) for the sent and received electrical signal may be stored in a memory. These values can be compared to determine whether subsequent electrical signals sent and received between vehicle body sensors 332 deviate from the stored values. When the subsequent signal values deviate from the stored values, the difference may serve to indicate damage and/or loss of a body component. Additionally, or alternatively, the deviation may indicate a problem with the vehicle body sensors 332. The vehicle body sensors 332 may communicate with each other, a vehicle control system, and/or systems of the vehicle system via a communications channel 334. Although described using electrical signals, it should be appreciated that alternative embodiments of the vehicle body sensors 332 may use sound waves and/or light to perform a similar function.

In an embodiment, the sensor comprises at least one of an electroencephalogram (EEG) system, an ultrasound transducer, a heart rate monitor, a breathing monitor, a pulse rate monitor, a body motion monitoring system, a brain wave monitoring system, a facial expression recognizing system and an eye monitoring system.

In an embodiment, the sensor includes a wearable device.

In an embodiment, the sensor includes a camera positioned inside the vehicle that is configured to obtain images and videos of the passenger's health condition.

Emergency detection module 104 may comprise a health monitoring system. The passenger's state of health may be determined through image or video processing of the passenger's face and body. For example, the heartbeat of a human can be measured with video processing of the green channel for an RGB image sensor. In other examples, the passenger monitoring system may detect choking, coughing, sneezing, and sweating through similar video processing methodologies. Using combinations of these information streams, a sophisticated software algorithm may make predictions and suggest an emergency, a severity and a possible suggestion to address the emergency situation. Using machine learning and video processing, a passenger's weight trends and organ failure (e.g., kidney failure) may be determined through changes in the skin color, blotchiness, droopiness, and darkness. The facial expression feature is measured by picking up an image of the face of the passenger by the charge coupled device (CCD) camera or the like installed in the vehicle, pointed directly to the face of the passenger, and measures the facial expression feature amount of the passenger from the image data using the image processing technique. The camera may be installed on the interior side of the roof of the vehicle, which can have more than one degree of freedom to monitor the passenger from different angles. In an embodiment, there may be a plurality of cameras monitoring the passenger from different angles.

In an embodiment, it is a system for detecting if a vehicle passenger is experiencing a problematic health situation, which may be an emergency situation, and responding to those situations. In the system, sensors in a vehicle monitor, record, and/or detect physiological characteristics of a passenger of the vehicle. Additionally, environmental sensors monitor, record, and/or detect environmental characteristics of the vehicle itself. By detecting the physiological characteristics of the vehicle passenger, receiving physiological characteristic measurements, and using machine learning, the system can determine a baseline for each physiological characteristic corresponding to a specific vehicle passenger (e.g., a driver of the vehicle). The system can then compare newly received physiological characteristic measurements with the baseline for that particular physiological characteristic to determine whether the newly received physiological characteristic measurement is not within the limits of the baseline.

In some embodiments, passenger health data may include biophysical data of the passenger. In some embodiments, biophysical data of the passenger may be collected or otherwise monitored through one or more biophysical sensors, such as sensors implementable in a vehicle. Sensors may be disposed of at various locations in or on the vehicle, in the vehicle seats, in the child vehicle seats, in the belts, on the steering wheel, mirrors, etc. In some embodiments, sensors may be in contact with or worn by the passenger to monitor or collect biophysical data. For example, a sensor may be a heart rate sensor disposed on a seatbelt of the vehicle and configured to provide a heart rate reading of the heart rate of the passenger as biophysical data when the seatbelt is engaged with or worn by the driver. As another example, a sensor may be a blood pressure sensor disposed on an armrest of a vehicle seat of the vehicle and configured to provide a blood pressure reading of the blood pressure of the passenger when the passenger places his or her arm on the armrest. Likewise, sensors may include a thermometer, a respiratory rate monitor, a blood glucose monitor, or the like, to provide biophysical data of the passenger, such as a body temperature reading, a respiration reading, a blood glucose reading, or the like. In some embodiments, sensors may include a video camera or an infrared image sensor to capture video(s) and/or image(s) of the passenger and provide imagery data indicative of a body movement, an eye movement, or a facial distortion of the passenger as biophysical data. Using facial detection or other image processing techniques, a processor may analyze the video(s) or image(s) and accordingly determine the emergency situation and its severity. For example, sensors may include a video camera, and processors may analyze a video received from the video camera and find that the passenger may have passed out in the vehicle seat when the passenger's movement is not detected. Processor may determine this condition to be very likely an emergency related to the health of the passenger, of which the emergency severity may be given a scale of 1-10, where 10 being very severe or life threatening.

In some embodiments, passenger health data may also include a medical history of the passenger, and/or a set of emergency-triggering thresholds of the passenger. Medical history may include information on one or more pre-existing medical condition(s) of the passenger, such as hypertension, asthma, or diabetes for example. The medical history of the passenger may be transmitted from a remote location, such as a cloud server of a medical service provider and received by the emergency system through a communication device thereof. Alternatively, the medical history of the passenger may be readily stored in the memory of the system. Processors may analyze the medical history of the passenger while determining emergency severity. For example, processors may analyze medical history and find that the passenger is a diabetic, and thus may monitor a blood glucose reading of biophysical data, received from a blood glucose sensor among sensors. In some embodiments, passenger wellness data of the passenger may include a set of emergency-triggering thresholds associated with the specific passenger, which may be provided by a medical doctor or medical service provider. For example, in the case of the diabetic passenger, the set of emergency-triggering thresholds may include a "life-threatening" low-bound blood glucose threshold of 80 mg/dl (milligram per deciliter), and a "non-life-threatening" low-bound blood glucose threshold of 100 mg/dl, as dictated by a medical service provider. In this example, a processor may determine that there is no potential emergency incident should the blood glucose sensor report a reading higher than 100 mg/dl. Moreover, processor may determine that there is a potential emergency incident of "life-threatening" severity should the blood glucose sensor report a reading lower than 80 mg/dl. Furthermore, the processor may determine that there is a potential emergency incident of "less-than-life-threatening" severity should the blood glucose sensor report a reading between 80 mg/dl and 100 mg/dl.

Additionally, or alternatively, in some embodiments, processors may determine emergency severity based on a correlation among passenger health data, vehicle motion data, driver health data and/or driver distraction or distress data. The vehicle motion data may include various motion parameters of the vehicle, such as speed of the vehicle, moving direction of the vehicle, and/or distance between the vehicle and a nearby object. Motion data of the vehicle may be collected or otherwise monitored through one or more motion detectors disposed in or on the vehicle. The motion detectors may include one or more of a speedometer, a global positioning device, a video camera, and a proximity sensor.

Alert signal generation module 110 may generate an alert when an emergency is detected. It may further control information displayed on the infotainment system, a rear display, and a front display. Display may be designed to display information to different intended users, depending on the positioning of the users and the other vehicles. In an embodiment, display data may include stored display patterns, sequences, colors, text, animation, or other data to be displayed on the front and/or rear display. The display data may also include algorithms for generating content and controlling how it is displayed. The generated content, for example, may be personalized based on information received from the system, any third-party system, the vehicle, and the computing devices. In an embodiment, there may be indicators outside the vehicle to inform that an emergency is happening, for example a light around the registration plate, a light around the windows of the car. Each color may indicate a type of emergency. For example, a red or blue light may be configured to indicate an emergency in the health of the vehicle.

Vehicle detection module 118 may include vision-based vehicle detection. Vision sensors may be coupled with methods such as deep learning methods with Region-based Convolutional Neural Networks (R-CNNs) or Fast R-CNN's. In an embodiment, a radar system is used for object-detection which uses radio waves to determine the range, direction, or speed of objects. It may be configured to detect motor vehicles. The radar antenna transmits pulses of radio waves which bounce off any object in their path. The object returns a small part of the wave's energy to the receiver antenna which is usually located at the same site as the transmitter. In an embodiment, the sensor that detects the nearby vehicles comprises at least one of an infrared sensor, an ultrasonic sensor, a radar sensor, a passive acoustic detector array, a piezoelectric sensor, a photoelectric sensor and a camera.

In an embodiment, icons on a graphical user interface (GUI) or display of the infotainment system of a computer system are re-arranged based on a priority score of the content of the message. The processor tracks the messages that need to be displayed at a given time and generates a priority score, wherein the priority score is determined based on the action that needs to be taken by the user, the time available before the user input is needed, content of the message to be displayed, criticality of the user's input/action that needs to be taken, the sequence of the message or messages that need to be displayed and executed, and the safety of the overall scenario. For example, in case of a health emergency, the messages in queue for displaying could be an emergency signal, type of emergency, intimation that an alert is provided to the nearby vehicles, instructing a path for the driver to pull over, calling the emergency services, etc. In all these messages that need a driver's attention, a priority score is provided based on the actions that need to be taken by the user, the time available for the user to receive the displayed message and react with an action, the content of the message, criticality of the user's input/action, sequence of the messages that need to be executed, and safety of the overall scenario. Considering the above example, the message that intimates the user/driver that an alert has been provided to nearby vehicles may be of lower priority as compared to instructing the path for the driver to pull over. Therefore, the pull over directions for the path message takes priority and takes such a place on the display (example, center of the display) which can grab the users' attention immediately. The priority of the messages are evaluated dynamically as the situation is evolving and thus the display icons, positions, and sizes of the text or icon on the display are changed in real time and dynamically. In an embodiment, more than one message is displayed and highlighted as per the situation and the user's actions. Further, while pulling over, if an unsafe scenario is found for example, a car is changing lanes which may obstruct the user's vehicle, the message dynamically changes and warns the driver about the developing scenario.

Communication module 104, enables in-vehicle communication, communication with other vehicles, infrastructure, grid etc., using Vehicle to network (V2N), Vehicle to infrastructure (V2I), Vehicle to vehicle (V2V), Vehicle to cloud (V2C), Vehicle to pedestrian (V2P), Vehicle to device (V2D), Vehicle to grid (V2G) communication systems. For example, if a child stopped breathing, for some reason, during a trip in a vehicle or car, first, the system detects that a health emergency has happened. Then, the system notifies nearby or surrounding cars or vehicles using the car's communication module. The car or vehicle uses, for example, a message protocol, a message that goes to the other vehicles via a broadcast. In an embodiment, the broadcast message comprises the information of the emergency. In an embodiment, the broadcast message comprises the information of the emergency and the location of the car. In an embodiment, the broadcast message comprises the information of the emergency, the location of the vehicle relative to the vehicle receiving the broadcast message and a pull over target location. In an embodiment, a graphic can be created from the message received on the receiver's car. In an embodiment, the broadcast message is sent by the vehicle communication module as soon as the emergency is detected. In another embodiment, the system waits a certain period of time and then broadcasts the message. In another embodiment, the system provides an option to the passenger whether it can broadcast an emergency message. For example, a vehicle which is next to the vehicle experiencing an emergency situation, receives an alert which specifies, the vehicle is in an emergency and is trying to pull over. The vehicle experiencing an emergency may actually provide the location of the vehicle. Based on the broadcast message, the receiver may actually slow down. In an embodiment, the system will automatically access the control of the nearby vehicle and slow or speed the car/vehicle as needed. In case of an autonomous driving vehicle, the vehicle may automatically slow down if it receives the broadcast emergency message. In an embodiment, the vehicle experiencing an emergency may automatically override the control of the autonomous vehicle to reduce the speed, change a lane, increase the speed or a combination thereof. In an embodiment, the system may alert nearby vehicles that there is an emergency in a vehicle and provide a relative location of the vehicle experiencing emergency to the nearby vehicles. The nearby vehicle passenger may voluntarily slow the car/vehicle as the vehicle experiencing an emergency is going to slow down and could actually come to a complete stop. The vehicle experiencing an emergency may send a broadcast to all the surrounding vehicles to let the vehicles know that the vehicle is in trouble. In an embodiment, the message comprises the type of emergency. Such a broadcast message will help nearby vehicles to assist the vehicle experiencing an emergency. In an embodiment, the message protocol comprises the type of emergency and a location of the vehicle. If there is a doctor in a nearby vehicle, they may realize the situation, and may try to pull over and assist the driver immediately so that the situation is handled as quickly as possible.

In an embodiment, the vehicle experiencing the emergency could control the speed of a nearby car. In an embodiment, the broadcast message is enabled in order to seek assistance from the other cars or to control the other cars automatically, without passenger intervention, so that the vehicle undergoing emergency can get the assistance as soon as possible. In an embodiment, if the nearby vehicle is in autonomous driving mode, the vehicle experiencing an emergency can broadcast a message to let the users in the autonomous vehicle know the emergency and could request the control or control the vehicle.

In an embodiment, the system is enabled for two-way communication. The system is sending a signal and then receiving a communication. In an embodiment, it could be a permission for an access to control the other vehicle. In another embodiment, it could be an incremental control. For example, an initial control of the speed up to 10 miles per hour, then an additional 10 miles per hour, and so on. In an embodiment, the vehicle experiencing the emergency may request or control for a complete stop. In another embodiment, the vehicle experiencing the emergency may request or control for a pull over of the nearby vehicle.

In one embodiment will be a broadcast message, wherein the broadcast comprises the location of the car. In another embodiment, the broadcast message comprises a type of alert, for example, a health alert from a health alert system. In an embodiment, maybe a request to return a message if there are medical personnel in the nearby cars. Then, the system receives the information from the nearby vehicle about the details of the car, its location, and the medical personnel name from the responder. In an embodiment, the communication is established between the first responder and the vehicle undergoing the emergency, and further information on identity of the medical personnel, specialization, hospital affiliation, of the first responder to the message, is sought. In an embodiment, the details are received and verified by the vehicle system or a third party.

In an embodiment, the health alert system or system provides the images of the person who is undergoing a medical emergency. In an embodiment, the information is provided after taking consent from the passenger of the vehicle.

In an embodiment, the vehicle undergoing an emergency can request the nearby vehicle to slow down. The vehicle undergoing an emergency, using its broadcast monitor, may identify that the nearby vehicle after slowing down is still too close. It may, as a response, send another request to the nearby vehicle to slow down even more. The system can actually continue sending a request to a nearby vehicle to slow down and relay what degree of control is sought from the nearby vehicle. The vehicle undergoing an emergency can request a nearby vehicle to slow down and the nearby vehicle will start slowing down. The system will gradually approximate, by using back and forth signaling that says slow down five miles and then request receipt of the current speed of the nearby vehicle. The system continues two-way communication to approximate or estimate how far the nearby vehicle is from the vehicle undergoing an emergency and how much the nearby vehicle needs to slow down. In an embodiment, the system forms a zone of influence based on a distance of the nearby vehicle. Depending on where the vehicles are, the system decides, based on different zones of influence, different instructions. In an embodiment, the system detects. or recognizes, different classes of actors to send a signal to. In an embodiment, the system has different rules to send a signal comprising a message that belongs to different classes of actors. For example, if there is an ambulance or a doctor, they would fall into one category of actors. The nearby cars and their drivers and passengers would be the general category, unless they respond that a passenger is a doctor, or it is an ambulance. In an embodiment, the signal and the message protocol are different for each zone and each actor. In an embodiment, the information of the actors can be provided by a third-party service.

As an example, considering distances in a heavy traffic situation, there is a doctor that responded about four cars behind the vehicle experiencing the emergency, then establish a vehicle-to-vehicle communication with the nearby vehicle carrying the doctor and the doctor can let the vehicle experiencing the emergency know that he is located about four cars behind. The doctor, in an embodiment, is referred to as a first responder, first class of a group of people that are first responders. First responders comprise a person, such as a police officer or an emergency medical technician (EMT), who is among those responsible for going immediately to the scene of an accident or emergency to provide assistance. There is a second class, which comprises doctors and healthcare professionals who are near the area. Then there is a third class, which are just normal or standard passengers. They are not going to be able to assist by providing medical care but they can assist by getting out of the way. In an embodiment, the first and second responders, when they receive a broadcast message of an emergency, can actually send information back to that car, letting the vehicle know that they are nearby by providing their location and asking the vehicle experiencing an emergency to pull over so they can assist. In an embodiment, credentials are transmitted so that a person is trustworthy and not a random person.

Path generation module 112 comprises hardware such as sensors, circuits and processors and software such as methods, programs, and algorithms, that would enable the computation and generation of a path from a current location to a second location while considering the surrounding dynamic environment. In an embodiment, the path generation module computes a path based on certain speed and location of the nearby vehicles, and the communication module communicates a request speed and/or course to the nearby vehicles so that the nearby vehicles can adjust their current speed to the requested speed and/or current course to the requested course to enable the vehicle experiencing an emergency situation to navigate through the traffic to a destination point.

The emergency assistance module 114 enables the system to automatically turn on hazard signal. Based on traffic conditions, reduce speed to allow the driver to pull over to a safe location. Based on a health alert, suggest nearest urgent care of a medical facility that can assist. Based on the health alert, automatically contact emergency services (911), and provide the location and health condition of the child or the passenger. Access medical records and provide them to medical professionals in the emergency care that was contacted. In an embodiment, the user would have to provide authorization before sharing the medical records.

In an embodiment, the system automatically switches on the hazard signal as soon as it detects an emergency. Once the hazard signal is switched on, based on traffic conditions, the car would help manage the traffic speeds and let the user's car reduce the speed, and allow the driver to pull over safely. In an embodiment, if a health emergency is happening, the system would automatically slow down the car and may enter into an autonomous mode. Further, based on the type of health alert and severity, the system can notify the nearest urgent care or medical facility that can assist. The nearest health facility may be the closest in terms of distance, time, or a medical center that has the required care facilities.

In an embodiment, the system would allow the driver to focus on getting the car off the road, or to the urgent care and at the same time, continue monitoring, and then decide whether a call for emergency services (911) is necessary. In an embodiment, the system monitors the driver's distress via health sensors in the driver's seat, steering wheel, and personal health wearables. Further the driver is monitored with camera and video. The features extracted from the health data, image data and video data are used to find whether the driver is in distress or having anxiety and are correlated with the passenger's health status and are used by the emergency assistance module 114 for deciding whether to pull over or continue to medical center, call emergency services or not.

The emergency assistance module 114 enables the system to automatically turn on hazard signal. Based on traffic conditions, reduce speed to allow the driver to pull over to a safe location. Based on a health alert, suggest nearest urgent care of a medical facility that can assist. Based on the health alert, automatically contact emergency services (911), and provide the location and health condition of the child or the passenger. Access medical records and provide them to medical professionals in the emergency care that was contacted. In an embodiment, the user would have to provide authorization before sharing the medical records.

In an embodiment, the system automatically switches on the hazard signal as soon as it detects an emergency. Once the hazard signal is switched on, based on traffic conditions, the car would help manage the traffic speeds and let the user's car reduce the speed, and allow the driver to pull over safely. In an embodiment, if a health emergency is happening, the system would automatically slow down the car and may enter into an autonomous mode. Further, based on the type of health alert and severity, the system can notify the nearest urgent care or medical facility that can assist. The nearest health facility may be the closest in terms of distance, time, or a medical center that has the required care facilities.

In an embodiment, the system would allow the driver to focus on getting the car off the road, or to the urgent care and at the same time, continue monitoring, and then decide whether a call for emergency services (911) is necessary. In an embodiment, the system monitors the driver's distress via health sensors in the driver's seat, steering wheel, and personal health wearables. Further the driver is monitored with camera and video. The features extracted from the health data, image data and video data are used to find whether the driver is in distress or having anxiety and are correlated with the passenger's health status and are used by the emergency assistance module 114 for deciding whether to pull over or continue to medical center, call emergency services or not.

Media communication module 116 comprises hardware such as an audio or video recorder and software such as methods, programs and algorithms that would enable recording the condition of the passenger. In an embodiment, the media communication module interacts with the first responder by sending and receiving the instruction from the first responder. In an embodiment, interaction with the first responder could be via wireless communication. The media communication module 116 may communicate with the various devices as provided herein. Optionally, the media communication module 116 can provide content, information, data, and/or media associated with the passenger of the vehicle to one or more devices such as mobile phones, a device that is located or associated with the vehicle, a wearable device that can include heart rate monitors, blood pressure monitors, glucose monitors, pedometers, movement sensors, wearable computers, and the like. Examples of wearable computers may be worn by the passenger and configured to measure passenger activity, determine energy spent based on the measured activity, track user sleep habits, determine user oxygen levels, monitor heart rate, provide alarm functions, and more. It is anticipated that the wearable devices can communicate with the processor via wireless communications channels or direct connection (e.g., where the device docks, or connects, with a USB port or similar interface of the vehicle).

Figure 4:
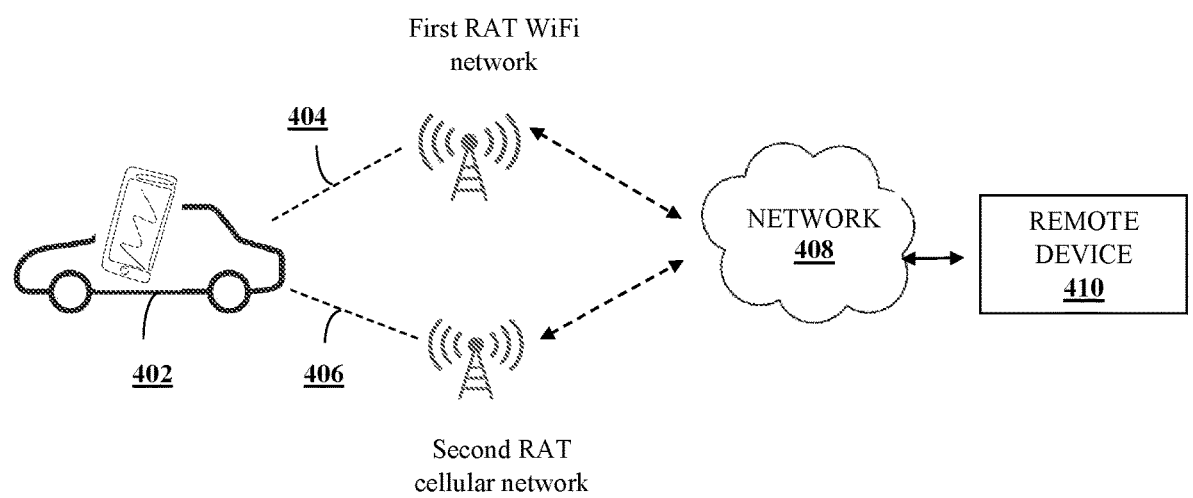
FIG. 4 illustrates an exemplary (and simplified) wireless communication scenario involving multiple communication systems according to an embodiment of the disclosure.

FIG. 4 illustrates an exemplary (and simplified) wireless communication scenario involving multiple communication systems. It is noted that the system of FIG. 4 is merely one example of a possible system, and embodiments may be implemented in any of various systems, as desired.

As shown, the exemplary wireless communication system includes a mobile device 402 in a vehicle communicating over a primary communication channel 404. In this example, the primary communication channel is a Wi-Fi® network Radio Access Technology (RAT), whereby the mobile device 402 communicates through a Wi-Fi® access point as shown. The mobile device 402 may also establish a secondary communication channel 406, e.g., in response to channel conditions of the primary communication channel 404, as discussed in more detail below. In this example, the secondary communication channel 406 is a cellular network RAT, whereby the mobile device 402 communicates through a cellular base station as shown. The mobile device 402 may communicate over one or both of the primary communication channel 404 and the secondary communication channel 406 to communicate with a remote device 410, which can include contact with emergency contacts such as family, family doctor, first responder, or emergency services. Additionally, note that the RATs shown in FIG. 4 are exemplary only, and that other combinations are envisioned, such as using multiple different cellular RATs, e.g., instead of or in addition to the Wi-Fi® RAT.

Note that FIG. 4 only illustrates one side of the communication scenario, that is, the side from the mobile device 402 to the network 408 (e.g., the Internet). The remote device 410 may similarly have one or more paths to the network 408 from its point of view, e.g., including Wi-Fi® and/or cellular networks, as desired. In one embodiment, a "channel" may be considered any end-to-end communication path between the mobile device 402 and the remote device 410 (e.g. and may be characterized or specified by pairs of addresses, e.g., IP address and port number combinations for the mobile device 402 and the remote device 410). For example, a primary channel (e.g., the channel 404) may involve the mobile communication device 402 communicating via Wi-Fi® to network 408 and the remote device 402 communicating via its own Wi-Fi® to the network 408. The secondary channel (e.g., channel 406) may involve the mobile communication device 402 communicating via a cellular RAT to the network 408 and the remote device 410 communicating via its own cellular RAT to the network 408. However, while these examples show a mirrored path on each side, the remote device 410 may use any RAT for each channel, as appropriate. For example, the remote device 410 may use Wi-Fi® communication for both the primary channel and the secondary channel. Alternatively, the remote device 410 may use a cellular RAT for the primary channel and Wi-Fi® for the secondary channel. In some embodiments, the "channel" may be at an application level, although other levels are also envisioned, such as lower levels.

As noted above, the mobile device 410 may be configured to communicate wirelessly using multiple radio access technologies (RATs). The mobile device 402 may be configured to communicate according to a Wi-Fi® RAT and/or one or more cellular RATs, e.g., such as communicating on both Wi-Fi® and cellular at the same time. For example, the mobile device 402 may be communicating on a primary communication channel (such as Wi-Fi*), and in response to detected degradation of the primary communication channel may establish a secondary communication channel (such as on cellular). The mobile device 402 may operate to dynamically establish and/or remove different primary and/or secondary communication channels as needed, e.g., to provide the best passenger experience while attempting to minimize cost.

In an embodiment, the mobile device comprises a passenger device for sending text or messages to emergency contacts notifying of an emergency. In an embodiment, the mobile device is for giving emergency calls to the emergency contacts. The emergency call can be made to a predefined emergency call destination or a standard set emergency call destination, such as the police, the fire department, a medical service, a special emergency call center, a security service, a designated service of the motor vehicle manufacturer or another, self-defined by the passenger emergency call destination. It includes the establishment of a data and/or voice connection. Thus. for example a voice connection can be established in which the passenger himself has the possibility of making a voice message, or automatic information can be given in the context of the emergency call, so that appropriate information is transmitted even if the passenger is at the time of the autonomous emergency call injured or ill or unable to speak. Additionally, or alternatively, a data connection with the emergency call destination can be set up, via which the passenger can in turn independently send data or be sent via the automatically appropriate information.

In an embodiment, the emergency call is accordingly in the simplest case via the processor in which the emergency call order is present, in particular preconfigured by the passenger, and is activated, and includes the transmission of predetermined data or voice messages between the processor and the emergency call destination. In this case, it is not necessary to involve the passenger themselves in the triggered emergency call, for example by talking to the emergency call destination, while still ensuring that the emergency call destination receives information about the emergency call situation. In further developments of the method, it is provided that the data and/or voice connection, in addition to or as an alternative to transmitted predetermined data or voice messages, gives the passenger the option for his/her own communication with the emergency call destination. In this case, the triggering of the emergency call to establish a data and/or voice connection with a telecommunication means to which the passenger has access. Examples of this are non-automotive telecommunications equipment such as mobile phones smart phones, portable computers that allow for example, phone calls, e-mail traffic or Internet telephony, or motor vehicle internal. i.e., permanently installed in the passengers vehicle telecommunication means such as vehicle telephones or Internet access via browser of a vehicle infotainment system.

Figure 5:
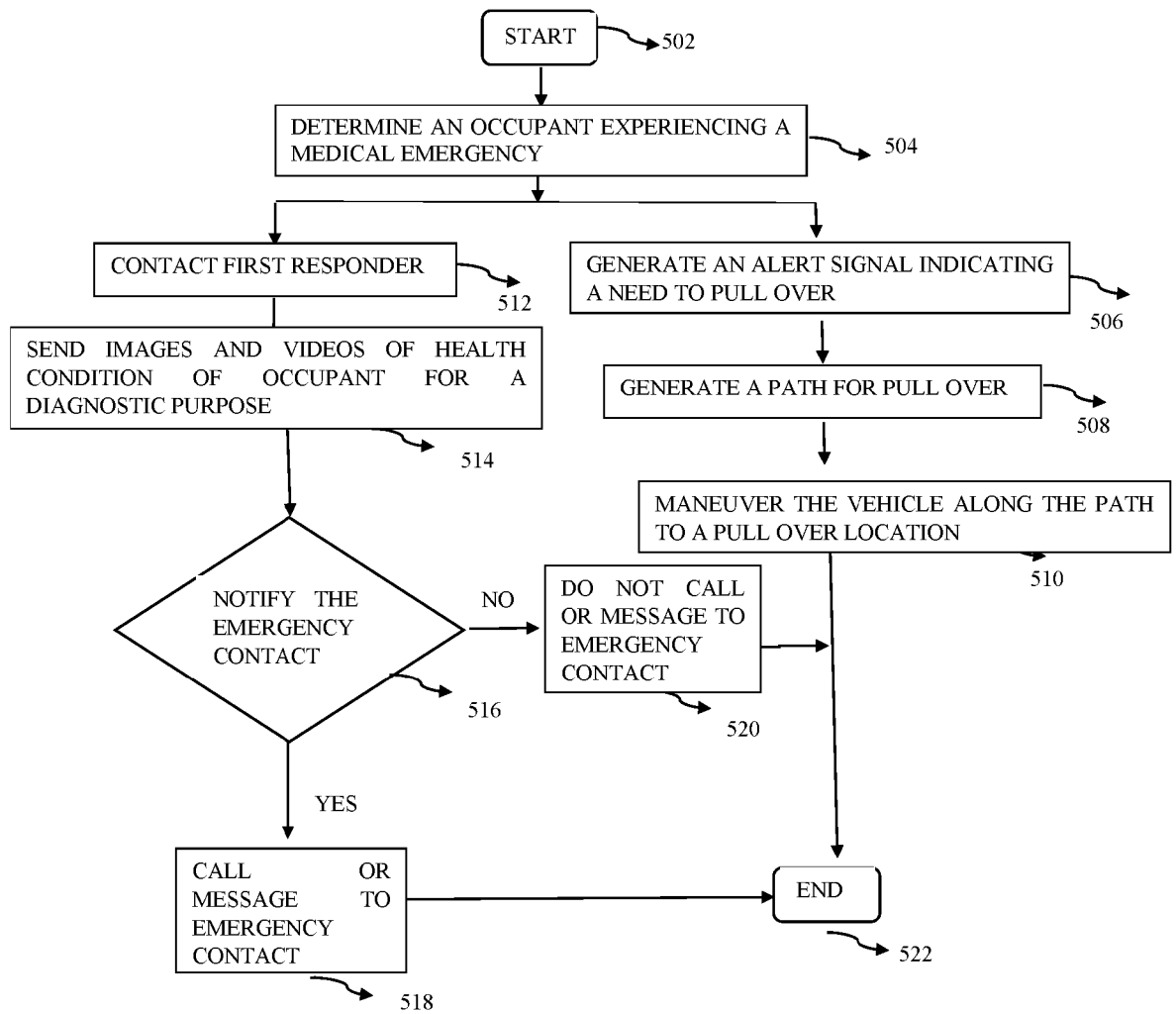
FIG. 5 is a process or flow diagram of a method according to an embodiment of the invention.

FIG. 5 is a flow diagram of a method according to an embodiment of the invention.

An embodiment of the method 500 for receiving input may be as shown in FIG. 5. A general order for the steps of the method 500 is shown in FIG. 5. Generally, the method 500 starts with a start operation 502 and ends with an end operation 522. The method 500 can include more or fewer steps or can arrange the order of the steps differently than those shown in FIG. 5. The method 500 can be executed as a set of computer-executable instructions executed by a computer system and encoded or stored on a computer readable medium.

At step 504, a passenger experienced a medical emergency which is identified by physiological state of the passenger from the sensor and prestored health levels of the passenger from the identified passenger profile from the database. After confirming the health emergency of a passenger, the vehicle generates an alert signal and indicates a need for pull over of the vehicle at step 506. At step 508, the vehicle generates a path for a pull over. At 510, the driver maneuvers the vehicle along the path to the pull over location. The location may be a hospital, police station, or side of the road. At step 512, the system automatically contacts a first responder by the processor via the communication module and provides location of the vehicle and health condition of the passenger of the vehicle. At step 514, a communication module transmits a signal of medical emergency, an image and a video of the health condition of the passenger to the first responder for a diagnostic purpose. At step 516, a notification or a message sent via the communication module to the emergency contact which comprises a detail of the occurrence of an emergency event in the vehicle and the location of the vehicle. Communication module may connect with the infotainment system of the vehicle which further sends a message to the emergency contact. The emergency contact comprises emergency services number, family or family doctor. If passenger is not willing to contact or notify the family member about the emergency event then at step 520, no notification will be sent to the family member and in the case of the passenger wanting to notify the family members then a message or call will be given to those family members contact at step 518.

Figure 6:
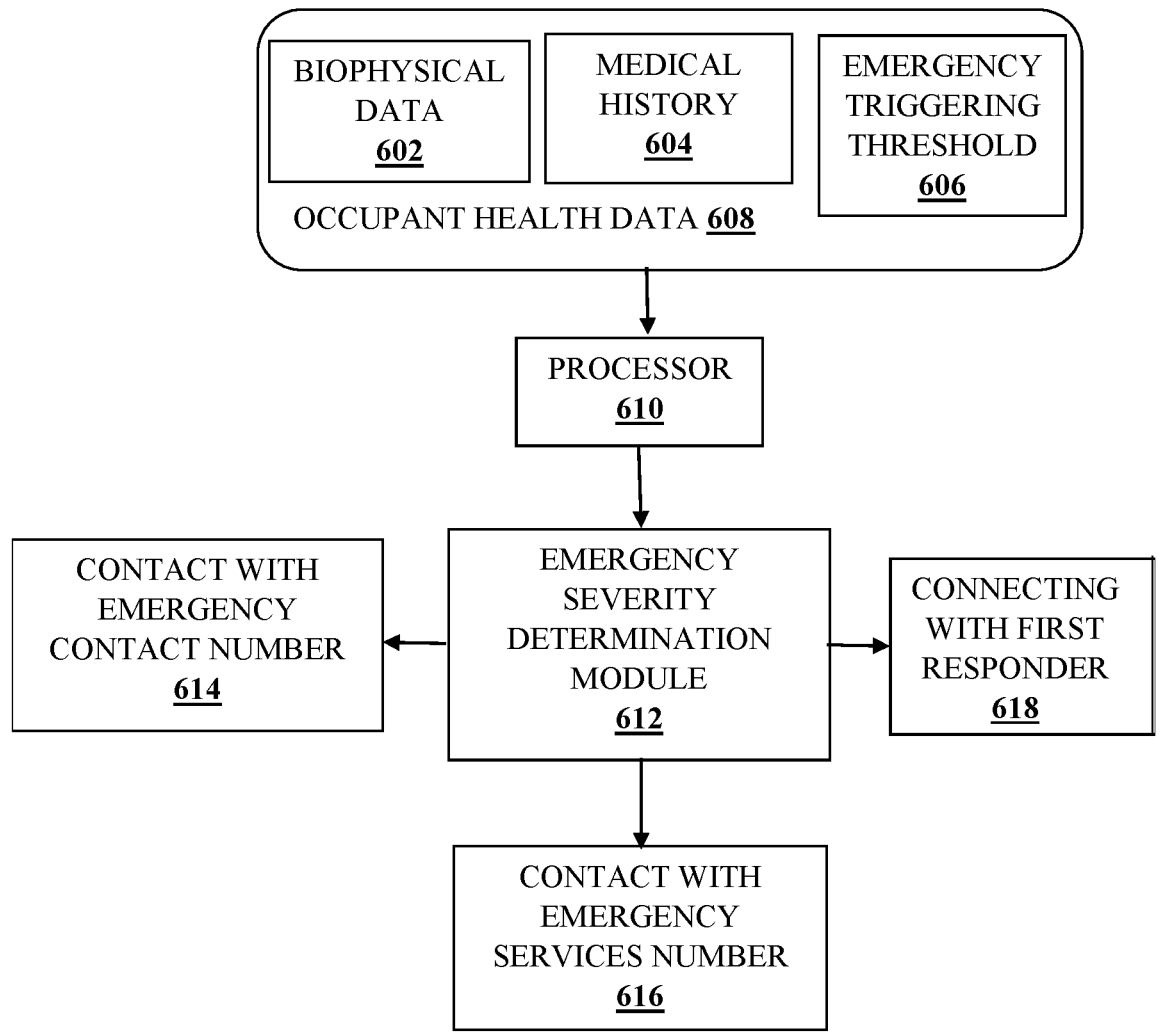
FIG. 6 depicts a data flow that includes various factors or types of information for determining a severity level of a possible sudden medical emergency (SME) incident and steps to be taken by the vehicle according to an embodiment of the disclosure.

Various information may be analyzed or otherwise utilized to determine whether a passenger of a vehicle may be subject to a sudden medical emergency (SME) incident Specifically, a figure of merit, "emergency seventy," is to be determined based on the various information regarding a potential SME incident of the passenger. FIG. 6 depicts a data flow that includes various factors or types of information for determining a severity level of a possible SME incident and steps to be taken by the system. A processor 610 may determine an emergency seventy determination module 612 using information such as passenger health data 608. Depending on how severe the possible SME may be, as indicated by emergency severity determination module 612, processor 610 may further determine a plan to assist the passenger during an emergency severity.

Referring to FIG. 6, processor 610 may be an example implementation of processor 610. Processor 610 may be implemented in the form of one or more integrated-circuit (IC) chips and any supporting electronics and may be installed in a control console of a vehicle. Processor 610 may be communicatively connected to various operational components of the vehicle to control or otherwise maneuver the vehicle to autonomously contact the emergency contact in accordance with the present disclosure.

The system 100 may include a memory 108 coupled to processor 610. Memory 108 may be configured to store data, firmware and software programs therein. For example, memory 108 may store health data of the passenger, which may include biophysical data 602, medical history 604, and/or a set of emergency-triggering thresholds 606 of the passenger.

In some embodiments, the system 100 may include a communication module 104 configured to wirelessly transmit and receive data. In some embodiments, communication module 104 may be configured to receive medical history 604 and/or emergency-triggering thresholds 606 as part of passenger health data 608. In some embodiments, communication module 104 may be configured to transmit biophysical data 602 collected by sensors 106 to an emergency service, a hospital, an ambulance, or a police department.

In some embodiments, the system may further include one or more processors, such as a processor, coupled to receive data on the one or more parameters from one or more sensors. In addition, the one or more processors may be further coupled to receive data from communication module 104. Processor 610 may receive health data 608 of the passenger. Processor 610 may also determine an emergency severity based on the passenger health data 608. Processor 610 may further determine a plan (614-618) based on the emergency seventy. A plan including (i) a generation of path for the pull over of that vehicle. (ii) contact first responder and provide location of the vehicle and health condition of the passenger, (iii) provide images and videos to the first responder for a diagnostic purpose. (iv) identify the emergency contact in the passenger device and contact to his/her family member including spouse/husband, family doctor and provide details about the occurrence of the emergency event in the vehicle and location of the vehicle as shown in FIG. 6.

In some embodiments, passenger health data 608 may include biophysical data 602 of the passenger. In some embodiments, biophysical data 602 of the passenger may be collected or otherwise monitored through one or more biophysical sensors, such as sensors in an emergency event in a vehicle. Sensors may be disposed at various locations in or on the vehicle. In some embodiments, sensors may be in contact with or worn by the passenger to monitor or collect biophysical data 602. For example, a sensor may be a heart rate sensor disposed on a seatbelt of the vehicle and configured to provide a heart rate reading of the heart rate of the passenger as biophysical data 602 when the seatbelt is engaged with or worn by the passenger. As another example, a sensor may be a blood pressure sensor disposed on an armrest of a passenger's seat of the vehicle and configured to provide a blood pressure reading of the blood pressure of the passenger as biophysical data 602 when the passenger places his or her arm on the armrest while traveling. Likewise, sensors may include a thermometer, a respiratory rate monitor, a blood glucose monitor, or the like, to provide biophysical data 602 of the passenger, such as a body temperature reading, a respiration reading, a blood glucose reading, or the like. In some embodiments, sensors may include a video camera or an infrared image sensor to capture video(s) and/or image(s) of the passenger and provide imagery data indicative of a body movement, an eye movement, or a facial distortion of the passenger as biophysical data 602. Using facial detection or other image processing techniques, a processor 610 may analyze the video(s) or image(s) and accordingly determine emergency severity by using emergency severity determination module 612 for a potential sudden medical emergency (SME). For example, sensors may include a video camera, and processor 610 may analyze a video received from the video camera and find that the driver may have undergone a medical emergency. Processor 610 may determine this condition to be very likely an SME incident, of which the emergency severity may be "life-threatening".

In some embodiments, passenger health data 608 may also include a medical history 604 of the passenger, and/or a set of emergency-triggering thresholds 606 of the passenger, as shown in FIG. 6. Medical history 604 may include information on one or more pre-existing medical condition(s) of the passenger, such as hypertension or diabetes for example Medical history 604 of the passenger may be transmitted from a remote location, such as a cloud server of a medical service provider and received by the system 100 through communication device 104 thereof. Alternatively, medical history 604 of the passenger may be readily stored in memory 108 of the system 100. Processor 610 of FIG. 6, or equivalently, processor 610, may analyze the medical history 604 of the passenger while determining emergency severity via emergency seventy determination module 612. For example, processor 610 may analyze medical history 604 and find that the passenger is a diabetic, and thus may monitor a blood glucose reading of biophysical data 602, received from a blood glucose sensor among sensors. In some embodiments, passenger health data 608 may include a set of emergency-triggering thresholds 606 associated with the specific passenger, which may be provided by a medical doctor or medical service provider. For example, in the case of the diabetic passenger, the set of emergency-triggering thresholds 606 may include a "life-threatening" low-bound blood glucose threshold of 80 mg/dl (milligram per deciliter), and a "non-life-threatening" low-bound blood glucose threshold of 100 mg/dl, as dictated by a medical service provider. In this example, processor 610 may determine that there is no potential SME incident should the blood glucose sensor report a reading higher than 100 mg/dl. Moreover, processor 610 may determine that there is a potential SME incident of "life-threatening" severity should the blood glucose sensor report a reading lower than 80 mg/dl. Furthermore, processor 610 may determine that there is a potential SME incident of "less-than-life-threatening" severity should the blood glucose sensor report a reading between 80 mg/dl and 100 mg/dl.

Figure 7A:
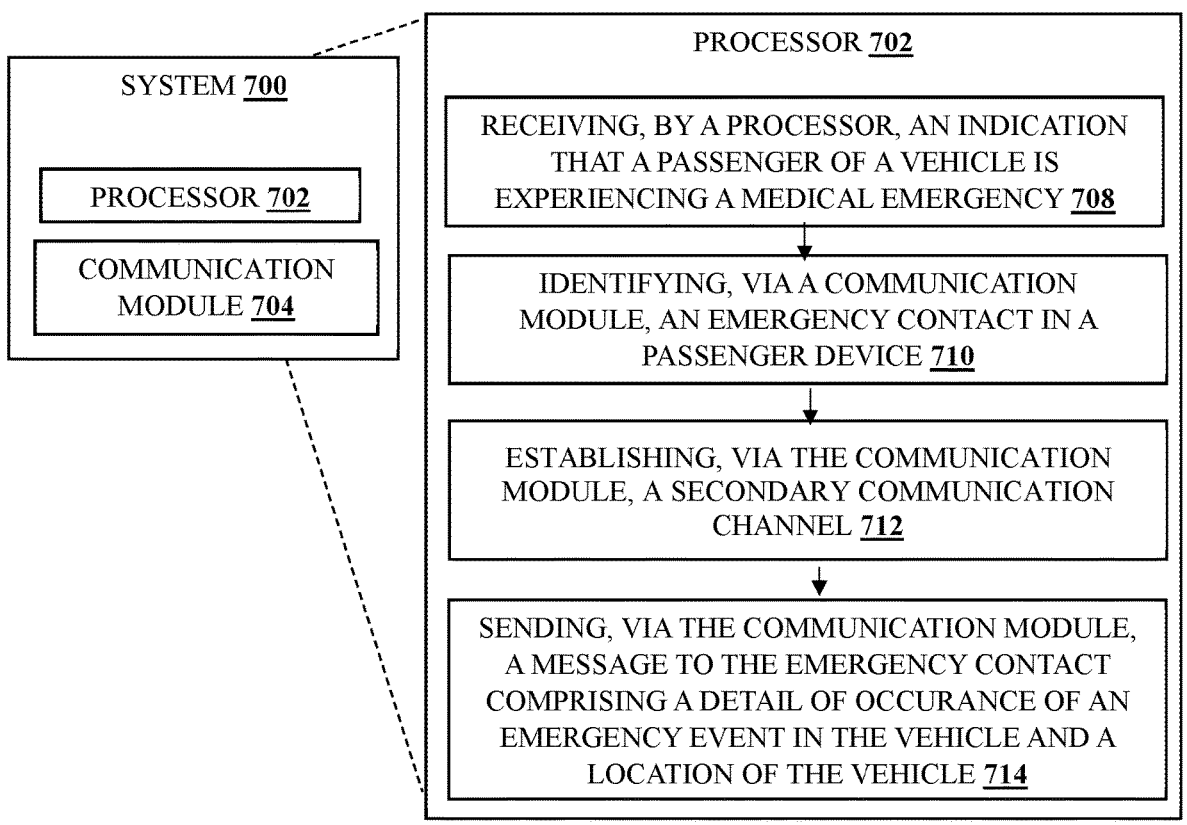
FIG. 7A is an illustration of a system for identifying and assisting the passenger undergoing emergency health condition in the vehicle before arriving at the location.

FIG. 7A is an illustration of a system for identifying and assisting the passenger undergoing emergency health condition in the vehicle before arriving at the location. The system 700 comprises processor 702 and communication module 704, wherein the system 700 performs following functions which comprises the following steps:

Step 708: receiving, by a processor, an indication that a passenger of a vehicle is experiencing a medical emergency;

Step 710: identifying, via the communication module, an emergency contact in a passenger device;

Step 712: establishing, via the communication module, a secondary communication channel; and Step 714: sending, via the communication module, a message to the emergency contact comprising a detail of the occurrence of an emergency event in the vehicle and a location of the vehicle.

In an embodiment, the system further comprises a sensor and a memory.

In an embodiment, the sensor comprises at least one of a heart rate sensor, a blood pressure sensor, a thermometer, a respiratory rate monitor, a video camera, and an infrared image sensor.

In an embodiment, the communication module is enabled for at least one of a vehicle-to-vehicle communication, vehicle-to-infrastructure communication, and vehicle-to-everything communication.

In an embodiment, the communication module connects to an infotainment system, wherein the infotainment system automatically sends any one of message and calls the emergency contact.

In an embodiment, the medical emergency is due to a health condition of the passenger in the vehicle.

In an embodiment, the health condition of the passenger is due to at least one of a choking, a fever, a change in vital signs indicating a problem in physiological function of the passenger.

Figure 7B:
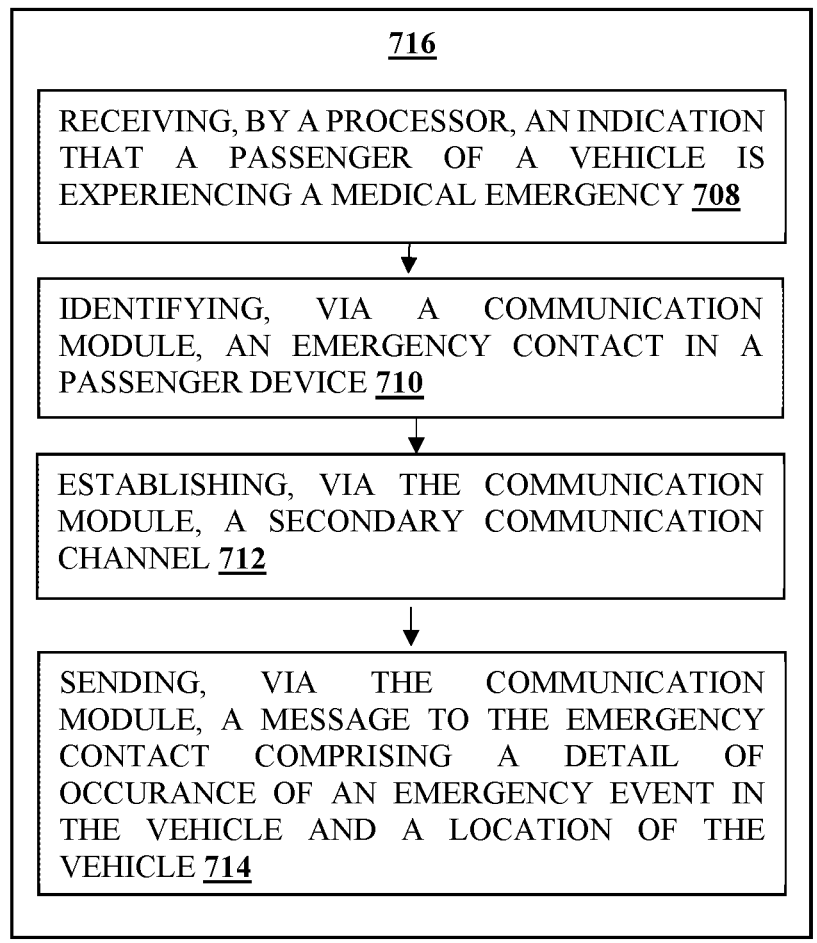
FIG. 7B is an illustration of a method for identifying and assisting the passenger undergoing emergency health condition in the vehicle before arriving at the location.

FIG. 7B is an illustration of a method for identifying and assisting the passenger undergoing emergency health conditions in the vehicle before arriving at the location. The comprises the following steps:
- Step 708: receiving, by a processor, an indication that a passenger of a vehicle is experiencing a medical emergency;
- Step 710: identifying, via the communication module, an emergency contact in a passenger device;
- Step 712: establishing, via the communication module, a secondary communication channel; and
- Step 714: sending, via the communication module, a message to the emergency contact comprising a detail of the occurrence of an emergency event in the vehicle and a location of the vehicle.

In an embodiment, the communication module is enabled for at least one of a vehicle-to-vehicle communication, vehicle-to-infrastructure communication, and vehicle-to-everything communication.

In an embodiment, the communication module connects to an infotainment system, wherein the infotainment system automatically sends a message or call to the emergency contact.

In an embodiment, the medical emergency is due to a health condition of the passenger in the vehicle.

In an embodiment, the health condition of the passenger is due to at least one of a choking, a fever, a change in vital signs indicating a problem in physiological function of the passenger.

In an embodiment, the first responder comprises at least one of a doctor and healthcare provider.

In an embodiment, location comprises a police station.

In an embodiment, location comprises a hospital.

In an embodiment, location can be an emergency stop location.

Figure 7C:
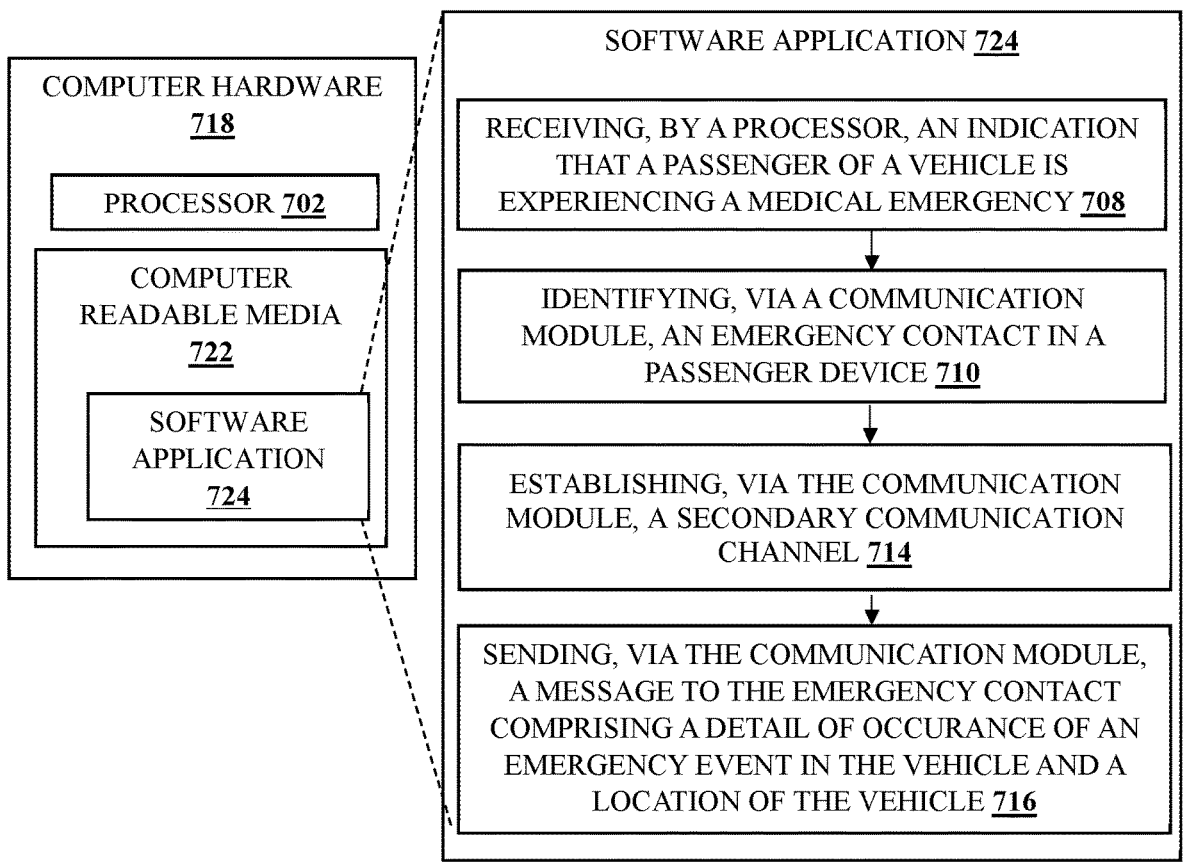
FIG. 7C is an illustration of non-transitory computer readable medium having stored thereon instructions executable by a computer system to perform operations.

FIG. 7C is an illustration of non-transitory computer readable medium having stored thereon instructions executable by a computer system to perform operations. Computer hardware 718 comprises processor 702, computer readable media 722 wherein the computer readable media comprises software application 724. Software application 724 performs the following functions:
- Step 708: receiving, by a processor, an indication that a passenger of a vehicle is experiencing a medical emergency;
- Step 710: identifying, via the communication module, an emergency contact in a passenger device;
- Step 712: establishing, via the communication module, a secondary communication channel; and
- Step 714: sending, via the communication module, a message to the emergency contact comprising a detail of the occurrence of an emergency event in the vehicle and a location of the vehicle.

Figure 8A:
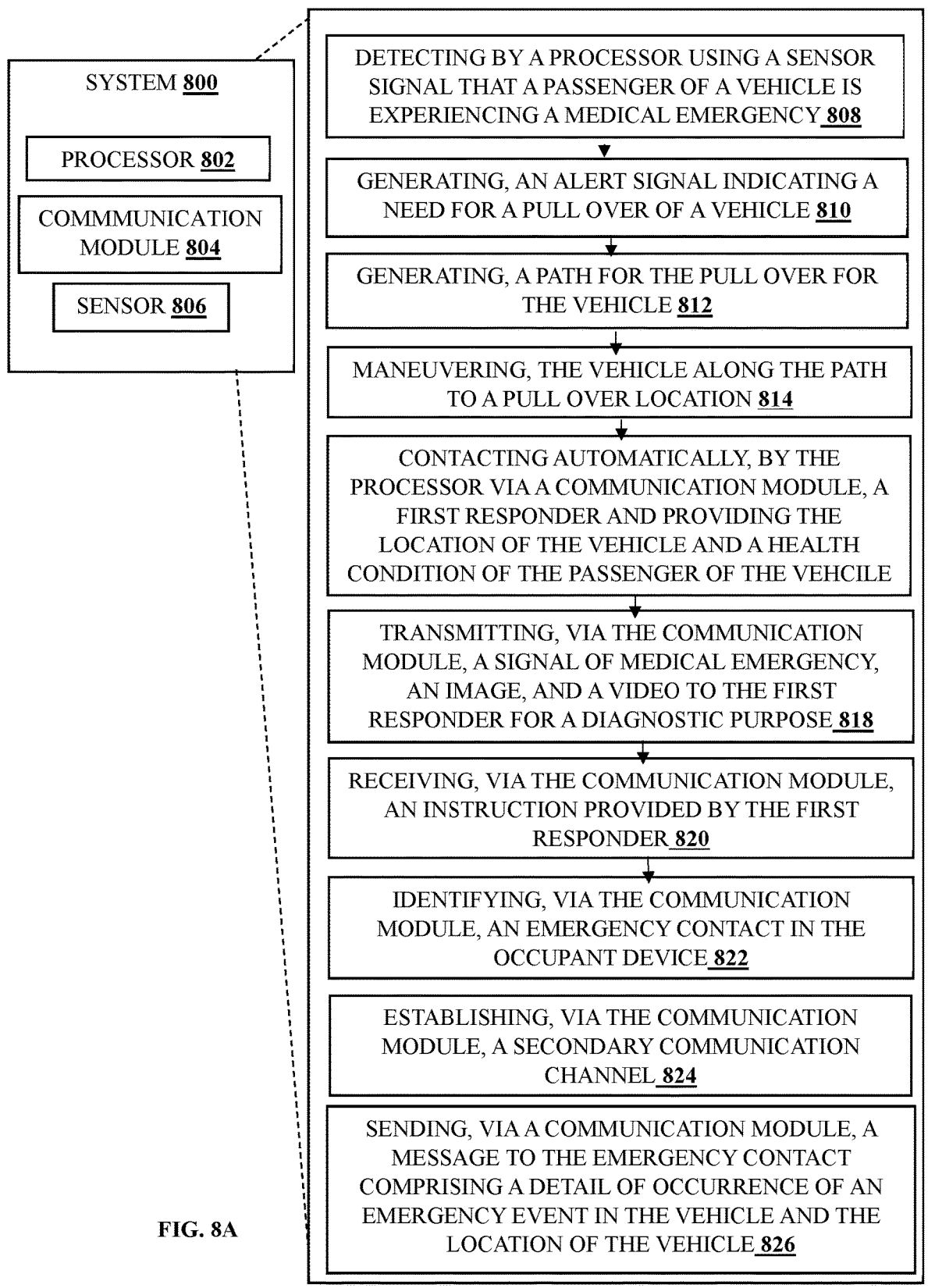
FIG. 8A is an illustration of a system for identifying and assisting the passenger undergoing emergency health condition in the vehicle before arriving at the location.

FIG. 8A is an illustration of a system for identifying and assisting the passenger undergoing emergency health condition in the vehicle before arriving at the location. The system 800 comprises processor 802, communication module 804, and sensor 806. The system 800 performs following functions:
- Step 808: detecting, by a processor using a sensor signal that a passenger of a vehicle is experiencing a medical emergency;
- Step 810: generating, an alert signal indicating a need for a pull over of the vehicle;
- Step 812: generating, a path for the pull over for the vehicle;
- Step 814: maneuvering, the vehicle along the path to a pull over location;
- Step 816: contacting automatically, by the processor via a communication module, a first responder and providing the location of the vehicle and a health condition of the passenger of the vehicle; and
- Step 818: transmitting, via the communication module, a signal of medical emergency, an image, and a video to the first responder for a diagnostic purpose;
- Step 820: receiving, via the communication module, an instruction provided by the first responder;
- Step 822: identifying, via the communication module, an emergency contact in a passenger device;
- Step 824: establishing, via the communication module, a secondary communication channel; and
- Step 826: sending, via a communication module, a message to the emergency contact comprising a detail of occurrence of an emergency event in the vehicle and the location of the vehicle.

Figure 8B:
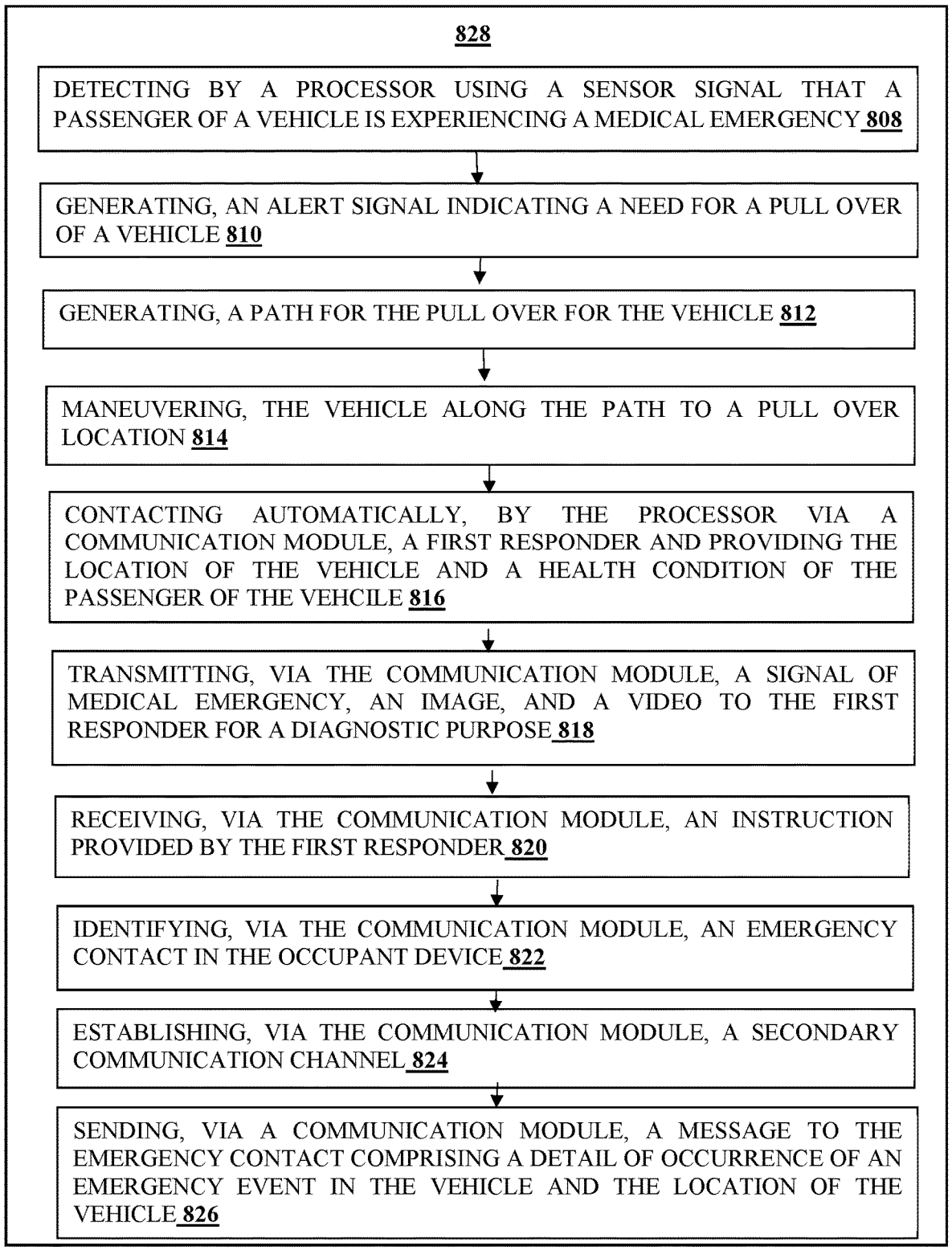
FIG. 8B is an illustration of a method for identifying and assisting the passenger undergoing emergency health condition in the vehicle before arriving at the location.

FIG. 8B is an illustration of a method to treat for identifying and assisting the passenger undergoing an emergency health condition in the vehicle before arriving at the location. The method comprises the following steps:
- Step 808: detecting, by a processor using a sensor signal that a passenger of a vehicle is experiencing a medical emergency;
- Step 810: generating, an alert signal indicating a need for a pull over of the vehicle;
- Step 812: generating, a path for the pull over for the vehicle;
- Step 814: maneuvering, the vehicle along the path to a pull over location;
- Step 816: contacting automatically, by the processor via a communication module, a first responder and providing the location of the vehicle and a health condition of the passenger of the vehicle; and
- Step 818: transmitting, via the communication module, a signal of medical emergency, an image, and a video to the first responder for a diagnostic purpose;
- Step 820: receiving, via the communication module, an instruction provided by the first responder;
- Step 822: identifying, via the communication module, an emergency contact in a passenger device;
- Step 824: establishing, via the communication module, a secondary communication channel; and
- Step 826: sending, via a communication module, a message to the emergency contact comprising a detail of occurrence of an emergency event in the vehicle and the location of the vehicle.

In an embodiment, the communication module is enabled for at least one of a vehicle-to-vehicle communication, vehicle-to-infrastructure communication, and vehicle-to-everything communication.

In an embodiment, the communication module connects to an infotainment system, wherein the infotainment system automatically sends a message or call to the emergency contact.

In an embodiment, the medical emergency is due to a health condition of the passenger in the vehicle.

In an embodiment, the health condition of the passenger is due to at least one of a choking, a fever, a change in vital signs indicating a problem in physiological function of the passenger.

In an embodiment, the first responder comprises at least one of a doctor and healthcare provider.

In an embodiment, location comprises a police station.

In an embodiment, location comprises a hospital.

In an embodiment, location can be an emergency stop location.

Figure 8C:
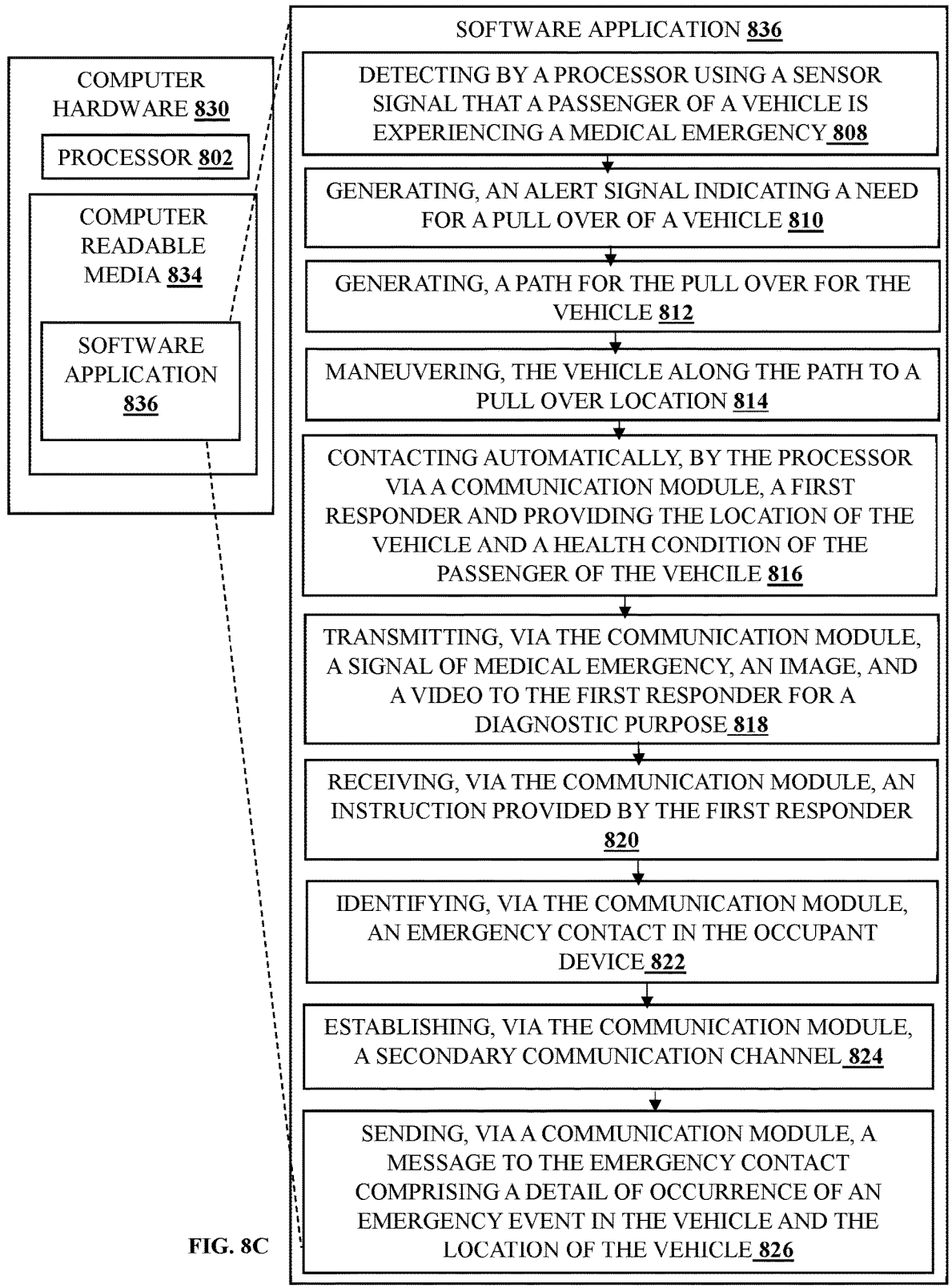
FIG. 8C is an illustration of non-transitory computer readable medium having stored thereon instructions executable by a computer system to perform operations.

FIG. 8C is an illustration of non-transitory computer readable medium having stored thereon instructions executable by a computer system to perform operations. Computer hardware 830 comprises processor 802 and computer readable media 834. Computer readable media 834 comprises software application 836 which performs the following functions:

Step 808: detecting, by a processor using a sensor signal that a passenger of a vehicle is experiencing a medical emergency;

Step 810: generating, an alert signal indicating a need for a pull over of the vehicle;

Step 812: generating, a path for the pull over for the vehicle;

Step 814: maneuvering, the vehicle along the path to a pull over location;

Step 816: contacting automatically, by the processor via a communication module, a first responder and providing the location of the vehicle and a health condition of the passenger of the vehicle; and Step 818: transmitting, via the communication module, a signal of medical emergency, an image, and a video to the first responder for a diagnostic purpose;

Step 820: receiving, via the communication module, an instruction provided by the first responder;

Step 822: identifying, via the communication module, an emergency contact in a passenger device;

Step 824: establishing, via the communication module, a secondary communication channel; and Step 826: sending, via a communication module, a message to the emergency contact comprising a detail of occurrence of an emergency event in the vehicle and the location of the vehicle.

Figure 9A:
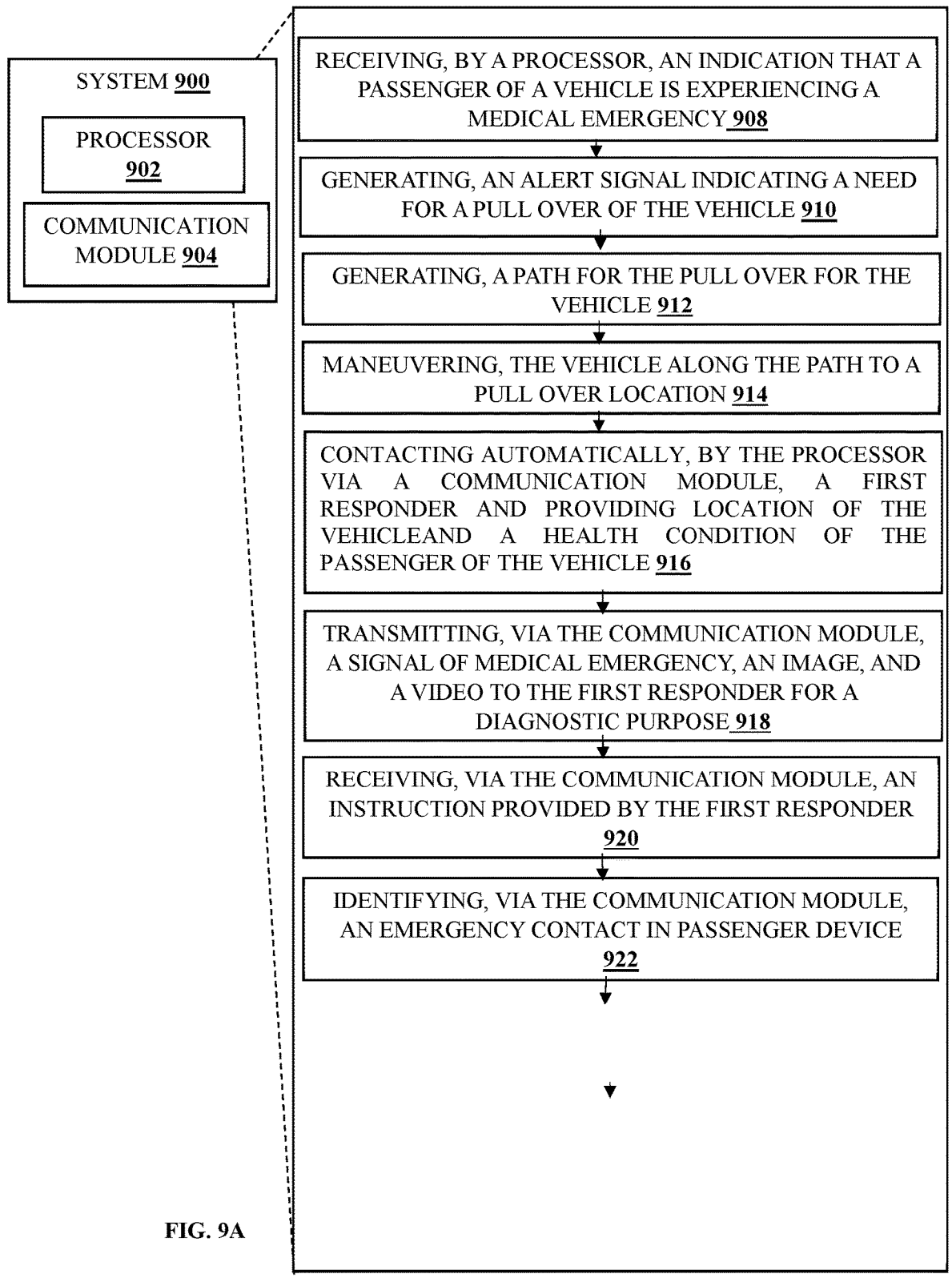
FIG. 9A is an illustration of a system for identifying and assisting the passenger undergoing emergency health condition in the vehicle before arriving at the location.

FIG. 9A is an illustration of a system for identifying and assisting the passenger undergoing emergency health condition in the vehicle before arriving at the location. The system 900 comprises processor 902 and communication module 904. The system 900 performs the following functions:

Step 908: receiving, by a processor, an indication that a passenger of a vehicle is experiencing a medical emergency;

Step 910: generating, an alert signal indicating a need for a pull over of the vehicle;

Step 912: generating, a path for the pull over for the vehicle;

Step 914: maneuvering, the vehicle along the path to a pull over location;

Step 916: contacting automatically, by the processor via a communication module, a first responder and providing the location of the vehicle and a health condition of the passenger of the vehicle; and Step 918: transmitting, via the communication module, a signal of medical emergency, an image, and a video to the first responder for a diagnostic purpose;

Step 920: receiving, via the communication module, an instruction provided by the first responder;

Step 922: identifying, via the communication module, an emergency contact in a passenger device;

Step 924: establishing, via the communication module, a secondary communication channel; and Step 926: sending, via the communication module, a message to the emergency contact comprising a detail of occurrence of an emergency event in the vehicle and the location of the vehicle.

FIG. 9B is an illustration of a method for identifying and assisting the passenger undergoing emergency health condition in the vehicle before arriving at the location. The method 928 comprises the following steps:

Step 908: receiving, by a processor, an indication that a passenger of a vehicle is experiencing a medical emergency;

Step 910: generating, an alert signal indicating a need for a pull over of the vehicle;

Step 912: generating, a path for the pull over for the vehicle;

Step 914: maneuvering, the vehicle along the path to a pull over location;

Step 916: contacting automatically, by the processor via a communication module, a first responder and providing the location of the vehicle and a health condition of the passenger of the vehicle; and Step 918: transmitting, via the communication module, a signal of medical emergency, an image, and a video to the first responder for a diagnostic purpose;

Step 920: receiving, via the communication module, an instruction provided by the first responder;

Step 922: identifying, via the communication module, an emergency contact in a passenger device;

Step 924: establishing, via the communication module, a secondary communication channel; and Step 926: sending, via the communication module, a message to the emergency contact comprising a detail of occurrence of an emergency event in the vehicle and the location of the vehicle.

In an embodiment, the communication module is enabled for at least one of a vehicle-to-vehicle communication, vehicle-to-infrastructure communication, and vehicle-to-everything communication.

In an embodiment, the communication module connects to an infotainment system, wherein the infotainment system automatically sends a message or call to the emergency contact.

In an embodiment, the medical emergency is due to a health condition of the passenger in the vehicle.

In an embodiment, the health condition of the passenger is due to at least one of a choking, a fever, a change in vital sign indicating a problem in physiological function of the passenger.

In an embodiment, the first responder comprises at least one of a doctor and healthcare provider.

In an embodiment, location comprises a police station.

In an embodiment, location comprises a hospital.

In an embodiment, location can be an emergency stop location.

Figure 9C:
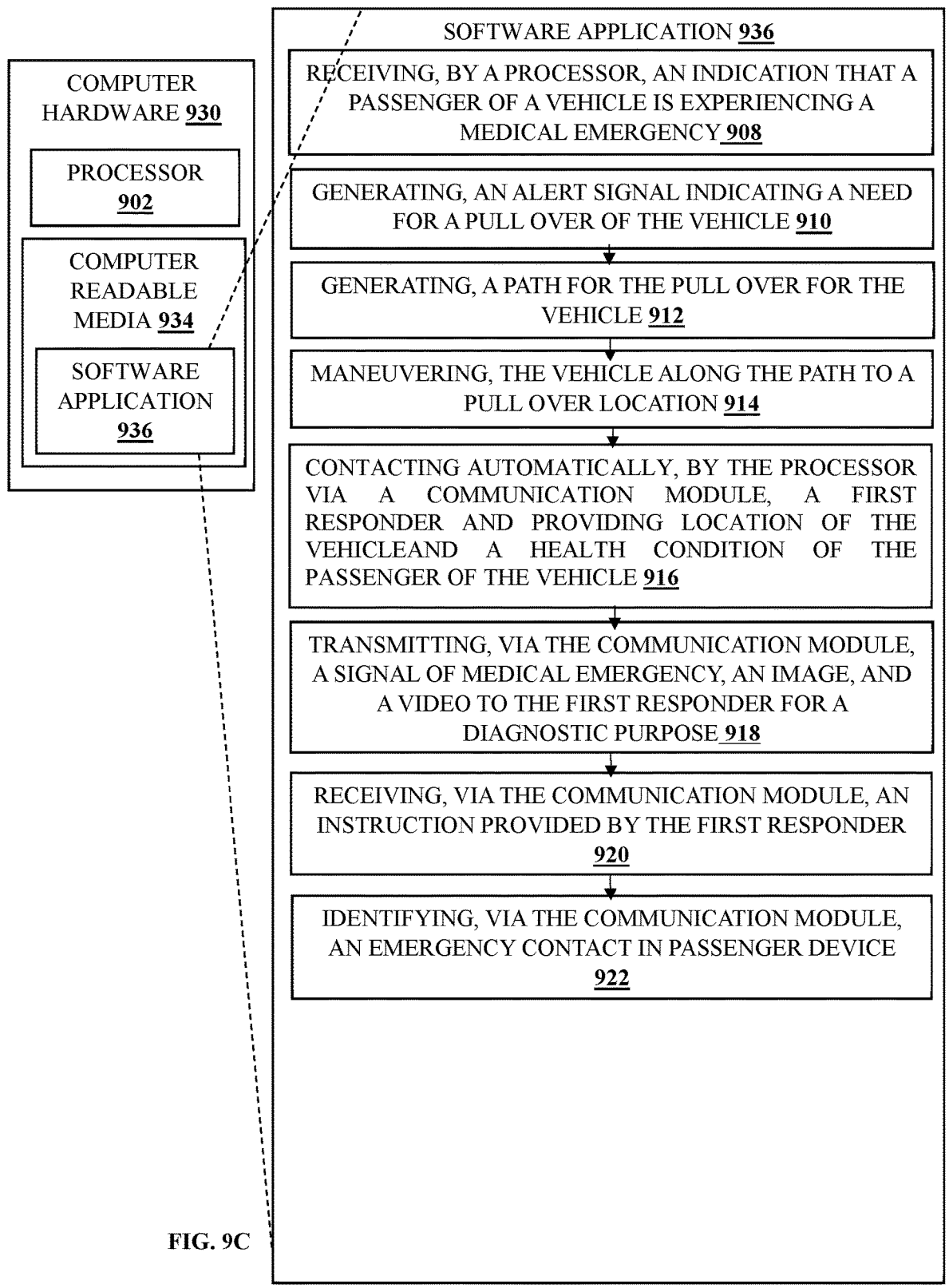
FIG. 9C is an illustration of non-transitory computer readable medium having stored thereon instructions executable by a computer system to perform operations.

FIG. 9C is an illustration of non-transitory computer readable medium having stored thereon instructions executable by a computer system to perform operations. Computer hardware 930 comprises processor 902 and computer readable media 934. Computer readable media 834 comprises software application 936 which performs the following functions:

Step 908: receiving, by a processor, an indication that a passenger of a vehicle is experiencing a medical emergency;

Step 910: generating, an alert signal indicating a need for a pull over of the vehicle;

Step 912: generating, a path for the pull over for the vehicle;

Step 914: maneuver, the vehicle along the path to a pull over location;

Step 916: contacting automatically, by the processor via a communication module, a first responder and providing the location of the vehicle and a health condition of the passenger of the vehicle; and Step 918: transmitting, via the communication module, a signal of medical emergency, an image, and a video to the first responder for a diagnostic purpose;

Step 920: receiving, via the communication module, an instruction provided by the first responder;

Step 922: identifying, via the communication module, an emergency contact in a passenger device;

Step 924: establishing, via the communication module, a secondary communication channel; and Step 926: sending, via the communication module, a message to the emergency contact comprising a detail of occurrence of an emergency event in the vehicle and the location of the vehicle.

Figure 10A:
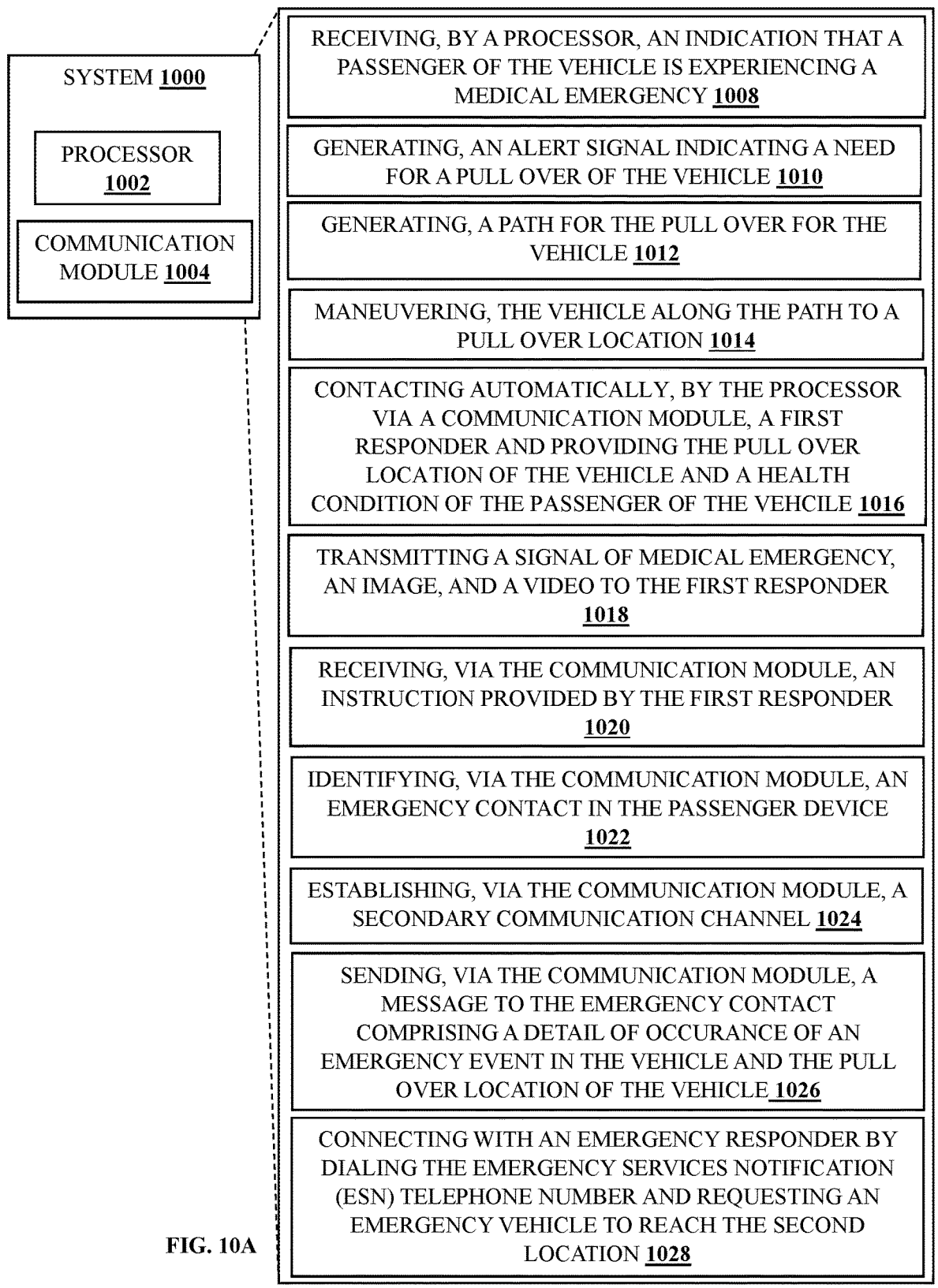
FIG. 10A is an illustration of a system for identifying and assisting the passenger undergoing emergency health condition in the vehicle before arriving at the location.

FIG. 10A is an illustration of a system for identifying and assisting the passenger undergoing emergency health condition in the vehicle before arriving at the location. The system 1000 comprises processor 1002 and communication module 1004. The system 1000 performs the following functions:

Step 1008: receiving, by a processor, an indication that a passenger of a vehicle is experiencing a medical emergency;

Step 1010: generating, an alert signal indicating a need for a pull over of the vehicle;

Step 1012: generating, a path for the pull over for the vehicle;

Step 1014: maneuvering, the vehicle along the path to a pull over location;

Step 1016: contacting automatically, by the processor via a communication module, a first responder and providing the pull location of the vehicle and a health condition of the passenger of the vehicle;

Step 1018: transmitting, via the communication module, a signal of medical emergency, an image, and a video to the first responder for a diagnostic purpose before reaching a second location;

Step 1020: receiving, via the communication module, an instruction provided by the first responder;

Step 1022: identifying, via the communication module, an emergency contact in a passenger device;

Step 1024: establishing, via the communication module, a secondary communication channel;

Step 1026: sending, via the communication module, a message to the emergency contact comprising a detail of occurrence of an emergency event in the vehicle and the pull over location of the vehicle; and Step 1028: connecting with an emergency responder by dialing the emergency services notification (ESN) telephone number and requesting an emergency vehicle to reach the second location.

FIG. 10B is a flowchart of a method for identifying and assisting the passenger undergoing emergency health condition in the vehicle before arriving at the location. The method 1030 comprises the following steps:

Step 1008: receiving, by a processor, an indication that a passenger of a vehicle is experiencing a medical emergency;

Step 1010: generating, an alert signal indicating a need for a pull over of the vehicle;

Step 1012: generating, a path for the pull over for the vehicle;

Step 1014: maneuvering, the vehicle along the path to a pull over location;

Step 1016: contacting automatically, by the processor via a communication module, a first responder and providing the pull over location of the vehicle and a health condition of the passenger of the vehicle;

Step 1018: transmitting, via the communication module, a signal of medical emergency, an image, and a video to the first responder for a diagnostic purpose before reaching a second location;

Step 1020: receiving, via the communication module, an instruction provided by the first responder;

Step 1022: identifying, via the communication module, an emergency contact in a passenger device;

Step 1024: establishing, via the communication module, a secondary communication channel;

Step 1026: sending, via the communication module, a message to the emergency contact comprising a detail of occurrence of an emergency event in the vehicle and the pull over location of the vehicle; and Step 1028: connecting with an emergency responder by dialing the emergency services notification (ESN) telephone number and requesting an emergency vehicle to reach the second location.

In an embodiment, the communication module is enabled for at least one of a vehicle-to-vehicle communication, vehicle-to-infrastructure communication, and vehicle-to-everything communication.

In an embodiment, the communication module connects to an infotainment system, wherein the infotainment system automatically sends a message or call to the emergency contact.

In an embodiment, the medical emergency is due to a health condition of the passenger in the vehicle.

In an embodiment, the health condition of the passenger is due to at least one of a choking, a fever, a change in vital sign indicating a problem in physiological function of the passenger.

In an embodiment, the first responder comprises at least one of a doctor and healthcare provider.

In an embodiment, location comprises a police station.

In an embodiment, location comprises a hospital.

In an embodiment, location can be an emergency stop location.

Figure 10C:
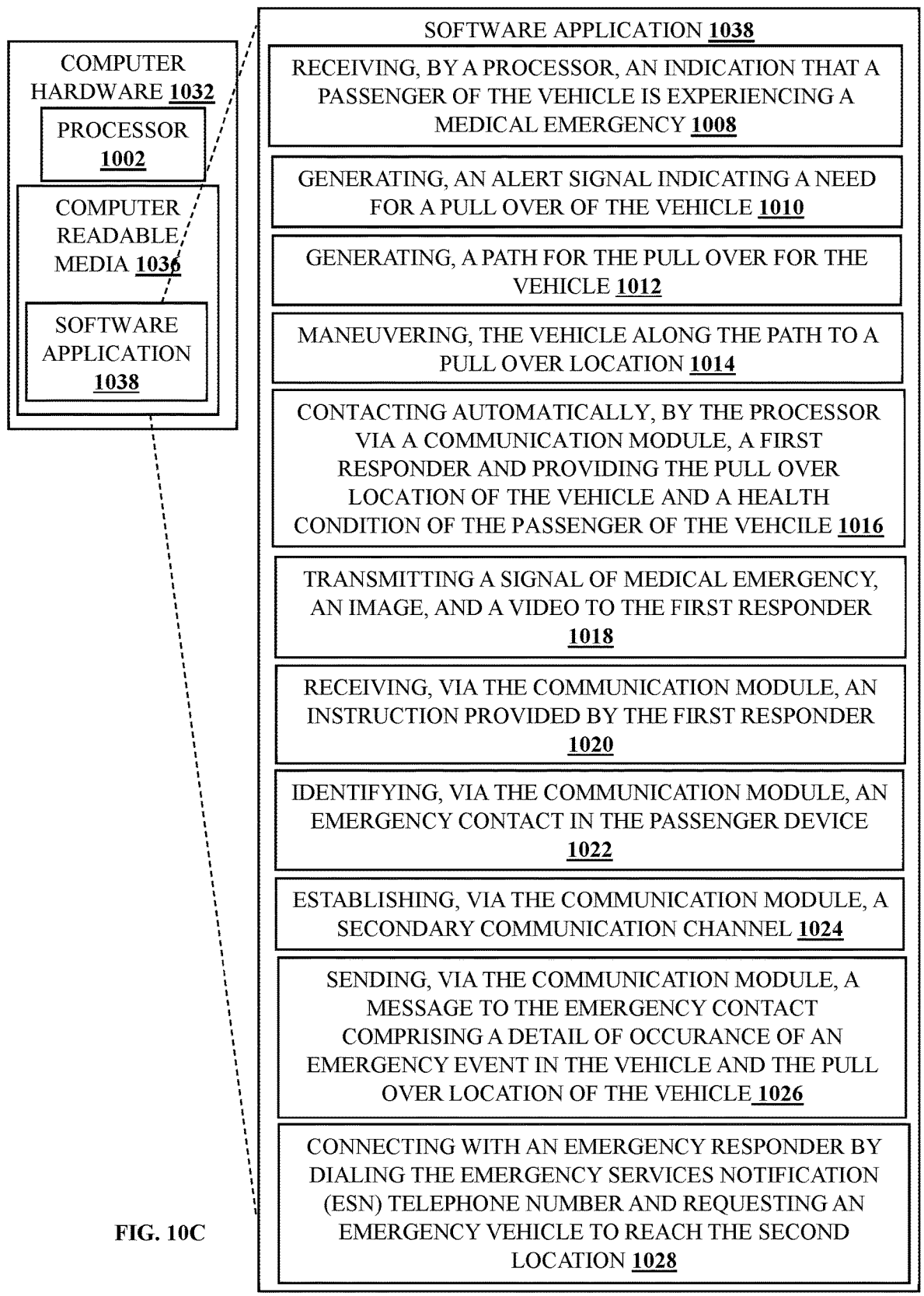
FIG. 10C is an illustration of non-transitory computer readable medium having stored thereon instructions executable by a computer system to perform operations.

FIG. 10C is an illustration of non-transitory computer readable medium having stored thereon instructions executable by a computer system to perform operations. Computer hardware 1030 comprises processor 1002 and computer readable media 1034. Computer readable media 1034 comprises software application 1038 which performs the following functions:

Step 1008: receiving, by a processor, an indication that a passenger of a vehicle is experiencing a medical emergency;

Step 1010: generating, an alert signal indicating a need for a pull over of the vehicle;

Step 1012: generating, a path for the pull over for the vehicle;

Step 1014: maneuvering, the vehicle along the path to a pull over location;

Step 1016: contacting automatically, by the processor via a communication module, a first responder and providing the pull over location of the vehicle and a health condition of the passenger of the vehicle;

Step 1018: transmitting, via the communication module, a signal of medical emergency, an image, and a video to the first responder for a diagnostic purpose before reaching a second location;

Step 1020: receiving, via the communication module, an instruction provided by the first responder;

Step 1022: identifying, via the communication module, an emergency contact in a passenger device;

Step 1024: establishing, via the communication module, a secondary communication channel;

Step 1026: sending, via the communication module, a message to the emergency contact comprising a detail of occurrence of an emergency event in the vehicle and the pull over location of the vehicle; and Step 1028: connecting with an emergency responder by dialing the emergency services notification (ESN) telephone number and requesting an emergency vehicle to reach the second location.

Figure 11A:
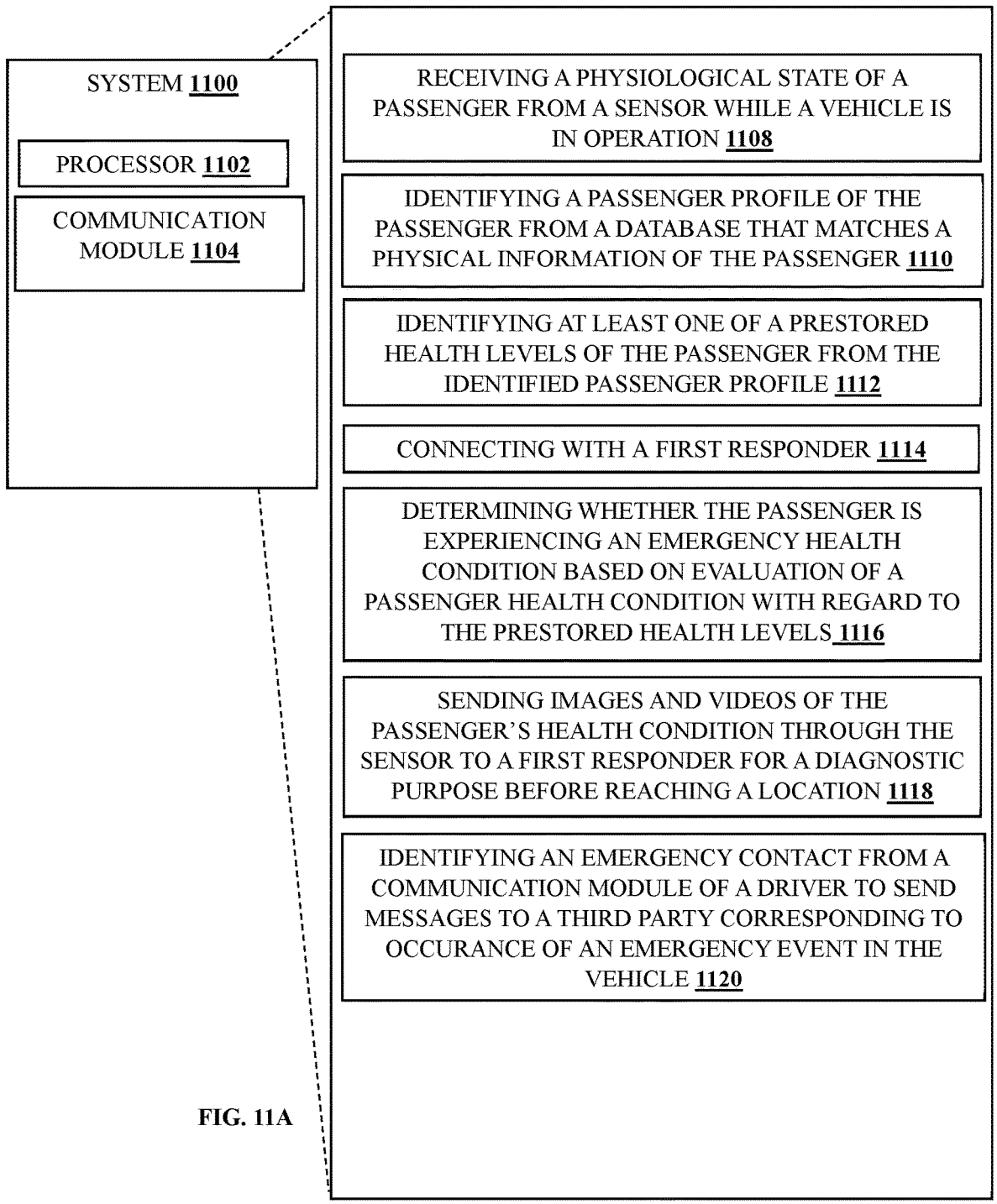
FIG. 11A is an illustration of a system for identifying and assisting the passenger undergoing emergency health condition in the vehicle before arriving at the location.

FIG. 11A is an illustration of a system for identifying and assisting the passenger undergoing emergency health condition in the vehicle before arriving at the location. The system 1100 comprises processor 1102, communication module 1104, memory 1106, sensor 1105, database 1103. The memory storing instructions that, when executed by the processor 1102, cause a vehicle to perform operations comprising:

Step 1108: receiving a physiological state of a passenger from a sensor while a vehicle is in operation;

Step 1110: identifying a passenger profile of the passenger from a database that matches a physical information of the passenger;

Step 1112: identifying at least one of a prestored health levels of the passenger from the identified passenger profile;

Step 1114: connecting with a first responder;

Step 1116: determining whether the passenger is experiencing an emergency health condition based on evaluation of a passenger health condition with regard to the prestored health levels;

Step 1118: sending images and videos of the passenger's health condition through the sensor to the first responder for a diagnostic purpose before reaching a location;

Step 1120: identifying an emergency contact from a communication module of a driver to send messages to a third party corresponding to occurrence of an emergency event in the vehicle; and Step 1122: performing a remedial action to assist the passenger in response to determining that the passenger is experiencing the emergency health condition.

Figure 11B:
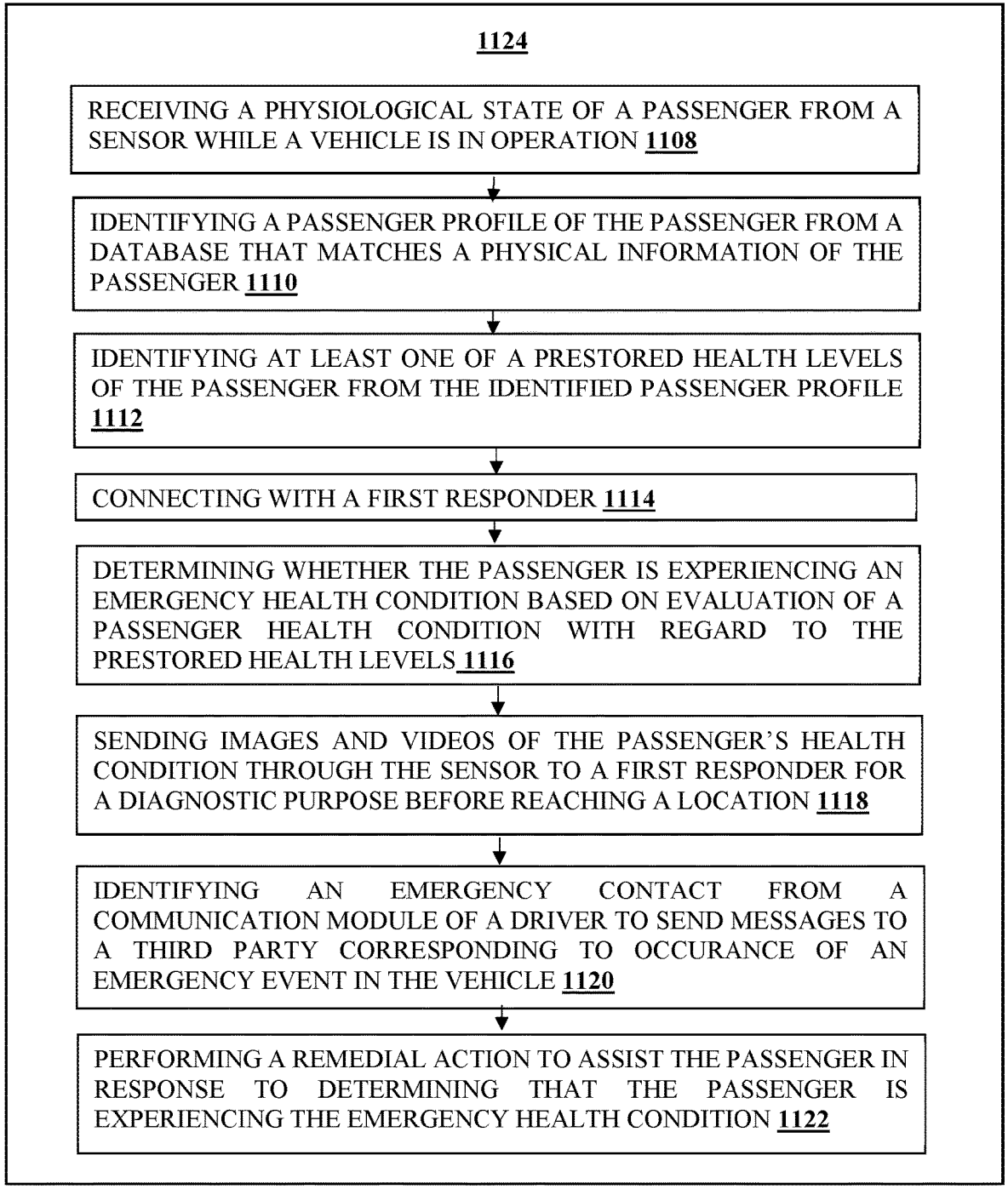
FIG. 11B is a flowchart of a method for identifying and assisting the passenger undergoing emergency health condition in the vehicle before arriving at the location.

FIG. 11B is a flowchart of a method for identifying and assisting the passenger undergoing an emergency health condition in the vehicle before arriving at the location. The method 1124 comprises following steps:

Step 1108: receiving a physiological state of a passenger from a sensor while a vehicle is in operation;

Step 1110: identifying a passenger profile of the passenger from a database that matches a physical information of the passenger;

Step 1112: identifying at least one of a prestored health levels of the passenger from the identified passenger profile;

Step 1114: connecting with a first responder;

Step 1116: determining whether the passenger is experiencing an emergency health condition based on evaluation of a passenger health condition with regard to the prestored health levels;

Step 1118: sending images and videos of the passenger's health condition through the sensor to the first responder for a diagnostic purpose before reaching a location;

Step 1120: identifying an emergency contact from a communication module of a driver to send messages to a third party corresponding to occurrence of an emergency event in the vehicle; and Step 1122: performing a remedial action to assist the passenger in response to determining that the passenger is experiencing the emergency health condition.

In an embodiment, first responder comprises at least one of a healthcare provider and a doctor.

In an embodiment, the remedial action comprises a signal configured to keep the passenger awake.

In an embodiment, the signal comprises audio signals output using at least a speaker.

In an embodiment, location comprises a police station.

In an embodiment, location comprises a hospital.

In an embodiment, location can be an emergency stop location.

In an embodiment, the communication module is enabled for at least one of a vehicle-to-vehicle communication, vehicle-to-infrastructure communication, and vehicle-to-everything communication.

In an embodiment, the communication module connects to an infotainment system, wherein the infotainment system automatically sends at least one of a message and calls the emergency contact.

In an embodiment, the medical emergency is due to a health condition of the passenger in the vehicle.

In an embodiment, the health condition of the passenger is due to at least one of a choking, a fever, a change in vital sign indicating a problem in physiological function of the passenger.

In an embodiment, the system further comprises a sensor and a memory.

In an embodiment, the sensor comprises at least one of a heart rate sensor, a blood pressure sensor, a thermometer, a respiratory rate monitor, a video camera, and an infrared image sensor.

Figure 11C:
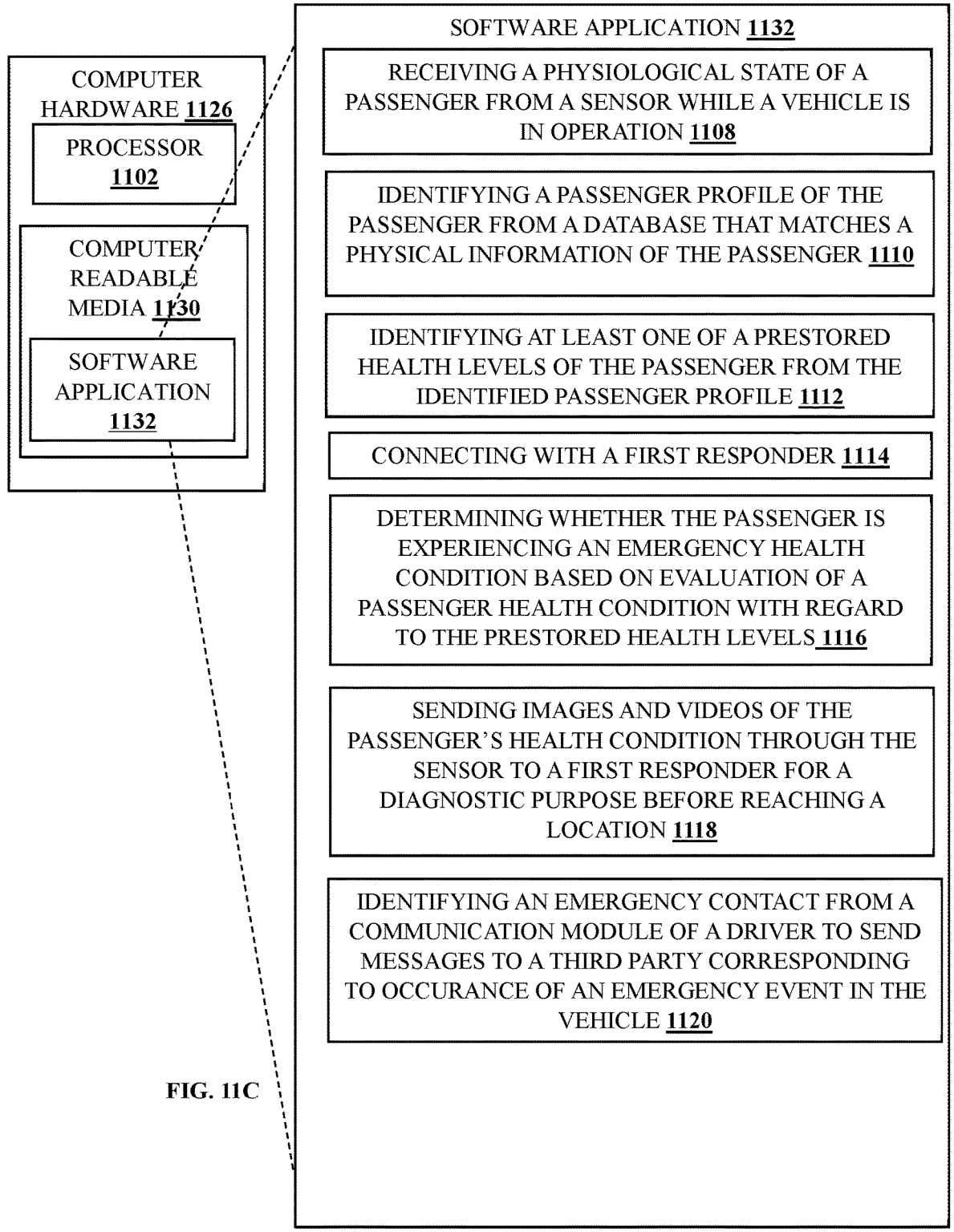
FIG. 11C is an illustration of non-transitory computer readable medium having stored thereon instructions executable by a computer system to perform operations.

FIG. 11C is an illustration of non-transitory computer readable medium having stored thereon instructions executable by a computer system to perform operations. The computer hardware 1126 comprises processor 1102, and computer readable media 1130. The computer readable media 1130 comprises software application 1132. The software application 1132 performs the following functions:

Step 1108: receiving a physiological state of a passenger from a sensor while a vehicle is in operation;

Step 1110: identifying a passenger profile of the passenger from a database that matches a physical information of the passenger;

Step 1112: identifying at least one of a prestored health levels of the passenger from the identified passenger profile;

Step 1114: connecting with a first responder;

Step 1116: determining whether the passenger is experiencing an emergency health condition based on evaluation of a passenger health condition with regard to the prestored health levels;

Step 1118: sending images and videos of the passenger's health condition through the sensor to the first responder for a diagnostic purpose before reaching a location;

Step 1120: identifying an emergency contact from a communication module of a driver to send messages to a third party corresponding to occurrence of an emergency event in the vehicle; and Step 1122: performing a remedial action to assist the passenger in response to determining that the passenger is experiencing the emergency health condition.

In an embodiment, the system may comprise a cyber security module.

In one aspect, a secure communication management (SCM) computer device for providing secure data connections is provided. The SCM computer device includes a processor in communication with memory. The processor is programmed to receive, from a first device, a first data message. The first data message is in a standardized data format. The processor is also programmed to analyze the first data message for potential cyber security threats. If the determination is that the first data message does not contain a cyber security threat, the processor is further programmed to convert the first data message into a first data format associated with the vehicle environment and transmit the converted first data message to the vehicle system using a first communication protocol associated with the vehicle system.

According to an embodiment, secure authentication for data transmissions comprises, provisioning a hardware-based security engine (HSE) located in communications system, said HSE having been manufactured in a secure environment and certified in said secure environment as part of an approved network; performing asynchronous authentication, validation and encryption of data using said HSE, storing user permissions data and connection status data in an access control list used to define allowable data communications paths of said approved network, enabling communications of the communications system with other computing system subjects to said access control list, performing asynchronous validation and encryption of data using security engine including identifying a user device (UD) that incorporates credentials embodied in hardware using a hardware-based module provisioned with one or more security aspects for securing the system, wherein security aspects comprising said hardware-based module communicating with a user of said user device and said HSE.

Figure 12A:
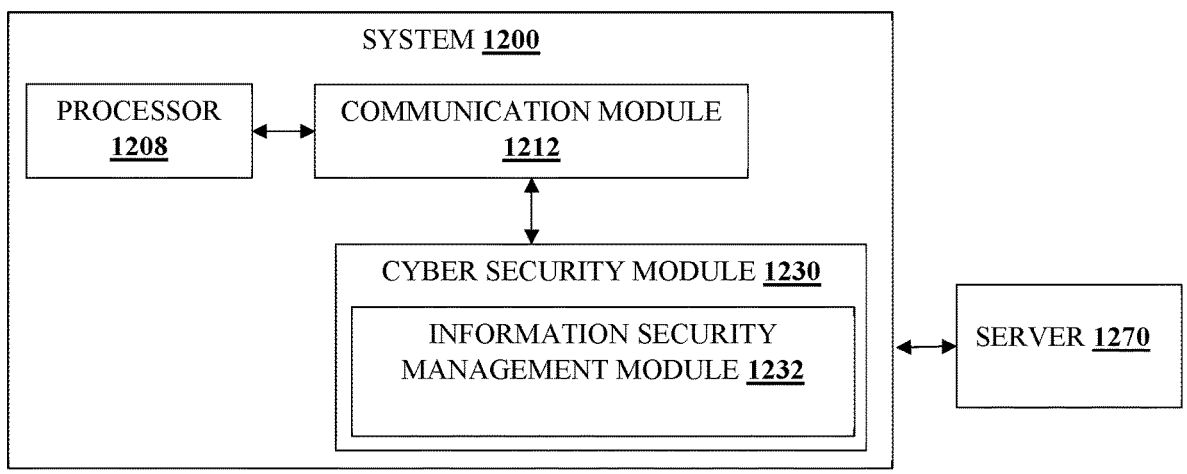
FIG. 12A shows a block diagram of the cyber security module in view of the system and server.

In an embodiment, FIG. 12A shows the block diagram of the cyber security module. The communication of data between the system 1200 and the server 1270 through the communication module 1212 is first verified by the information security management module 1232 before being transmitted from the system to the server or from the server to the system. The information security management module is operable to analyze the data for potential cyber security threats, to encrypt the data when no cyber security threat is detected, and to transmit the data encrypted to the system or the server.

Figure 12B:
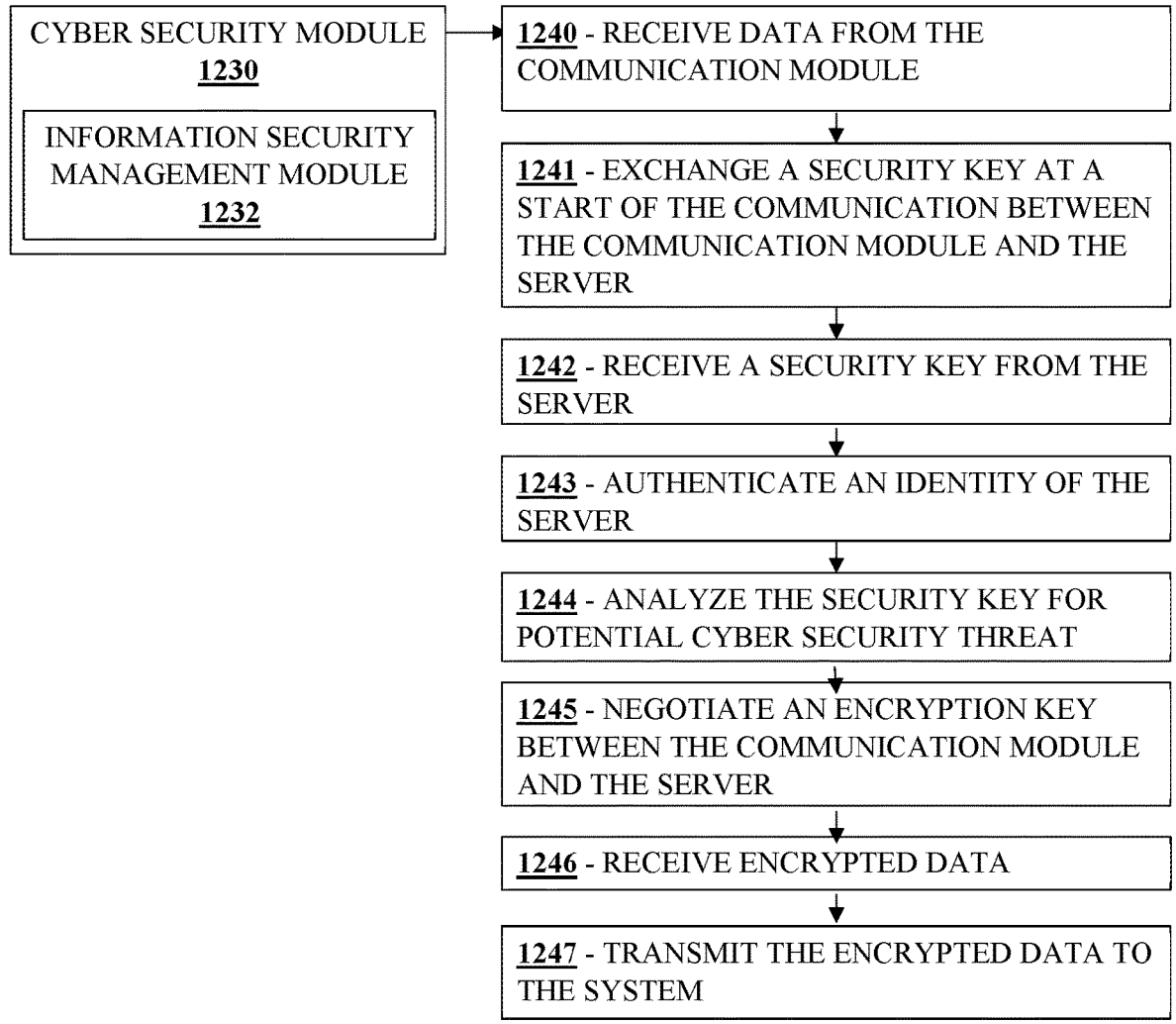
FIG. 12B shows an embodiment of the cyber security module.

In an embodiment, the cyber security module further comprises an information security management module providing isolation between the system and the server. FIG. 12B shows the flowchart of securing the data through the cyber security module 1230. At step 1240, the information security management module is operable to receive data from the communication module. At step 1241, the information security management module exchanges a security key at a start of the communication between the communication module and the server. At step 1242, the information security management module receives a security key from the server. At step 1243, the information security management module authenticates an identity of the server by verifying the security key. At step 1244, the information security management module analyzes the security key for potential cyber security threats. At step 1245, the information security management module negotiates an encryption key between the communication module and the server. At step 1246, the information security management module receives the encrypted data. At step 1247, the information security management module transmits the encrypted data to the server when no cyber security threat is detected.

Figure 12C:
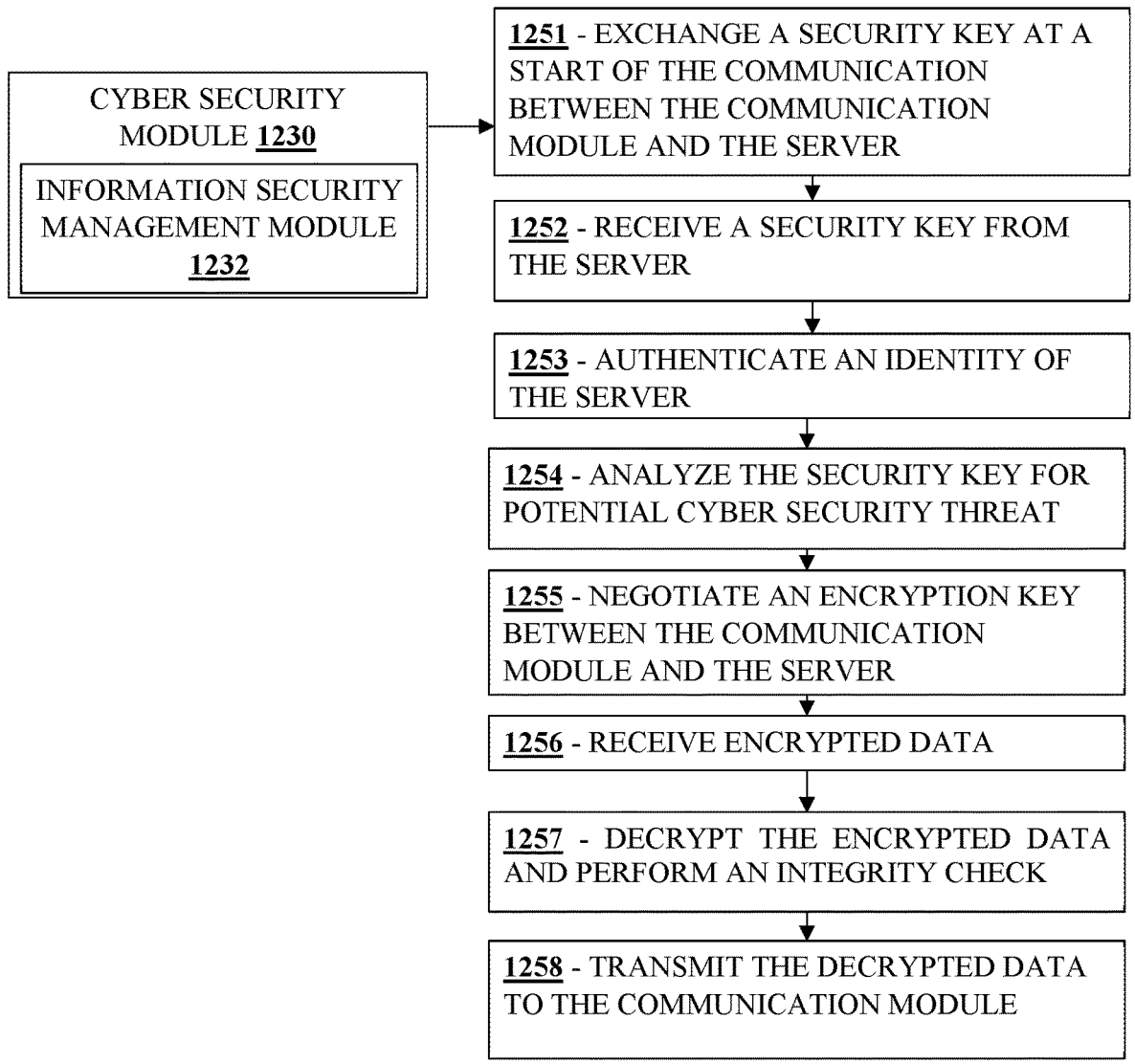
FIG. 12C shows another embodiment of the cyber security module.

In an embodiment, FIG. 12C shows the flowchart of securing the data through the cyber security module 1230. At step 1251, the information security management module is operable to: exchange a security key at a start of the communication between the communication module and the server. At step 1252, the information security management module receives a security key from the server. At step 1253, the information security management module authenticates an identity of the server by verifying the security key. At step 1254, the information security management module analyzes the security key for potential cyber security threats. At step 1255, the information security management module negotiates an encryption key between the communication module and the server. At step 1256, the information security management module receives encrypted data. At step 1257, the information security management module decrypts the encrypted data, and performs an integrity check of the decrypted data. At step 1258, the information security management module transmits the decrypted data to the communication module when no cyber security threat is detected.

In an embodiment, the integrity check is a hash-signature verification using a Secure Hash Algorithm 256 (SHA256) or a similar method.

In an embodiment, the information security management module is configured to perform asynchronous authentication and validation of the communication between the communication module and the server.

In an embodiment, the information security management module is configured to raise an alarm if a cyber security threat is detected. In an embodiment, the information security management module is configured to discard the encrypted data received if the integrity check of the encrypted data fails.

In an embodiment, the information security management module is configured to check the integrity of the decrypted data by checking accuracy, consistency, and any possible data loss during the communication through the communication module.

In an embodiment, the server is physically isolated from the system through the information security management module. When the system communicates with the server as shown in FIG. 12A, identity authentication is first carried out on the system and the server. The system is responsible for communicating/exchanging a public key of the system and a signature of the public key with the server. The public key of the system and the signature of the public key are sent to the information security management module. The information security management module decrypts the signature and verifies whether the decrypted public key is consistent with the received original public key or not. If the decrypted public key is verified, the identity authentication is passed. Similarly, the system and the server carry out identity authentication on the information security management module. After the identity authentication is passed on to the information security management module, the two communication parties, the system, and the server, negotiate an encryption key and an integrity check key for data communication of the two communication parties through the authenticated asymmetric key. A session ID number is transmitted in the identity authentication process, so that the key needs to be bound with the session ID number; when the system sends data to the outside, the information security gateway receives the data through the communication module, performs integrity authentication on the data, then encrypts the data through a negotiated secret key, and finally transmits the data to the server through the communication module. When the information security management module receives data through the communication module, the data is decrypted first, integrity verification is carried out on the data after decryption, and if verification is passed, the data is sent out through the communication module; otherwise, the data is discarded.

In an embodiment, the identity authentication is realized by adopting an asymmetric key with a signature.

In an embodiment, the signature is realized by a pair of asymmetric keys which are trusted by the information security management module and the system, wherein the private key is used for signing the identities of the two communication parties, and the public key is used for verifying that the identities of the two communication parties are signed. Signing identity comprises a public and a private key pair. In other words, signing identity is referred to as the common name of the certificates which are installed in the user's machine.

In an embodiment, both communication parties need to authenticate their own identities through a pair of asymmetric keys, and a task in charge of communication with the information security management module of the system is identified by a unique pair of asymmetric keys.

In an embodiment, the dynamic negotiation key is encrypted by adopting an Rivest-Shamir-Adleman (RSA) encryption algorithm. RSA is a public-key cryptosystem that is widely used for secure data transmission. The negotiated keys include a data encryption key and a data integrity check key.

In an embodiment, the data encryption method is a Triple Data Encryption Algorithm (3DES) encryption algorithm. The integrity check algorithm is a Hash-based Message Authentication Code (HMAC-MD5-128) algorithm. When data is output, the integrity check calculation is carried out on the data, the calculated Message Authentication Code (MAC) value is added with the header of the value data message, then the data (including the MAC of the header) is encrypted by using a 3DES algorithm, the header information of a security layer is added after the data is encrypted, and then the data is sent to the next layer for processing. In an embodiment the next layer refers to a transport layer in the Transmission Control Protocol/Internet Protocol (TCP/IP) model.

The information security management module ensures the safety, reliability, and confidentiality of the communication between the system and the server through the identity authentication when the communication between the two communication parties starts the data encryption and the data integrity authentication. The method is particularly suitable for an embedded platform which has less resources and is not connected with a Public Key Infrastructure (PKI) system and can ensure that the safety of the data on the server cannot be compromised by a hacker attack under the condition of the Internet by ensuring the safety and reliability of the communication between the system and the server.

Figure 13:
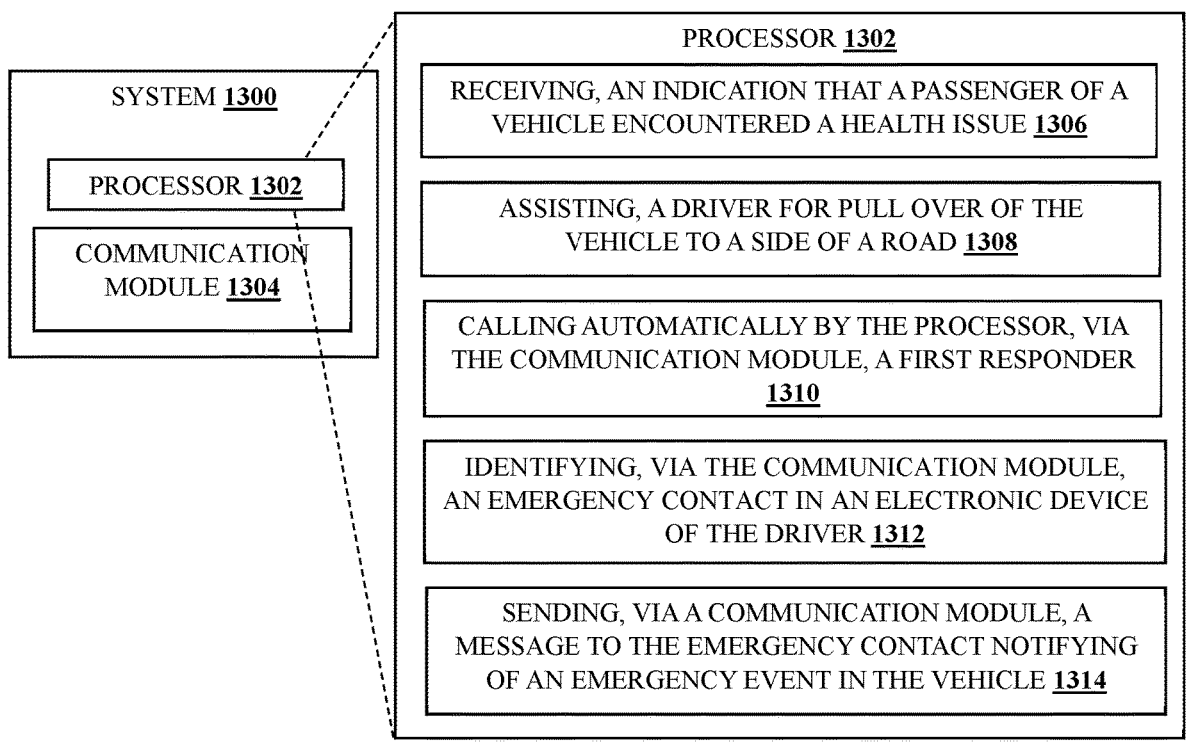
FIG. 13 is an illustration of a system for notify a spouse or a family doctor that the passenger has encountered a health issue.

FIG. 13 is an illustration of a system for notify a spouse and/or a family doctor that the passenger has encountered a health issue. The system 1300 comprises processor 1302 and communication module 1304. The system 1300 performs the following functions:

Step 1306: receiving, an indication that a passenger of a vehicle encountered a health issue;

Step 1308: assisting, a driver for pull over of the vehicle to a side of a road;

Step 1310: calling automatically by the processor, via the communication module, a first responder;

Step 1312: identifying, via the communication module, an emergency contact in an electronic device of the driver; and Step 1314: sending, via a communication module, a message to the emergency contact notifying of an emergency event in the vehicle.

In an embodiment, the system further comprises a sensor and a memory.

In an embodiment, the sensor comprises at least one of a heart rate sensor, a blood pressure sensor, a thermometer, a respiratory rate monitor, a video camera, and an infrared image sensor.

In an embodiment, the communication module is enabled for at least one of a vehicle-to-vehicle communication, vehicle-to-infrastructure communication, and vehicle-to-everything communication.

In an embodiment, the communication module connects to an infotainment system, wherein the infotainment system automatically sends any one of message and calls the emergency contact.

In an embodiment, the emergency event is due to a health condition of the passenger in the vehicle.

In an embodiment, the first responder includes at least one of a doctor and a healthcare provider.

In an embodiment, the health issue of the passenger is due to at least one of a choking, a fever, a change in vital signs indicating a problem in physiological function of the passenger.

In an embodiment, the first responder includes at least one of a doctor and a healthcare provider.

What is claimed is:

1. A system, comprising:
a sensor, a communication module; and
a processor;
wherein the processor is configured for:
detecting, by the processor using a sensor signal that a passenger of a vehicle is experiencing a medical emergency;
generating, an alert signal indicating a need for a pull over of the vehicle;
generating, a path for the pull over for the vehicle;
maneuvering, the vehicle along the path to a pull over location;
contacting automatically, by the processor via a communication module, a first responder and providing the location of the vehicle and a health condition of the passenger of the vehicle; and transmitting, via the communication module, a signal of medical emergency, an image, and a video to the first responder;

receiving, via the communication module, an instruction provided by the first responder;

identifying, via the communication module, an emergency contact in a passenger device;

establishing, via the communication module, a secondary communication channel; and sending, via the communication module, a message to the emergency contact comprising a detail of occurrence of an emergency event in the vehicle and the pull over location of the vehicle.

2. The system of claim 1, wherein the system is configured to be a component of the vehicle.

3. The system of claim 1, wherein the system further comprises a memory.

4. The system of claim 1, wherein the processor further comprises artificial intelligence algorithms.

5. The system of claim 1, wherein the sensor comprises at least one of a heart rate sensor, a blood pressure sensor, a thermometer, a respiratory rate monitor, a video camera, and an infrared image sensor.

6. The system of claim 1, wherein the communication module is enabled for at least one of a vehicle-to-vehicle communication, vehicle-to-infrastructure communication, and vehicle-to-everything communication.

7. The system of claim 1, wherein the communication module connects to an infotainment system, wherein the infotainment system automatically sends any one of message and a call to the emergency contact.

8. The system of claim 1, wherein the medical emergency is due to a health condition of the passenger in the vehicle.

9. The system of claim 8, wherein the health condition of the passenger is due to at least one of a choking, a fever, a change in vital signs indicating a problem in physiological function of the passenger.

10. The system of claim 1, wherein the maneuvering of the vehicle to the pull over location is by a driver of the vehicle.

11. The system of claim 1, wherein the maneuvering of the vehicle to the pull over location is by instructing a driver of the vehicle with at least one of a voice instruction and by displaying the instruction on a display of the vehicle.

12. The system of claim 1, wherein the maneuvering of the vehicle to the pull over location is in an autonomous mode of the vehicle.

13. The system of claim 1, wherein the processor is at least one of an in-vehicle processor and an application server on a cloud.

14. A method, comprising: detecting, by a processor using a sensor signal that a passenger of a vehicle is experiencing a medical emergency; generating, an alert signal indicating a need for a pull over of the vehicle; generating, a path for the pull over for the vehicle; maneuvering, the vehicle along the path to a pull over location; contacting automatically, by the processor via a communication module, a first responder and providing the location of the vehicle and a health condition of the passenger of the vehicle; and transmitting, via the communication module, a signal of medical emergency, an image, and a video to the first responder; receiving, via the communication module, an instruction provided by the first responder; identifying, via the communication module, an emergency contact in a passenger device; establishing, via the communication module, a secondary communication channel; and sending, via the communication module, a message to the emergency contact comprising a detail of occurrence of an emergency event in the vehicle and the location of the vehicle.

15. The method of claim 14, wherein the sensor comprises at least one of a heart rate sensor, a blood pressure sensor, a thermometer, a respiratory rate monitor, a video camera, and an infrared image sensor.

16. The method of claim 14, wherein the communication module connects to an infotainment system, wherein the infotainment system automatically sends any one of message and a call to the emergency contact.

17. The method of claim 14, wherein the medical emergency is due to a health condition of the passenger in the vehicle.

18. The method of claim 17, wherein the health condition of the passenger is due to at least one of a choking, a fever, a change in vital signs indicating a problem in physiological function of the passenger.

19. The method of claim 14, wherein the maneuvering of the vehicle to the pull over location is by instructing a driver of the vehicle with at least one of a voice instruction and by displaying the instruction on a display of the vehicle.

20. A non-transitory computer-readable medium having stored thereon instructions executable by a computer system to perform operations comprising: detecting, by a processor using a sensor signal that a passenger of a vehicle is experiencing a medical emergency; generating, an alert signal indicating a need for a pull over of the vehicle; generating, a path for the pull over for the vehicle; maneuvering, the vehicle along the path to the pull over to a location; contacting automatically, by the processor via a communication module, a first responder and providing the location of the vehicle and a health condition of the passenger of the vehicle; transmitting, via the communication module, a signal of medical emergency, an image, and a video to the first responder; receiving, via the communication module, an instruction provided by the first responder; identifying, via the communication module, an emergency contact in a passenger device; establishing, via the communication module, a secondary communication channel; and sending, via aft communication module, a message to the emergency contact comprising a detail of occurrence of an emergency event in the vehicle and a location of the vehicle.

* * * * *